US012350594B2

(12) United States Patent
Samarthyam et al.

(10) Patent No.: US 12,350,594 B2
(45) Date of Patent: Jul. 8, 2025

(54) ARTIFICIAL INTELLIGENCE (AI) BASED SKILL TRACKING AND NON-FUNGIBLE TOKEN (NFT) BASED SKILL REPRESENTATION

(71) Applicant: SONY GROUP CORPORATION, Tokyo (JP)

(72) Inventors: Santhosh Samarthyam, Bangalore (IN); Madhvesh Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 284 days.

(21) Appl. No.: 17/954,614

(22) Filed: Sep. 28, 2022

(65) Prior Publication Data

US 2024/0100444 A1 Mar. 28, 2024

(51) Int. Cl.
*A63F 13/798* (2014.01)
*A63F 13/67* (2014.01)

(52) U.S. Cl.
CPC ............ *A63F 13/798* (2014.09); *A63F 13/67* (2014.09); *A63F 2300/532* (2013.01); *A63F 2300/558* (2013.01)

(58) Field of Classification Search
CPC .. A63F 13/798; A63F 13/67; A63F 2300/532; A63F 2300/558; A63F 13/69;
(Continued)

(56) References Cited

U.S. PATENT DOCUMENTS 11,042,885 B2 * 6/2021 Mercury ............... H04L 67/535
11,496,308 B1 * 11/2022 Khan ................. G06Q 30/0209
(Continued)

FOREIGN PATENT DOCUMENTS

CN 108711126 A 10/2018
CN 113379027 A 9/2021
(Continued)

OTHER PUBLICATIONS

Azan Wilfrid et al: "Proposal for an integrative performance framework based on Distributed Ledger Technology dedicated to higher education students entering the labor market", 2022 IEEE 6th International Conference on Logistics Operations Management (GOL), IEEE, Jun. 29, 2022 (Jun. 29, 2022), pp. 1-6, XP034148399, DOI: 10.1109/GOL53975.2022.9820106 [retrieved on Jul. 13, 2022].

(Continued)

*Primary Examiner* — David L Lewis
*Assistant Examiner* — Matthew D Hoel
(74) *Attorney, Agent, or Firm* — CHIP LAW GROUP

(57) ABSTRACT

A system and method for artificial intelligence (AI) based skill tracking and non-fungible token (NFT) based skill/behavior representation are provided. The system acquires information associated with a non-tangible asset of a user in an online environment, apply an artificial intelligence (AI) model on the acquired information, wherein the AI model is trained to evaluate the non-tangible asset and track a progress of acquisition of the non-tangible asset in the online environment. The system determines a proficiency level of a plurality of proficiency levels of the non-tangible asset of the user based on the application of the AI model on the acquired information. The system assigns, based on the determined proficiency level of the non-tangible asset of the user, a value to a digital token associated with the user. The digital token may include a non-transferable part unique to the user and a fungible part that may be exchangeable across platforms.

20 Claims, 30 Drawing Sheets

(58) Field of Classification Search
CPC ... A63F 13/71; A63F 13/792; G06Q 2220/00; G06Q 10/063112; G06Q 10/101; G06Q 10/103; G06Q 10/1503; G06Q 50/2057; H04L 9/3213; H04L 9/50

See application file for complete search history.

(56) References Cited

U.S. PATENT DOCUMENTS

| | | | | |
|---|---|---|---|---|
| 11,521,200 | B1* | 12/2022 | Khan | G06Q 30/0209 |
| 11,934,978 | B2* | 3/2024 | Blum | G06N 20/00 |
| 11,989,726 | B2* | 5/2024 | Padmanabhan | H04L 9/3213 |
| 2001/0049084 | A1 | 12/2001 | Mitry | |
| 2009/0157677 | A1* | 6/2009 | Beaver | G06Q 50/01 |
| 2014/0279632 | A1* | 9/2014 | Andersen | G06Q 10/1053 705/321 |
| 2016/0180725 | A1* | 6/2016 | Fang | G09B 7/00 434/322 |
| 2017/0221165 | A1* | 8/2017 | Sawant | G06Q 10/10 |
| 2020/0250511 | A1 | 8/2020 | Hu | |
| 2020/0328891 | A1* | 10/2020 | Drouot | H04L 9/0637 |
| 2020/0372473 | A1* | 11/2020 | Muralikrishnan | G06Q 10/063112 |
| 2021/0049599 | A1* | 2/2021 | Ghafourifar | H04L 9/0637 |
| 2021/0118085 | A1* | 4/2021 | Bushnell | H04L 9/50 |
| 2021/0295324 | A1* | 9/2021 | Kerseboom | H04L 9/3239 |
| 2022/0156663 | A1* | 5/2022 | Dua | G06Q 10/105 |
| 2022/0343331 | A1* | 10/2022 | Shannon, III | G06Q 20/123 |
| 2022/0414621 | A1* | 12/2022 | Parlotto | G06F 21/64 |
| 2023/0055064 | A1* | 2/2023 | Dalmia | G06Q 50/34 |
| 2023/0091248 | A1* | 3/2023 | Wang | G06Q 10/0639 705/328 |
| 2023/0108427 | A1* | 4/2023 | Khan | H04L 9/3213 713/168 |
| 2023/0138023 | A1* | 5/2023 | Yang | A63F 13/792 463/42 |
| 2023/0162179 | A1* | 5/2023 | Deng | G06Q 20/3823 705/64 |
| 2023/0162180 | A1* | 5/2023 | Deng | G06Q 20/381 705/64 |
| 2023/0196397 | A1* | 6/2023 | Besecker | G06Q 30/0209 705/14.12 |
| 2023/0230041 | A1* | 7/2023 | Kim | G06Q 30/0208 705/14.11 |
| 2023/0298008 | A1* | 9/2023 | Sarin | H04L 9/50 705/69 |
| 2023/0306351 | A1* | 9/2023 | Markman | G06Q 10/1053 |
| 2023/0306390 | A1* | 9/2023 | Ahmed | H04L 9/50 |
| 2023/0377056 | A1* | 11/2023 | Yang | A63F 13/335 |
| 2023/0410070 | A1* | 12/2023 | Sriom | G07F 17/3239 |
| 2024/0066402 | A1* | 2/2024 | Milne | G06Q 20/065 |
| 2024/0066408 | A1* | 2/2024 | Milne | G06Q 20/123 |
| 2024/0070660 | A1* | 2/2024 | Milne | A63F 13/73 |
| 2024/0089112 | A1* | 3/2024 | Pol | H04L 9/3234 |
| 2024/0100444 | A1* | 3/2024 | Samarthyam | G06Q 10/101 |
| 2024/0139632 | A1* | 5/2024 | Khan | G06Q 20/367 |
| 2024/0265350 | A1* | 8/2024 | Muralikrishnan | G06Q 10/1053 |

FOREIGN PATENT DOCUMENTS

| | | |
|---|---|---|
| CN | 113709411 A | 11/2021 |
| CN | 113849560 A | 12/2021 |
| KR | 20210125164 A | 10/2021 |
| WO | WO-2022140861 A1 | 7/2022 |

OTHER PUBLICATIONS

Bin Ramlan Adi Aiman et al: "The Implementation of Reinforcement Learning Algorithm for AI Bot in Fighting Video Game", 2021 4th International Symposium on Agents, Multi-Agent Systems and Robotics (ISAMSR), IEEE, Sep. 6, 2021 (Sep. 6, 2021), pp. 96-100, XP033993234, DOI: 10.1109/ISAMSR53229.2021.9567749 [retrieved on Oct. 11, 2021].

Dicheva Darina et al: "A Study of Using Virtual Currency in a Discrete Mathematics Course", 2021 IEEE Global Engineering Education Conference (EDUCON), IEEE, Apr. 21, 2021 (Apr. 21, 2021), pp. 567-576, XP033925608, DOI: 10.1109/EDUCON46332.2021.9453893 [retrieved on Jun. 11, 2021].

Du Xianzuo et al: "Uprising E-sports Industry: machine learning/AI improve in-game performance using deep reinforcement learning", 2021 International Conference on Machine Learning and Intelligent Systems Engineering (MLISE), IEEE, Jul. 9, 2021 (Jul. 9, 2021), pp. 547-552, XP034030308, DOI: 10.1109/MLISE54096.2021.00112 [retrieved on Nov. 10, 2021].

Pradana Reza Putra et al: "A Multi-Criteria Recommender System For NFT Based IAP In RPG Game", 2022 International Seminar on Intelligent Technology and Its Applications (ISITIA), IEEE, Jul. 20, 2022 (Jul. 20, 2022), pp. 214-219, XP034172754, DOI: 10.1109/ISITIA56226.2022.9855272 [retrieved on Aug. 19, 2022].

Hassan Shafiq, "CryptoBlades vs Axie Infinity: Top Play2Earn Games", Alexandria, 2021, 9 pages.

Beukel, et al., "Assessment of Driving Proficiency When Drivers Utilize Assistance Systems—The Case of Adaptive Cruise Control", Safety, Multidisciplinary Digital Publishing Institute (MDPI), vol. 7, No. 2, May 7, 2021, 24 pages.

"CryptoKitties—Collect and breed furrever friends", CryptoKitties.co, URL: https://www.cryptokitties.co/, Sep. 26, 2022, 09 pages.

* cited by examiner

| Skill A | Proficiency Level | | | |
|---|---|---|---|---|
| | Expert | Intermediate | Beginner | Novice |
| Sub-skill 1 | 1 | 0 | 0 | 0 |
| Sub-skill 2 | 1 | 1 | 0 | 0 |
| Sub-skill 3 | 1 | 1 | 1 | 0 |
| Sub-skill 4 | 1 | 1 | 1 | 1 |

Perception (operational tasks based on skill-based behaviour)—P.O.S.

○ P.O.S.1 Driver uses side mirrors
○ P.O.S.2 Driver uses interior mirror
○ P.O.S.3 Driver scans environment in front of vehicle
○ P.O.S.4 Driver regularly and in alternating fashion scans the environment
○ P.O.S.5 Driver checks blind spot before changing lateral position

Understanding (tactical tasks based on skill-based behaviour)—U.T.S.

○ U.T.S.1 Driver keeps distance for safe acceleration
○ U.T.S.2 Driver takes road layout into consideration for decisions on actions
○ U.T.S.3 Driver is attentive to the behaviour of other traffic participants
○ U.T.S.4 Driver is attentive to the actions of other traffic participants
○ U.T.S.5 Driver adjusts speed to the speed of other road users
○ U.T.S.6 Driver adjusts speed in accordance with traffic density
○ U.T.S.7 Driver maintains sufficient space cushion around the vehicle

FIG. 8A

Understanding (tactical tasks based on rule—based behaviour)—U.T.R.

○ U.T.R.1  Driver reacts to signals and cues of other traffic participants and acts accordingly
○ U.T.R.2  Driver understands expectations in a specific situation and is able to act accordingly
○ U.T.R.3  Driver does not cause hinder to other road users when changing position on the road
○ U.T.R.4  Driver sets turn indicator on time for changing lateral position
○ U.T.R.5  Driver reliably relies on technical support for keeping safe distance
○ U.T.R.6  Driver reassures control in unfamiliar situations
○ U.T.R.7  Driver deducts how system behaves
○ U.T.R.8  Driver correctly anticipates system's actions
○ U.T.R.9  Driver adapts behaviour to the interests of merging traffic
○ U.T.R.10 Driver adapts speed when jammed traffic is likely

Understanding (tactical tasks based on knowledge—based behaviour)—U.T.K.

○ U.T.K.1  Driver applies appropriate solutions in unfamiliar situations
○ U.T.K.2  Driver reasons cost required behaviour in case of calamity
○ U.T.K.3  Driver needs considerations to maintain appropriate position on the road
○ U.T.K.4  Driver needs elaborate preparation to overtake
○ U.T.K.5  Driver needs reasoning to understand vehicle status
○ U.T.K.6  Driver adjusts behaviour to weather conditions
○ U.T.K.7  Driver adjusts control of assistance systems in accordance to weather conditions

FIG. 8B

Ability to Act (operational tasks based on skill-based behaviour)—A.O.S.

○ AOS.1 Driver demonstrates routine vehicle control (without thought)
○ AOS.2 Driver uses the pedals fluently
○ AOS.3 Driver operates gears (if applicable) steadily
○ AOS.4 Driver adapts driving behaviour in harmony to environmental concerns
○ AOS.5 Driver changes lateral position with appropriate speed
○ AOS.6 Driver's steering behaviour is steady and reliable
○ AOS.7 Driver does not cause hinder to other road users while maintaining road position

- AOS.8 Driver takes timely decisions
- AOS.9 Driver maintains appropriate position on the road
- AOS.10 Driver keeps sufficient distance
- AOS.11 Driver is able to act in time in all situations
- AOS.12 Driver has alternative solutions available to overcome complex situations
- AOS.13 Driver remains in control of assistance system

Motivation to Act
- Mo.1 Driver is willing to act responsibly within all situations
- Mo.2 Driver is willing to act timely to avoid risks and complex situations
- Mo.3 Driver is alert in exceptional situations
- Mo.4 Driver obeys traffic rules and regulation
- Mo.5 Driver keeps to the speed limit

FIG. 8D

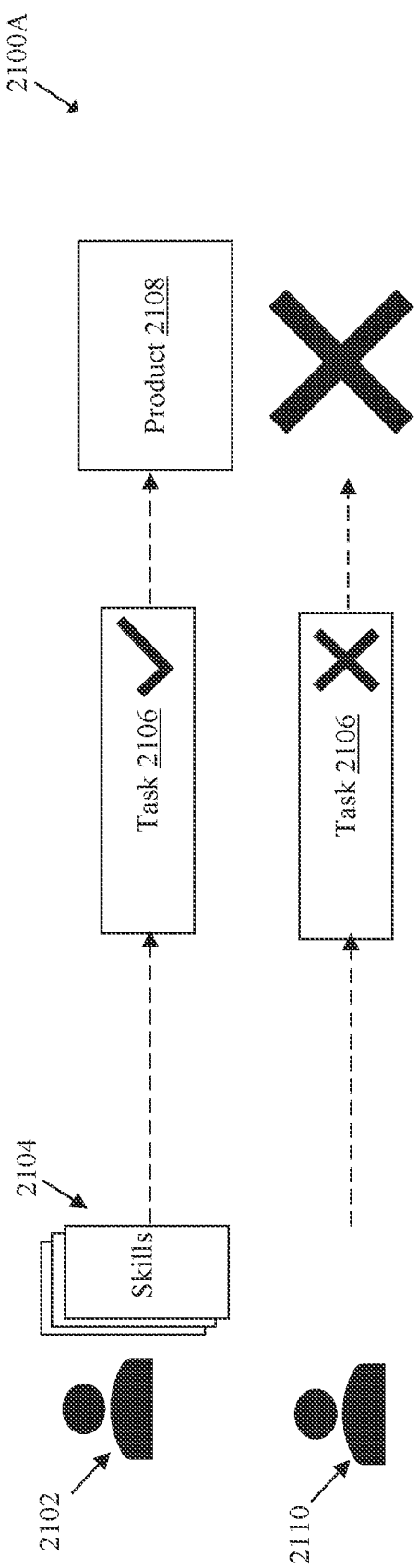
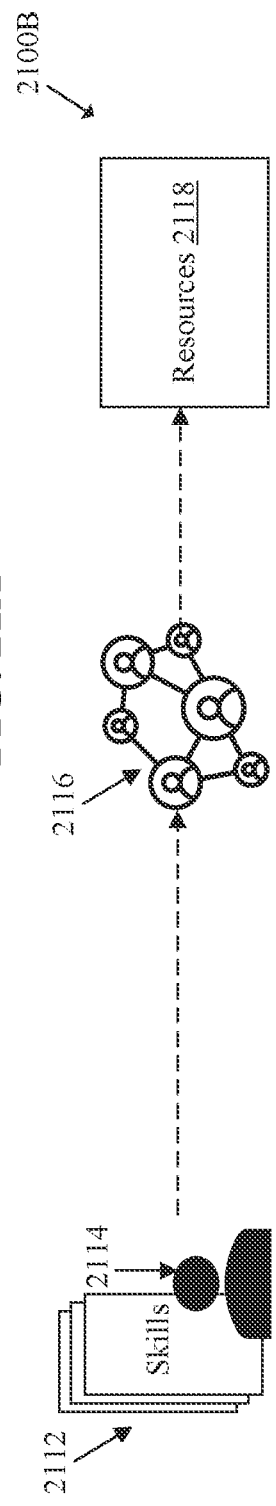
FIG. 21A
FIG. 21B

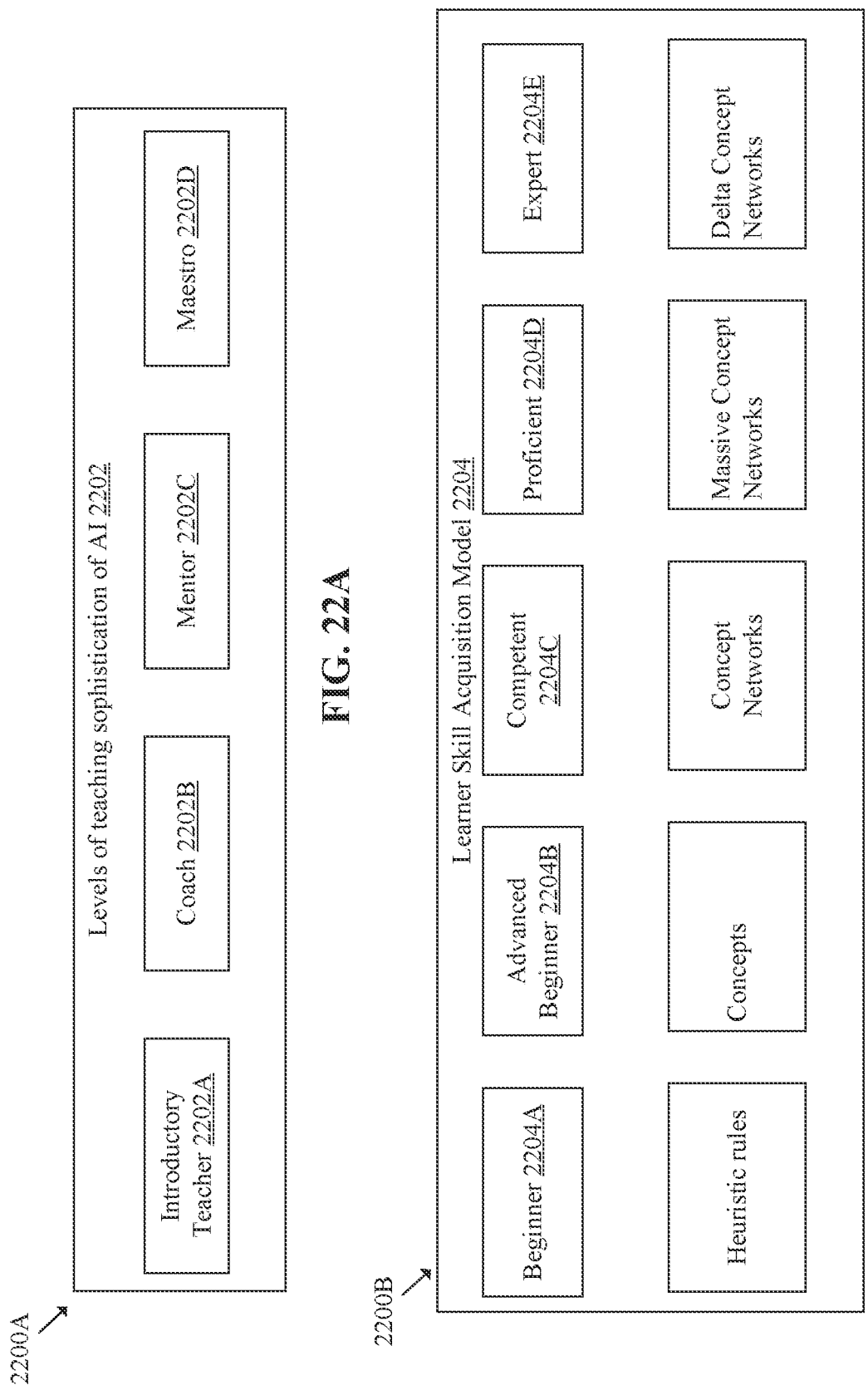

ARTIFICIAL INTELLIGENCE (AI) BASED SKILL TRACKING AND NON-FUNGIBLE TOKEN (NFT) BASED SKILL REPRESENTATION

CROSS-REFERENCE TO RELATED APPLICATIONS/INCORPORATION BY REFERENCE

None.

FIELD

Various embodiments of the disclosure relate to artificial intelligence (AI) based skill tracking and non-fungible token (NFT) based skills/behavior representation. More specifically, various embodiments of the disclosure relate to a system and method for AI based skill tracking and NFT based skill representation.

BACKGROUND

Advancements in the field of artificial intelligence (AI) have provided various learning platforms and modalities for learning and acquiring skills in an online environment, such as an online gaming platform or online learning platform. Conventionally, users of the online gaming platform may acquire skills through gameplay and AI agents. Users of the online learning platform may acquire skills through online tutoring from expert users or AI agents trained by the expert agents. However, the skills acquired though gameplay or through AI agents in the online environment are neither tracked nor validated. Existing techniques do not provide any platform that may evaluate and validate the skills acquired by a user or identify the uniqueness of the skills acquired by the user.

Further, an online gaming platform may involve large-sized game developers and many individual game developers. Once the games are launched in the market, the large-sized game developers may lack the bandwidth to fulfil the evolving needs of game users, such as creating custom skins and avatars for gaming characters. Individual game developers may sense these needs of the market, and may be able to contribute to the game's ecosystem. However, currently there is no platform that may connect the individual game developers and the large-sized game developers, in a manner that may enable the individual game developers to showcase and/or employ their skills as validated assets, while enabling the large-sized game developers to enhance the richness of their games.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for artificial intelligence (AI) based skill tracking and non-fungible token (NFT) based skill/behavior representation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 7 is an exemplary diagram that illustrates proficiency levels of a non-tangible asset of a user, in accordance with an embodiment of the disclosure.

FIGS. 8A-8D are exemplary diagrams that collectively illustrate examples of a skills evaluation framework, in accordance with an embodiment of the disclosure.

FIG. 21A is an exemplary diagram that illustrates an exemplary scenario diagram for valuation of a gaming skill, in accordance with an embodiment of the disclosure.

FIG. 21B is an exemplary diagram that illustrates an exemplary scenario diagram illustrating liquidity of a gaming skill, in accordance with an embodiment of the disclosure.

FIG. 22A is an exemplary block diagram that illustrates teaching levels, in accordance with an embodiment of the disclosure.

FIG. 22B is an exemplary block diagram that illustrates learner skill acquisition levels, in accordance with an embodiment of the disclosure.

DETAILED DESCRIPTION

Figure 1:
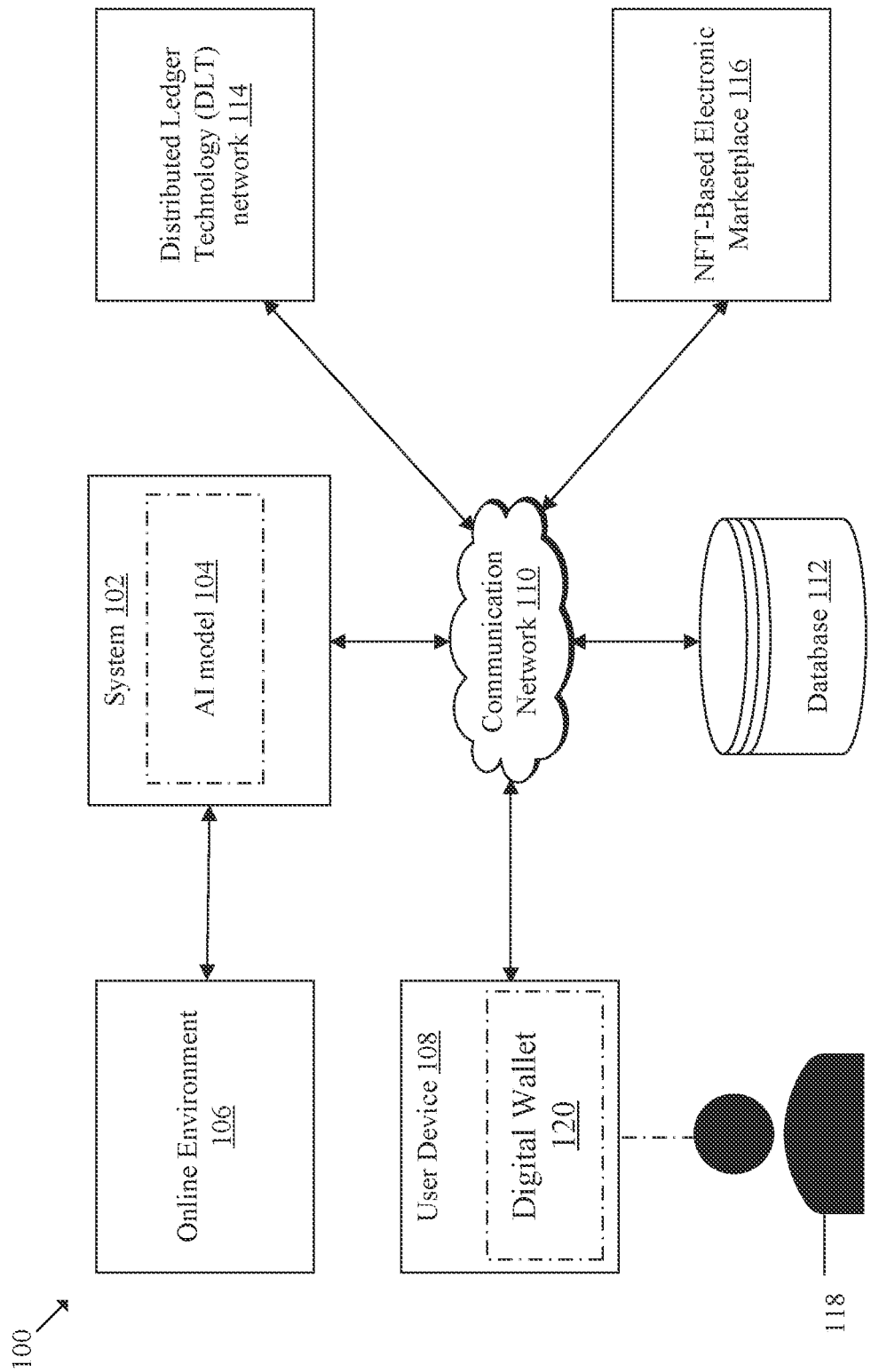
FIG. 1 is a diagram of an exemplary network environment for artificial intelligence (AI) based skill tracking and non-fungible token (NFT) based skill/behavior representation, in accordance with an embodiment of the disclosure.

The following described implementations may be found in the disclosed system and method for artificial intelligence (AI) based skill tracking and non-fungible token (NFT) based skill/behavior representation. The system may be configured to acquire information associated with a non-tangible asset of a user in an online environment (e.g. online gaming environment or online learning environment). For example, the non-tangible asset comprises one of a skill, a skill set (e.g. gameplay skill or game development skill), or behavior of the user. The skills may represent lower techniques and methods, and the behavior may represent higher level intelligent behavior such as strategy, pattern, etc. The system may be configured to apply an artificial intelligence (AI) model on the acquired information. For example, the AI model may be trained to evaluate the non-tangible asset and track a progress of the acquisition of the non-tangible asset in the online environment.

The system may be configured to determine a proficiency level of a plurality of proficiency levels of the non-tangible asset of the user based on the application of the AI model on the acquired information. The system may be configured to assign, based on the determined proficiency level of the non-tangible asset of the user, a value to a digital token associated with the user. For example, the digital token may comprise a non-fungible token (NFT) associated with a distributed ledger (e.g. blockchain). The system may control the AI model to track the progress of the skill of the user across the plurality of proficiency levels or to identify acquisition of a new skill in the online environment. In an embodiment, the system may control the AI model to evaluate the skill based on the tracked progress and current trend data in an NFT-based electronic marketplace. The system may evaluate the new skill based on the current trend data in the NFT-based electronic marketplace. The system may update the value of the digital token based on the evaluation. The system may thereby provide AI model-based evaluation and blockchain-based validation of the skills acquired by the user, and may enable the skills to be showcased as validated assets on the distributed ledger (e.g. blockchain) in the form of the NFT associated with the user.

In an embodiment, the system may be configured to control generation of a smart contract based on a multi-token standard that represents different types of the digital token. In an embodiment, the smart contract may represent the plurality of sub-skills as a series of on-chain crypto credentials based on the multi-token standard, where each credential of the series of on-chain crypto credentials may represent one of a plurality of sub-skills associated with the skill set of the user. For example, the smart contract may represent the plurality of sub-skills as a target vector (e.g. a vector of Booleans), which indicates whether or not the user possesses a corresponding sub-skill. The system may thereby identify the uniqueness of the skill set of the user based on the series of on-chain crypto credentials represented in the smart contract using the multi-token standard. The system may also represent the skill set of the user at a high granularity based on the series of on-chain crypto credentials.

In an embodiment, the system may be configured to generate a search interface for the NFT based electronic marketplace. For example, the search interface may include a graphical user interface (GUI) that may receive a user input. The system may be configured to convert the user input to a query vector that indicates a search criteria associated with a plurality of non-tangible assets. The system may be configured to retrieve ranked results from a database based on a similarity between the search criteria (e.g. query vector) and the plurality of non-tangible assets (e.g. target vectors associated with the multi-token standard). The system may be configured to control display of the ranked results on the search interface. The system may thereby enable the large-sized game developers to connect with individual game developers on the NFT based electronic marketplace. The system may further enable search for validated and unique set of skills on the NFT-based electronic marketplace, and employ the skills of the user for developing game content or other services, while enabling the large-sized game developers to enhance the richness of their games.

In an embodiment, the system may be configured to control connection between a plurality of platforms in the NFT-based electronic marketplace such that the skill and the digital token are accessible across the plurality of platforms. Each platform of the plurality of platforms may correspond to a specific application (e.g. game art, metaverse, interior design, product design, etc.) of the skill. The system may thereby enable interoperability across various use case scenarios for employing the skill set acquired by the user.

FIG. 1 is a diagram of an exemplary network environment for artificial intelligence (AI) based skill tracking and non-fungible token (NFT) based skill/behavior representation, in accordance with an embodiment of the disclosure. With reference to FIG. 1, there is shown a block diagram of a network environment 100. In the network environment 100, there is shown a system 102 that may include an AI model 104. In the network environment 100, there are further shown an online environment 106, a user device 108 associated with a user 118, a database 112, a distributed ledger technology (DLT) network 114, and an NFT-based electronic marketplace 116. The user device 108 may include a digital wallet 120. In the network environment 100, there is further shown a communication network 110 through which the system 102, the DLT network 114, the database 112, the NFT-based electronic marketplace 116, and the user device 108 may communicate with each other.

The system 102 may include suitable logic, circuitry, and interfaces that may be configured to acquire information associated with a non-tangible asset (e.g. skill or behavior) of the user 118 in the online environment 106, apply the AI model 104 on the acquired information, determine a proficiency level of a plurality of proficiency levels of the non-tangible asset of the user 118 based on the application of the AI model 104 on the acquired information, and assign, based on the determined proficiency level of the non-tangible asset of the user 118, a value to a digital token associated with the user 118. Examples of the system 102 may include, but are not limited to, a computing device, a mainframe machine, a server, a database server, a cloud server, an application server, a computer workstation, a desktop computer, a laptop, or an information processing device capable of executing the AI model 104, processing information, and interfacing with the online environment 106 and the DLT network 114. In an embodiment, the system 102 may provide the functionality of determining the proficiency level of the non-tangible asset of the user 118 and assigning a value to the digital token associated with the user 118 as a cloud-based service. The system 102 may be implemented using hardware including a processor, a microprocessor (e.g., to perform or control performance of one or more operations), a field-programmable gate array (FPGA), or an application-specific integrated circuit (ASIC). In some other instances, the system 102 may be implemented using a combination of hardware and software.

The AI model 104 may be a regression model which may be trained to identify a relationship between inputs, such as features in a training dataset and output labels. The AI model 104 may be defined by its hyper-parameters, for example, number of weights, cost function, input size, number of layers, and the like. The hyper-parameters of the AI model 104 may be tuned and weights may be updated to move towards a global minima of a cost function for the AI model 104. After several epochs of the training on the feature information in the training dataset, the AI model 104 may be trained to output a prediction result for a set of inputs. The prediction result may be indicative of a class label for each input of the set of inputs. For example, the AI model 104 may be trained to evaluate the non-tangible asset and track a progress of the acquisition of the non-tangible asset in the online environment 106.

The plurality of layers of the AI model 104 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the AI model 104. Outputs of each hidden layer may be coupled to inputs of at least one node in other layers of the AI model 104. Node(s) in the final layer may receive inputs from at least one hidden layer to output a result. The number of layers and the number of nodes in each layer may be determined from hyper-parameters of the AI model 104. Such hyper-parameters may be set before, while training, or after training the AI model 104 on a training dataset.

Each node of the AI model 104 may correspond to a mathematical function (e.g. a sigmoid function or a rectified linear unit) with a set of parameters, tunable during training of the AI model 104. The set of parameters may include, for example, a weight parameter, a regularization parameter, and the like. Each node may use the mathematical function to compute an output based on one or more inputs from nodes in other layer(s) (e.g. previous layer(s)) of the AI model 104. All or some of the nodes of the AI model 104 may correspond to the same or a different mathematical function.

In accordance with an embodiment, the system 102 may train the AI model 104 on a training dataset that includes a first set of parameters, such as, metadata and artifacts related to skills for each domain (e.g. gaming or non-gaming domain), description of skills, reference data (e.g. expert skill level) associated with each skill set, a skills evaluation framework for each skill set, a plurality of proficiency levels (e.g. expert, intermediate, novice, etc.) associated with each skill, and so on. In an example, artifacts in gaming domain may be associated with player skills such as screenshots, recording, or game state, etc. The AI model 104 may be trained on a second set of parameters to generate the smart contract based on the multi-token standard to uniquely represent the skill set of the users at different granularities. For example, the system 102 may input the training dataset to train the AI model 104.

In training the AI model 104, one or more parameters of each node of the AI model 104 may be updated based on whether an output of the final layer for a given input (from the training dataset) matches a correct result based on a loss function for the AI model 104. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The AI model 104 may include electronic data, which may be implemented as, for example, a software component of an application executable on the system 102. The AI model 104 may rely on libraries, external scripts, or other logic/instructions for execution by a processing device, such as the system 102. The AI model 104 may include code and routines, which when executed by a processor, enable a computing device, such as the system 102 to perform one or more operations, such as evaluation of the non-tangible asset and tracking of a progress of acquisition of the non-tangible asset in the online environment 106. Additionally or alternatively, the AI model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model may be implemented using a combination of hardware and software.

In some embodiments, the AI model 104 may be a neural network model. Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once)

YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the AI model 104 may be based on a hybrid architecture of multiple Deep Neural Networks (DNNs).

The online environment 106 may include suitable logic, circuitry, and interfaces that may be configured to provide a cloud-based service or a distributed network service for one or more of game development, gameplay, online learning, online commerce, etc. to an online community of users using a subscription-based model. For example, the online environment 106 may include an online gaming environment (e.g. PlayStation® Network) or online learning platform. In an embodiment, the non-tangible asset may comprise one of a skill or a skill set of the user 118. For example, the skill of the user 118 may correspond to a skill acquired from participation or activities in the online gaming environment or the online learning platform. In an example, the skill of the user 118 may include a gameplay skill, a content development skill, or a three-dimensional (3D) designing skill, a 3D modeling skill, a product design skill, etc. In an example, the skill of the user 118 may include skills from other domains, such as, surgery, software development, cooking, content development, legal practice, business development, aviation, and so on. The online environment 106 may include any platform that enables communication with user devices (e.g. user device 108). For example, the online environment 106 (e.g. online gaming environment) may communicate with the user device 108 to enable gameplay by the user 118. In another example, the online gaming environment may enable game development activities related to one or more games in the online gaming environment via the user device 108. The game development activities may include, but are not limited to, creation of avatars, skins, gaming tools, gaming characters, three-dimensional (3D) gaming environments, simulations, etc.

In an embodiment, the system 102 may deploy the AI model 104 in the online environment 106 to assist in the acquisition of a skill by the user 118 in a learning session, acquire information associated with the acquired skill in real time, track the progress of the acquisition of the skill in the learning session in real time, and evaluate the acquired skill with respect to the current trend in the NFT-based electronic marketplace 116 in real time. A person with ordinary skill in the art will understand that the scope of the disclosure may not be limited to implementation of the online environment 106 and the system 102 as separate entities. In certain embodiments, the functionalities of the system 102 may be incorporated in its entirety or at least partially in the online environment 106, without departing from the scope of the disclosure.

The user device 108 may include suitable logic, circuitry, interfaces, and/or code that may be configured to communicate with the online environment 106 and performs operations in the online environment 106. For example, the user device 108 may be used by the user 118 to perform operations in the online environment 106. In an example, the operations may include gameplay or content development in the online gaming environment. In an example, the user device 108 may include a digital wallet 120 that may store information of the digital token associated with the user 118 and/or the value of the digital token. The digital wallet 120 may be associated with identification information (e.g. user identifier) of the user. For example, the digital wallet 120 may be configured to store a fungible part of the digital token. In another example, the digital wallet 120 may store the information associated with the skill set of the user in the form of NFT using the multi-token standard. Examples of the user device 108 may include, but are not limited to, a mobile device, a desktop computer, a laptop, a computer workstation, a computing device, a mainframe machine, and so on.

The communication network 110 may include a communication medium through which the system 102, the DLT network 114, the database 112, the NFT-based electronic marketplace 116, and the user device 108 may communicate with each other. The communication network 110 may be one of a wired connection or a wireless connection. Examples of the communication network 110 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 112 may include suitable logic, circuitry, code, and/or interfaces that may be configured to store information associated with a plurality of non-tangible assets (e.g. skills, behavior) in the form of NFTs that may be indexed for search and retrieval. The information associated with NFTs may be retrieved from the database 112 based on a user query from the NFT-based electronic marketplace 116. Each NFT stored in the database 112 may be linked with a user identifier. In an embodiment, the database 112 may be integrated with the online environment 106 such that the minted NFT is linked to the user identifier native to the online environment 106. In accordance with another embodiment, the database 112 may be a non-distributed ledger (or a local) node. In some embodiments, the database 112 may be a document database that may store the transaction records in a JSON (JavaScript object notation) format. In some embodiments, the database 112 may include a distributed storage that may store data across different locations. In an embodiment, the database 112 may be implemented using hardware including a processor, a microprocessor (e.g., to perform or control performance of one or more operations), a field-programmable gate array (FPGA), or an application-specific integrated circuit (ASIC). In some other instances, the database 112 may be implemented using a combination of hardware and software.

The DLT network 114 may include a plurality of distributed ledgers. Each distributed ledger of the plurality of distributed ledgers may include a plurality of nodes. Each node may store transaction records associated with the non-tangible asset (e.g. skill) of the user 118, the determined proficiency level of the skill of the user 118, a series of on-chain credentials associated with a plurality of sub-skills of the user, etc. The transaction records may be included in a set of state objects, such as an initial state object and an updated version of the initial state object. In some embodiments, the plurality of distributed ledgers may be decentralized and distributed database systems, which may maintain an immutable record of data operations or transactions. A set of data operations may be grouped together as a block and may be further linked to a previous block of data operations to form a chain of blocks. All blocks of data operations may be stored in a decentralized manner, whereby at least two participants or nodes of each distributed ledger of the plurality of distributed ledgers may store a subset of blocks associated with one or more transactions in which the at least two participants or nodes may participate. By way of example, and not limitation, the plurality of distributed ledgers of the DLT network 114 may include a Corda® blockchain, an Ethereum® blockchain, or a Hyperledger® blockchain.

The plurality of distributed ledgers of the DLT network 114 may use secure cryptographic hashes to identify parties and data, and also to link a state object to a previous version of the state object to further provide a chain of provenance. A transaction between a group of parties may be stored (as an associated transaction record) on the respective distributed ledgers such that only the group of parties associated with the transaction may be able to view the transaction. A party associated with a transaction may store a current state object of the transaction in a vault (i.e. a database associated with a respective distributed ledger). Another party eligible to view or process the transaction (e.g., validate the transaction) may retrieve the current state object of the transaction from the vault.

Each of the plurality of distributed ledgers of the of the DLT network 114 may update a transaction by updating state properties of an input state object to produce an output state object. The updated transaction may thereby create a chain of provenance which may be associated with the transaction data. Each of the plurality of distributed ledgers may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a uniqueness of the updated transaction may be determined based on a check that there exists no other transaction that has reached a consensus by use of the same input state object as the current transaction.

In accordance with an embodiment, each of the plurality of distributed ledgers of the DLT network 114 may be associated with a decentralized application that may include a client-side interface and a server-side interface. The decentralized application may be configured to implement a workflow (e.g., a Corda® workflow, Hyperledger® workflow, or Ethereum® workflow, etc.) to record a transaction (and thereby store an associated transaction record) on a node of the respective distributed ledger of the plurality of distributed ledgers.

The NFT-based electronic marketplace 116 may include suitable logic, circuitry, code, and/or interfaces that may be configured to provide a front-end for search and retrieval of information (e.g. NFT representation of skills) stored in the database 112. For example, the NFT-based electronic marketplace 116 may include a user interface (UI) layer that generates one or more graphical user interfaces for receiving search queries and displaying search results. The NFT-based electronic marketplace 116 may include application software and various scripts for data presentation and data interchange with user devices (e.g. user device 108). The skills acquired by the user 118 through the online environment 106 may be showcased in the NFT-based electronic marketplace 116 in the form of NFTs. The access to the NFT-based electronic marketplace 116 may be based on user credentials associated with the user 118 (e.g. user learning skills in the online environment 106), expert users, individual game developers, large-sized game developers, and administrators of the NFT-based electronic marketplace 116.

In operation, a gameplay session or a learning session of the user 118 may be in progress or may have ended in the online environment 106. During the gameplay session or a learning session, the system 102 may control the AI model 104 (e.g. an AI agent) to assist acquisition of a non-tangible asset (e.g. skill or behavior) by the user 118 in the online environment 106. The system 102 may acquire information associated with the non-tangible asset (e.g. skill or behavior) of the user 118 in the online environment 106. The skills may represent lower techniques and methods, and the behavior may represent higher level intelligent behavior such as strategy, pattern, etc. For example, the AI agent may determine that the user 118 has successfully completed a game level or has performed a maneuver at a specific performance level during the gameplay session. In another example, the AI agent may determine that the user 118 has read though a course content, and has successfully completed a test during a learning session. The system 102 may determine that the user 118 has acquired a skill based on the activities of the user 118 during the gameplay session or the learning session. The skill acquired by the user 118 may comprise one of gameplay skill, game development skill, or other domain skills in the online environment 106.

In an embodiment, the system 102 may apply the AI model 104 on the acquired information associated with skill. The AI model 104 may be trained to evaluate the skill and track a progress of the acquisition of the skill in the online environment 106. For example, the AI model 104 may track the progress of the skill in real time during the gameplay session or the learning session based on the progress in the game, the amount of time spent playing the game, the level achieved in the game, the ability to perform tricky or difficult maneuvers in the game, and so on.

In an embodiment, the system 102 may determine a proficiency level of a plurality of proficiency levels of the non-tangible asset (e.g. skill) of the user 118 based on the application of the AI model 104 on the acquired information. For example, the proficiency levels may include, but are not limited to, novice, beginner, intermediate, or expert. A proficiency level of the skill of the user 118 may indicate a status of the user 118 with respect to a reference skill level in the NFT-based electronic marketplace 116.

In an embodiment, the system 102 may assign, based on the determined proficiency level of the skill of the user 118, a value (e.g. asset value) to a digital token associated with the user 118. In an embodiment, the digital token may comprise a non-fungible token (NFT) associated with the DLT network 114 (e.g. blockchain). The system 102 may control the AI model 104 to track the progress of the skill of the user 118 across the plurality of proficiency levels or to identify acquisition of a new skill in the online environment 106. In an embodiment, the system 102 may control the AI model 104 to evaluate the skill based on the tracked progress and current trend data in an NFT-based electronic marketplace 116. The system 102 may evaluate the new skill based on the current trend data in the NFT-based electronic marketplace 116. The system 102 may update the value of the digital token based on the evaluation. In an embodiment, the circuitry 202 may be configured to allocate a new digital token based on the acquisition of the new skill. The system 102 may thereby provide AI model-based evaluation and blockchain-based validation of the skills acquired by the user 118, and may enable the skills to be showcased as validated assets on the DLT network 114 (e.g. blockchain) in the form of the NFT associated with the user 118. Details of the evaluation of the skills are further described, for example, in FIGS. 6-8D.

In an embodiment, the system 102 may be configured to control generation of a smart contract based on a multi-token standard that represents different types of the digital token. In an embodiment, the smart contract may represent the plurality of sub-skills as a series of on-chain crypto credentials based on the multi-token standard, where each credential of the series of on-chain crypto credentials may represent one of a plurality of sub-skills associated with the skill set of the user 118. For example, the smart contract may represent the plurality of sub-skills as a target vector (e.g. a vector of Booleans), which indicates whether or not the user possesses a corresponding sub-skill of the plurality of sub-skills. The system 102 may thereby identify the uniqueness of the skill set of the user 118 based on the series of on-chain crypto credentials represented in the smart contract using the multi-token standard. The system 102 may also represent the skill set of the user 118 at a high granularity based on the series of on-chain crypto credentials. Details of the multi-token standard for representing the skill set are further described, for example, in FIG. 9.

In an embodiment, the system 102 may be configured to generate a search interface for the NFT-based electronic marketplace 116. For example, the search interface may include a graphical user interface (GUI) that may receive a user input. The system 102 may be configured to convert the user input to a query vector that indicates a search criteria associated with a plurality of non-tangible assets (a plurality of skills). The system may be configured to retrieve ranked results from the database 112 based on a similarity between the search criteria (e.g. query vector) and the plurality of non-tangible assets (e.g. target vectors associated with the multi-token standard). The system 102 may be configured to control display of the ranked results on the search interface. The system 102 may thereby enable the large-sized game developers to connect with individual game developers on the NFT-based electronic marketplace 116. The system 102 may further enable search for validated and unique set of skills on the NFT-based electronic marketplace 116, and employ the skills of the user 118 for developing game content or other services, while enabling the large-sized game developers to enhance the richness of their games. Details of the search interface for the NFT-based electronic marketplace 116 are further described, for example, in FIG. 10.

In an embodiment, the digital token associated with the user 118 may include a fungible part (e.g. a fungible token) and the non-fungible part (e.g. non-transferable skill representation). In an embodiment, the system 102 may be configured to associate each sub-skill of the plurality of sub-skills with the fungible token. The fungible token may be earned based on the proficiency level of a corresponding sub-skill of the plurality of sub-skills. The system may be further configured to transfer at least one of the fungible token or the value of the digital token to the digital wallet 120 of the user device 108. In another embodiment, the fungible part and the non-fungible part may be stored in the digital wallet 120. In an embodiment, the system 102 may receive a user input. The system 102 may control, based on the received user input and the smart contract, execution of a transaction associated with one or more sub-skills of the plurality of sub-skills based on at least one of the fungible token or the value of the digital token in the NFT-based electronic marketplace 116.

In an embodiment, the system 102 may be configured to control connection between a plurality of platforms in the NFT-based electronic marketplace 116 such that the skill and the digital token are accessible across the plurality of platforms. Each platform of the plurality of platforms may correspond to a specific application (e.g. game art, metaverse, interior design, product design, etc.) of the skill. The system 102 may thereby enable interoperability across various use case scenarios for employing the skills acquired by the user 118. Details of the interoperability across various use case scenarios are further described, for example, in FIG. 12.

In an embodiment, the system 102 may determine a similarity between the proficiency level of the skill (e.g. avatar creation skill) of the user 118 and the reference proficiency level of the skill of an expert in the NFT-based electronic marketplace 116. The system 102 may classify the avatar creation skill of the user 118 to be one of novice, beginner, intermediate, or expert based on the comparison of the proficiency level of the avatar creation skill with the reference proficiency level of the avatar creation skill available in the NFT-based electronic marketplace 116. The system 102 may also classify the skills of the user 118 in accordance with real-world popularity/demand data based on the platform(s).

In an embodiment, the system 102 may control the AI model 104 track the progress of the skill (e.g. avatar creation skill) of the user 118 across the plurality of proficiency levels (e.g. novice, beginner, intermediate, or expert) in real time. For example, the AI model 104 may track the avatar creation skill of the user 118, and may determine the avatar creation skill has improved with time. In another example, the AI model 104 may determine that a gaming skill of the user 118 has upgraded in the online environment 106 with every gameplay session. The system 102 may evaluate the skill (e.g. avatar creation skill or gaming skill) based on the tracked progress of the skill and the current trend of the skill in the NFT-based electronic marketplace 116. The system 102 may then update the value of the digital token based on the evaluation of the skill.

Figure 2:
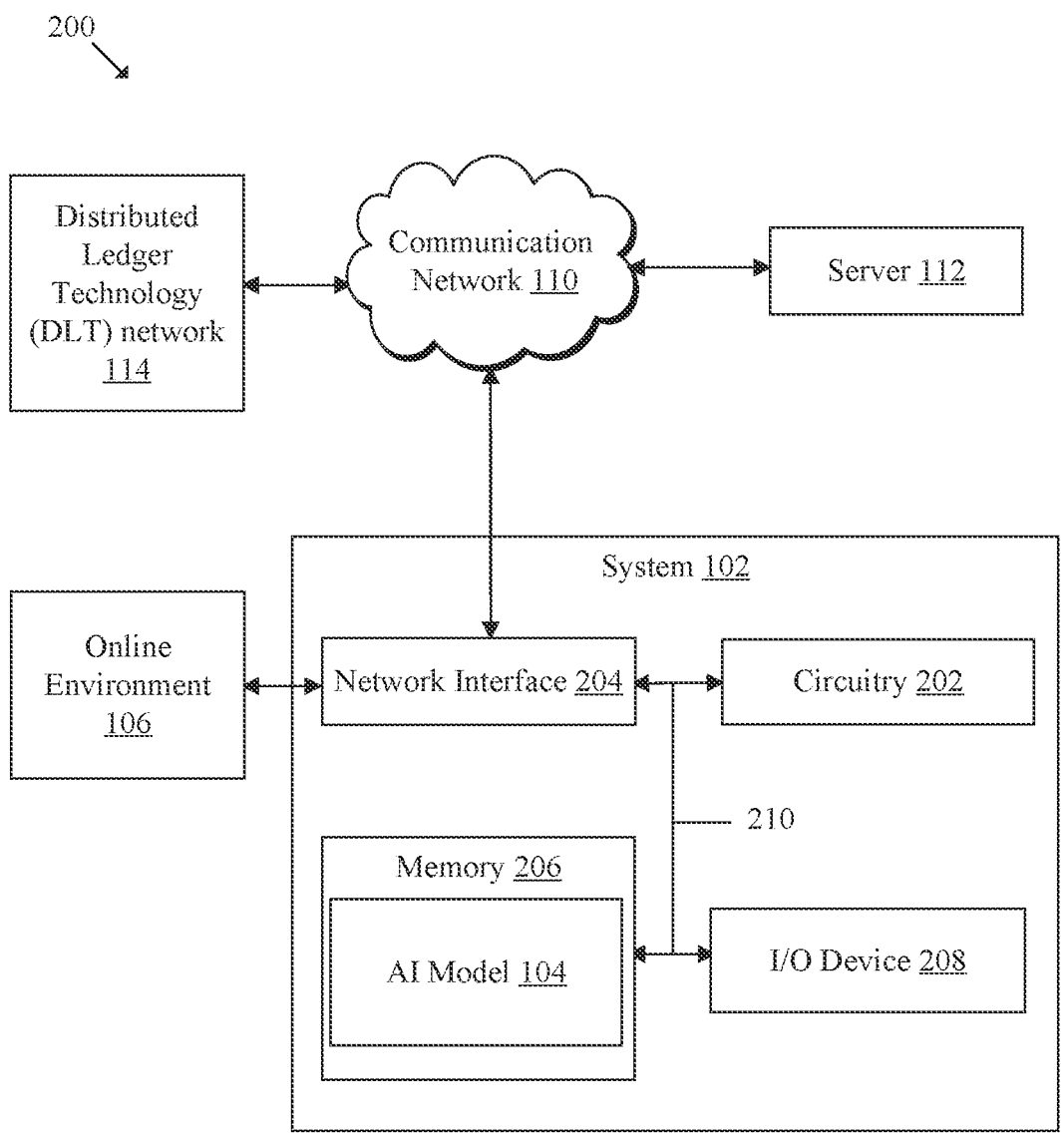
FIG. 2 is an exemplary block diagram of a system for artificial intelligence (AI) based skill tracking and non-fungible token (NFT) based skill/behavior representation, in accordance with an embodiment of the disclosure.

FIG. 2 is an exemplary block diagram of a system for artificial intelligence (AI) based skill tracking and non-fungible token (NFT) based skill/behavior representation, in accordance with an embodiment of the disclosure. FIG. 2 is explained in conjunction with elements from FIG. 1. With reference to FIG. 2, there is shown a block diagram 200. The block diagram 200 may include circuitry 202, a memory 206, an input/output (I/O) device 208, and a network interface 204. The memory 206 may include the AI model 104.

The circuitry 202 may include suitable logic, circuitry, and interfaces that may be configured to execute program instructions associated with different operations to be executed by the system 102. For example, some of the operations may include acquisition of the information associated with the non-tangible asset of the user 118 in the online environment 106, application of the AI model 104 on the acquired information, determination of the proficiency level of the plurality of proficiency levels of the non-tangible asset of the user 118 based on the application of the AI model 104 on the acquired information, and assigning, based on the determined proficiency level of the non-tangible asset of the user 118, a value to the digital token associated with the user 118. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 206 may include suitable logic, circuitry, and interfaces that may be configured to store the one or more instructions to be executed by the circuitry 202. The memory 206 may be configured to store the AI model 104 and the training dataset of the AI model 104. The memory 206 may be further configured to store information associated with the plurality of digital tokens. The memory 206 may be further configured to store information associated with the smart contract. The memory 206 may be further configured to store transaction records. The memory 206 may be configured to store human-in-the-loop deep reinforcement learning (DRL) framework. The memory 206 may be configured to store information associated with a plurality of non-tangible assets (e.g. skills). Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from a user, and provide an output based on the received input. The I/O device 208 may receive user input for execution of a transaction associated with one or more sub-skills of the plurality of sub-skills based the value of the digital token in the NFT-based electronic marketplace 116. The I/O device 208 may receive a query for searching the database 112 for non-tangible assets (e.g. skills) stored in the database 112. The I/O device 208 which may include various input and output devices, may be configured to communicate with the circuitry 202. Examples of the I/O device 208 may include, but are not limited to, a touch screen, a keyboard, a mouse, a joystick, a microphone, a display device, and a speaker.

The network interface 204 may include suitable logic, circuitry, and interfaces that may be configured to facilitate communication between the circuitry 202, the user device 108, the DLT network 114, the online environment 106, and the NFT-based electronic marketplace 116 via the communication network 110. The network interface 204 may be implemented by use of various known technologies to support wired or wireless communication of the system 102 with the communication network 110. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 204 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the system 102 may also include other suitable components, in addition to the components which are illustrated herein to describe and explain the function and operation of the present disclosure. A detailed description for the other components of the system 102 has been omitted from the disclosure for the sake of brevity.

Figure 3:
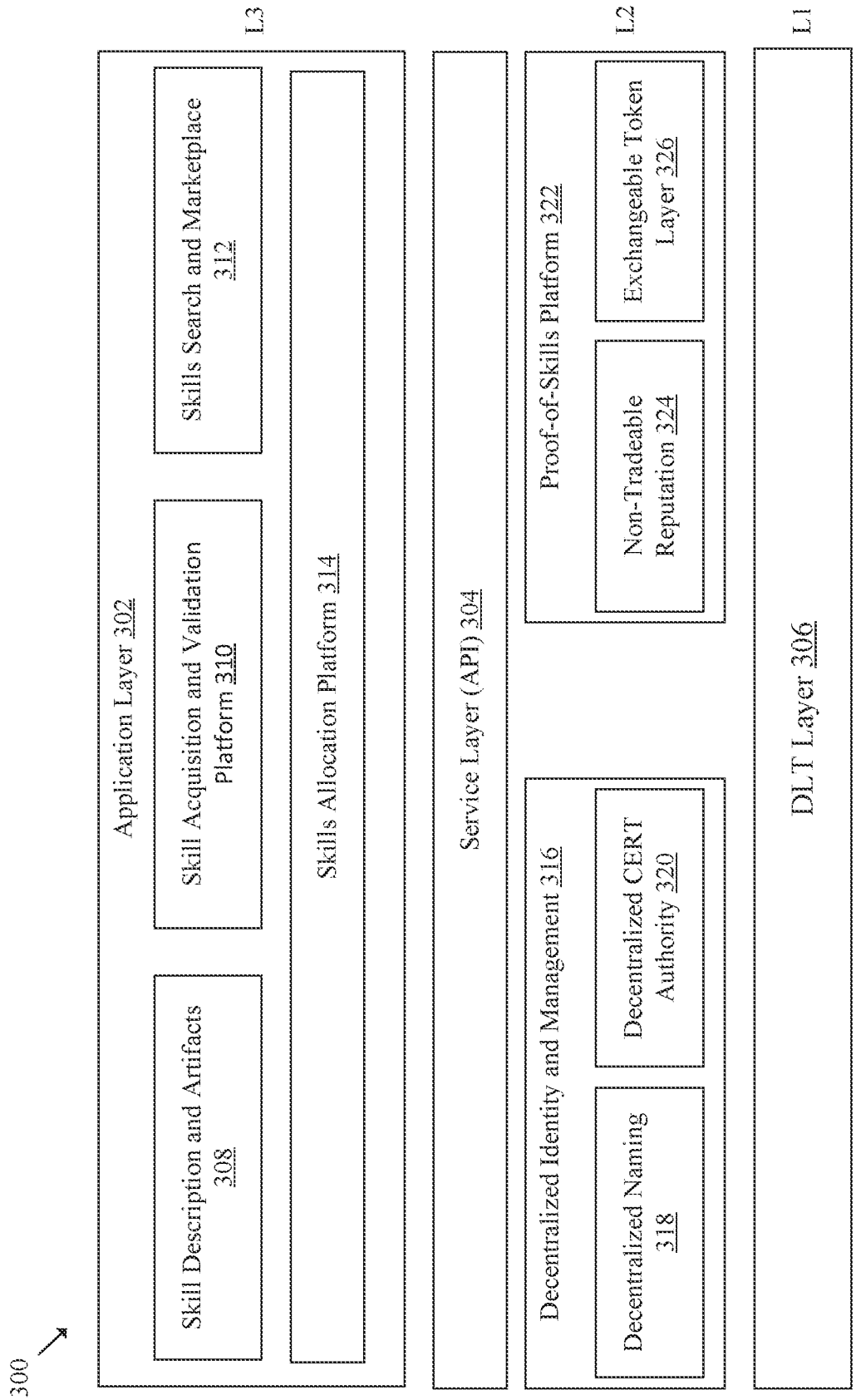
FIG. 3 is an exemplary diagram that illustrates an architecture of a system for artificial intelligence (AI) based skill tracking and non-fungible token (NFT) based skill/behavior representation, in accordance with an embodiment of the disclosure.

FIG. 3 is an exemplary diagram that illustrates an architecture of a system for artificial intelligence (AI) based skill tracking and non-fungible token (NFT) based skill/behavior representation, in accordance with an embodiment of the disclosure. FIG. 3 is explained in conjunction with elements from FIGS. 1 and 2. With reference to FIG. 3, there is shown an architecture diagram 300 for artificial intelligence (AI) based skill tracking and non-fungible token (NFT) based skill representation. In the architecture diagram 300, there are shown a DLT layer (e.g. layer L1), layer L2 which includes decentralized identity and management 316 and proof-of-skills platform 322, an application layer 302 (e.g. layer L3), and a service layer 304 (e.g. application programming interface (API) layer).

The application layer 302 may include skill description and artifacts 308, a skill acquisition and validation platform 310, a skills search and marketplace 312, and a skills allocation platform 314. In an embodiment, the skill description and artifacts 308 may include description of a plurality of skills and storage of artifacts. For example, the description of a skill may include information that describes features of the skill. For example, a skill of driving a vehicle with driving assistance systems may include, but are not limited to, perception related skills of a driver of the vehicle, understanding of conditions, ability to act under different situations, understanding of traffic rules, and motivation to act under different situations. The details of skills and behavioral aspects that define driving performance are further described, for example, in FIGS. 8A-8D. In an embodiment, the description of the plurality of skills may be stored in the database 112. In another embodiment, the description of the plurality of skills may be stored in the memory 206. The system 102 may access the description of the plurality of skills from the database 112 or the memory 206 for evaluation of the skills.

In an embodiment, the skill acquisition and validation platform 310 may acquire and use information associated with the skill of the user 118 in the online environment 106. In an embodiment, the skill acquisition and validation platform 310 may acquire information associated with the skill from an external environment. In another embodiment, the skill acquisition and validation platform 310 may compare the acquired information associated with the skill with the description of skills in the skill description and artifacts 308. Based on a degree of the match between the acquired information associated with the skill and the description of skills in the skill description and artifacts 308, the skill allocation and validation platform 310 may validate the skill in the online environment 106. For example, the skill allocation and validation platform 310 may validate the skill based on the degree of match being greater than or equal to a threshold value.

In an embodiment, the skills search and marketplace 312 may include applications and interfaces for the NFT-based electronic marketplace 116, and search features in the NFT-based electronic marketplace 116. The details of the search interface and the NFT-based electronic marketplace 116 are described, for example, in FIG. 10. The skills search and marketplace 312 may provide real-time search functionality and marketplace for specific skillsets. The skills search and marketplace 312 may enable a user (e.g. a large-sized game developer) to search for skills available in the NFT-based electronic marketplace 116 with different search criteria (e.g. application area, proficiency level, expertise, skill type, etc.).

In an embodiment, the skills allocation platform 314 may allocate the skill or the skill set to the digital token (e.g. NFT), which may be made available in the NFT-based electronic marketplace 116 for enabling equal access to opportunity for the skill. In an example, the skill or the skill set may include player skills that may be mapped or allocated for a set of tasks/services in a different platform or a different online environment. Player skills may be mapped and allocated for another set of tasks in a different platform (in exchange for fungible tokens). The skills allocation platform 314 may attach and transfer ERC-20 tokens for ERC1155 based NFT, buy/sell/auction NFT using on-chain NFT marketplace, stake ERC1155 based NFT for ERC20 rewards, provide functionality to receive royalty payment for usage of skills as AI agents (using ERC2981 royalty standard).

In an embodiment, the service layer 304 may act as an interface between the application layer 302 and the layer L2 which includes the decentralized identity and management 316 and proof-of-skills platform 322. The service layer 304 may define the services of the proof-of-skills platform 322 and the decentralized identity and management module 316 that are available to the applications on the gaming platform (such as the online environment 106). The decentralized identity and management 316 may enable either anonymous participation of the user 118 in the NFT-based electronic marketplace 116, or identity-based participation in the NFT-based electronic marketplace 116. For example, the decentralized identity and management 316 may manage the registration of a certain skill (e.g. avatar creation skill) with identity information of the user 118, or allow registration of the skill anonymously. In an embodiment, the decentralized identity and management 316 may include decentralized naming 318 and decentralized certification (CERT) authority 320. In an embodiment, the decentralized naming 318 may register the skill of the user either anonymously or with the identity information of the user. In an embodiment, the decentralized CERT authority 320 may certify the identity information and/or the skill registered by the user 118. In an example, the decentralized identity and management 316 may manage the skill and identity information in a decentralized manner to enable connection between different platforms. The decentralized identity and management 316 may enable skills-based identification of a player/expert/AI model, which enables decentralized way of participating in the NFT-based electronic marketplace 116.

In an embodiment, the proof-of-skills platform 322 may manage the digital token of the user 118. The proof-of-skills platform 322 may include non-tradeable reputation 324 that represents the skill of the user 118 using the non-fungible and non-transferable part of the digital token. The user's skills/behavior progression may be recorded on the blockchain. In an example, the progression and uniqueness of the skill set of the user 118 and proficiency level (e.g. novice, intermediate, expert) of the skill set may be represented by the non-fungible part of the digital token. The proof-of-skills platform 322 may include exchangeable token layer 326 that manages the fungible part of the digital token, which may be in exchange for the time allotted for a specific skill/skillset. The fungible part may be used for a transaction in the online environment 106 or a different environment. In an embodiment, the exchangeable token layer 326 may determine a value of the fungible part of the digital token in exchange for a service based on the proficiency level of the skill of the user 118. For example, the value of the fungible token in exchange for a service by an expert level user may be determined to be higher than the value of the fungible token in exchange for a service by an intermediate level user. In an example, the digital token may include a fungible token in accordance with ERC-20 standard and a non-fungible token (NFT) in accordance with ERC-721 standard. The system 102 may also support the NFT feature for homogenous (for example, Ethereum®-Ethereum®) and heterogenous (for example, Ethereum® and Hyperledger®) ecosystems. The fungible tokens may be exchanged for other services in the platform or for fiat money.

In an embodiment, the DLT layer 306 may select a type of the distributed ledger. For example, the system 102 may select from one of Solana® blockchain, Corda® blockchain, an Ethereum® blockchain, or a Hyperledger® blockchain. In an embodiment, the system 102 may select the type of the blockchain based on a user selection.

Figure 4A:
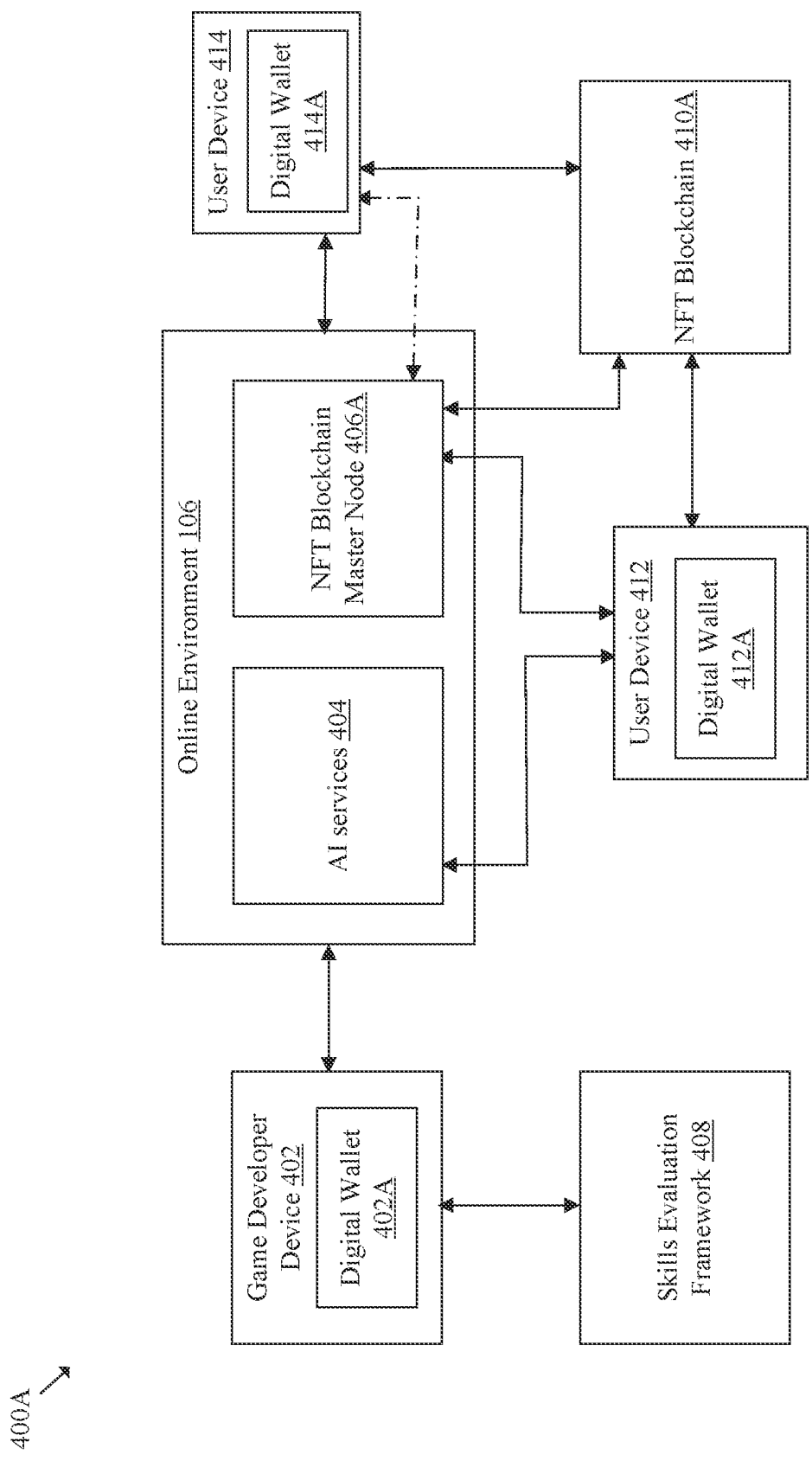
FIG. 4A is a block diagram that illustrates an exemplary scenario for non-fungible token (NFT) based skill/behavior evaluation and representation, in accordance with an embodiment of the disclosure.

FIG. 4A is a block diagram that illustrates an exemplary scenario for non-fungible token (NFT) based skill/behavior evaluation and representation, in accordance with an embodiment of the disclosure. FIG. 4A is explained in conjunction with elements from FIGS. 1-3. With reference to FIG. 4A, there is shown a block diagram 400A. In the block diagram 400A, there are shown the online environment 106, a game developer device 402, a skills evaluation framework 408, an NFT blockchain 410A, a user device 412, and a user device 414. The online environment 106 (e.g. PlayStation® Network) may include AI services 404 and an NFT blockchain master node 406A.

The game developer device 402 may be associated with the game developers who may define the skills evaluation framework 408. The game developer device 402 may include a digital wallet 402A that may store information of the digital token associated with the developer and/or the value of the digital token. The digital wallet 402A may be associated with identification information (e.g. user identifier) of the game developer. For example, the digital wallet 402A may be configured to store a fungible part of the digital token. In another example, the digital wallet 402A may store the information associated with a skill set of the developer in the form of NFT using the multi-token standard. The user device 412 may be associated with an expert or professional user that may teach their skills (e.g. gameplay skills or avatar creating skill) to the AI model 104. The user device 412 may include a digital wallet 412A that may store information of the digital token associated with the expert or professional user and/or the value of the digital token. The user device 414 may be associated with the individual developers or learner users. The user device 414 may include a digital wallet 414A that may store information of the digital token associated with the individual developers or learner user and/or the value of the digital token. In an embodiment, the user device 414 may be associated with a gaming scenario as indicated by a solid line between the user device 414 and the online environment 106. In another example, the user device 414 may be associated with learners in an online learning environment.

In an embodiment, the AI services 404 may include a machine teaching framework by which the game developers may teach the AI model 104 using inverse reinforcement learning (IRL) or human-in-the-loop learning (HITL). For example, the AI model 104 may be trained based on the skills or knowledge (e.g. gameplay skill) of the game developers or experts, and the trained AI model 104 in turn may teach leaner users (e.g. individual content creators or garners) in the online environment 106. In an embodiment, the AI services 404 may be configured to teach skills (e.g. avatar creation skills or gameplay skills) or insights to the individual developers or learner users. During the acquisition of the skills and insights, the AI services 404 may intervene and assist in the acquisition of the skills.

In another embodiment, the AI services 404 may acquire information associated with the acquired skills of the individual developers or learner users (e.g. content creator or garner) in the online environment 106 (e.g. online gaming environment). For example, the individual developer may be develop in-game NFT or content (such as a new avatar, a new skin for a gaming character, a new gaming level, or a new gaming weapon) in the online gaming environment based on the acquired skills and insights. The in-game NFT or content may be purchased by a garner or transferred to other garners, thereby transferring ownership of the in-game NFT.

In an embodiment, the NFT blockchain master node 406A may validate the minted NFTs prior to publishing on the NFT blockchain 410A. The NFT blockchain master node 406A may be configured to check and approve transactions with the NFT blockchain 410A. In an example, the NFT blockchain master node 406A may permit only those skills which are validated to be minted as NFTs on the NFT blockchain 410A.

In another embodiment, the user device 414 may be associated with non-gaming use case scenarios as indicated by a dotted line between the user device 414 and the NFT blockchain master node 406A. The non-gaming use cases may include driving user behavior in the online environment 106 (e.g. gaming network). For example, the games in the online environment 106 may offer rewards, such as visual modifications to the appearance of a player's avatar, based on the condition that the player utilizes two-factor authentication (2FA).

Figure 4B:
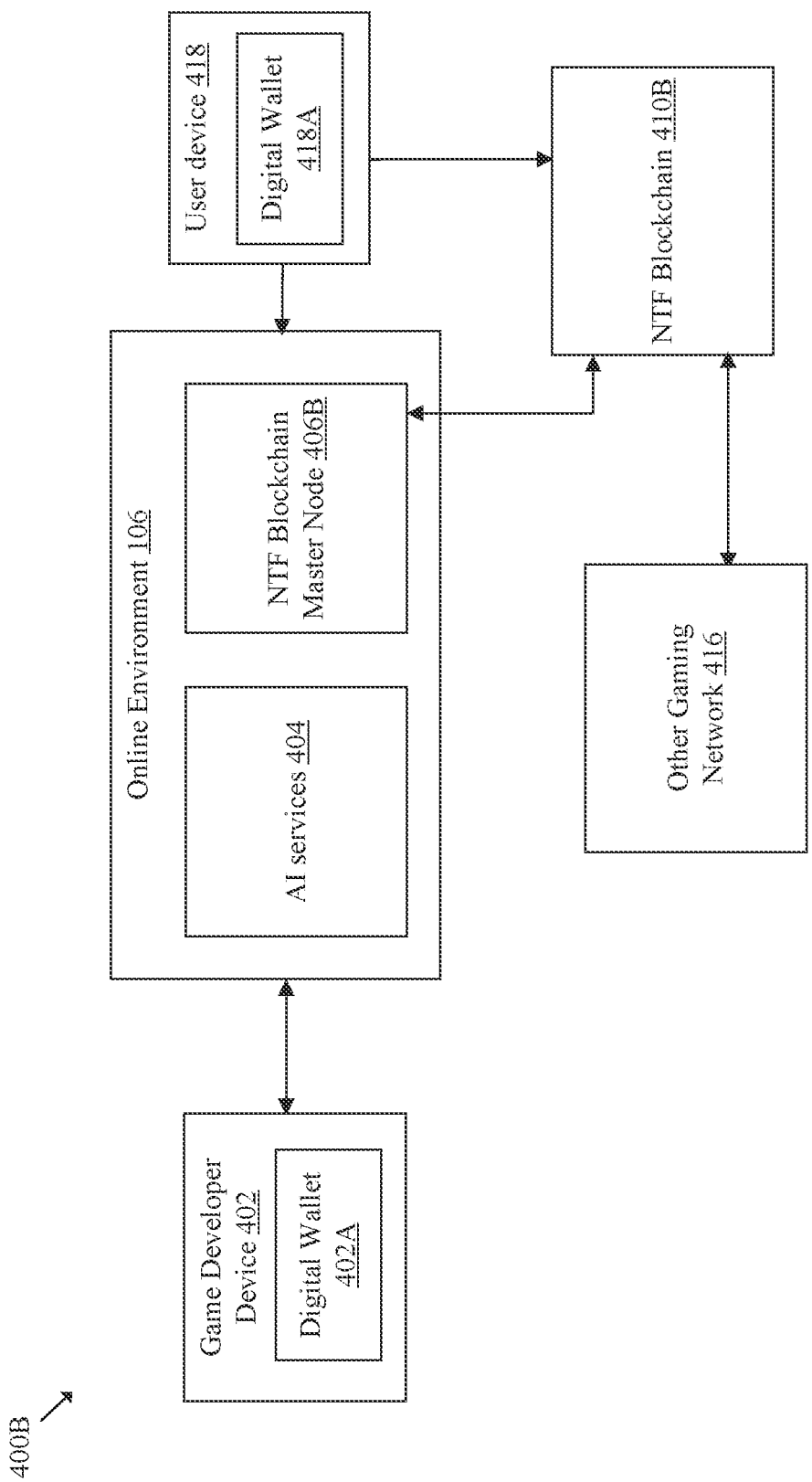
FIG. 4B is a block diagram that illustrates an exemplary scenario for non-transferable fungible (NTF) token based skill/behavior evaluation and representation, in accordance with an embodiment of the disclosure.

FIG. 4B is a block diagram that illustrates an exemplary scenario for non-transferable fungible (NTF) token based skill/behavior evaluation and representation, in accordance with an embodiment of the disclosure. FIG. 4B is explained in conjunction with elements from FIGS. 1-3 and 4A. With reference to FIG. 4B, there is shown a block diagram 400B. In the block diagram 400B, there are shown the online environment 106, a game developer device 402, non-transferable fungible (NTF) blockchain 410B, a user device 418, and other gaming networks 416. The online environment 106 (e.g. PlayStation® Network) may include AI services 404 and an NTF blockchain master node 406B. The user device 414 may be associated with the individual developers or creators.

In another embodiment, the digital token may include a non-fungible part and a fungible part. The non-fungible part of the digital token may represent the uniqueness of the skill and may be used for tracking progress of the skills. The fungible part of the digital token may represent a value earned through the skills in the NFT-based electronic marketplace 116. In an embodiment, the AI services 404 may represent the skills of the individual developers or creators in the form of non-transferable fungible tokens (NTFs), which may be used for allocation of skills in other platforms, such as the other gaming networks 416.

In an embodiment, the game developers associated with the game developer device 402 may validate the skills of the individual developers or users on the NTF blockchain 410B via the NTF blockchain master node 406B. In an embodiment, the fungible part of the digital token may be allocated for actions, services, or time allotted for a specific skill/skillset, and may be exchanged for other services in different platforms, but the part of the NTF that represents the skills may not be transferrable. The user device 418 may include a digital wallet 418A that may store information of the digital token associated with the user and/or the value of the digital token.

Figure 5:
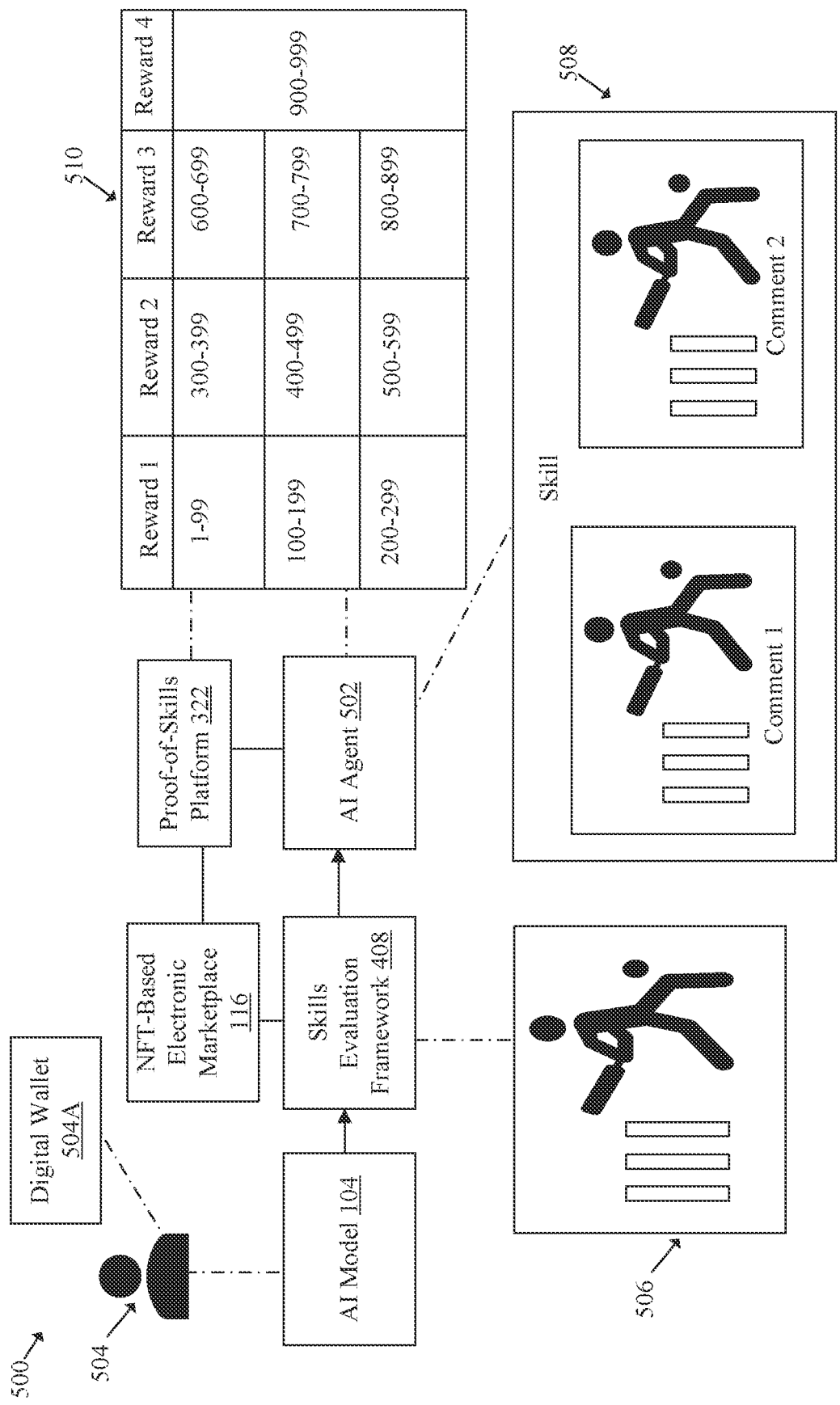
FIG. 5 is a diagram that illustrates an exemplary scenario for skill acquisition, skill tracking, and skill evaluation using an AI model, in accordance with an embodiment of the disclosure.

FIG. 5 is a diagram that illustrates an exemplary scenario for skill acquisition, skill tracking, and skill evaluation using an AI model, in accordance with an embodiment of the disclosure. FIG. 5 is explained in conjunction with elements from FIGS. 1-3, 4A, and 4B. With reference to FIG. 5, there is shown an exemplary scenario 500. In the exemplary scenario 500, there are shown the AI model 104, a skills evaluation framework 408, an AI agent 502, NFT-based electronic marketplace 116, and proof-of-skills platform 322.

In an embodiment, the AI model 104 may be trained on domain knowledge or skills (e.g. gameplay skills, avatar creation skills, or other skills) by an expert user 504 or game developers to obtain an AI agent 502. During the training phase of the AI agent 502, the developers or other domain experts may intervene and correct unreasonable actions of the AI agent 502 in real time. A skill may be a special kind of concept that is useful for performing a specific task. For example, skills may include tasks such as batting in baseball, playing chess, calibrating a machine, or flying a drone. In an example, the skill may include a batting technique or stroke in a game of cricket. The AI model 104 may be trained on the batting technique by the expert user 504. The expert user 504 may be associated with a digital wallet 504A that may store information of the digital token associated with the expert user 504 and/or the value of the digital token. The digital wallet 504A may be associated with identification information (e.g. user identifier) of the expert user 504.

In an embodiment, based on input from the game developers, the system 102 may integrate skills evaluation framework 408 and the trained AI agent 502 into the online environment 106 for a gameplay session 506. The skills evaluation framework 408 may include a skill description to evaluate the skill related to the batting technique and to classify the skill into one of the plurality of proficiency levels. For example, the skills evaluation framework 408 may include a skill description for each proficiency level of the plurality of proficiency levels.

In an embodiment, the batting technique may be learnt by the user 118 (e.g. learner) through practice in the gameplay session 506. In an embodiment, the AI agent 502 may intervene in the gameplay session 506 and correct the batting technique of the user 118. For example, the AI agent may demonstrate a skill 508 (e.g. batting technique or stroke) with instructions (e.g. comment 1 or comment 2) related to stance, contact position with ball, position of wrist, etc. to improve the skill of the user 118. Based on the skills evaluation framework 408, the AI model 104 may evaluate the skill related to the batting technique learned through the practice gameplay session. The AI model 104 may classify the skill as one of novice, beginner, intermediate, or expert based on a comparison of the performance of the user 118 in the gameplay session 506 and the skill description in the skills evaluation framework 408. The AI model 104 may further identify and classify a strategy of the user 118. A strategy may be a specific form of skill, such as a skill that best completes a task in a certain scenario. Strategies label courses of action that relate to other skills in specific ways. Strategies may include actions, such as bunting in baseball, the Queen's Gambit in chess, or landing a drone vertically versus landing a drone in a swooping motion.

In an embodiment, the AI agent 502 may track the progress of the skill of the user 118 in the gameplay session 506 and assign a reward 510 to the user 118. The reward may be assigned based on the proficiency level of the skill (e.g. batting technique). In an embodiment, the reward may be traded or exchanged for a value or an item of value in the online environment 106 or in other platforms. In an embodiment, the system 102 may identify users based on a unique skill or set of skills demonstrated by the user 118. For example, the skill may be "player can finish a particular move or level in a certain amount of time", or player's skill/move has a particular style signature," etc.

In an embodiment, the proof-of-skills platform 322 may manage the digital token of the user 118, such that the digital token is assigned based on the reward 510 assigned to the user 118 for the skill of the user 118 in the gameplay session 506. The proof-of-skills platform 322 represents the skill of the user 118 using the non-fungible and non-tradeable part of the digital token. In an example, the progression and uniqueness of the skill set of the user 118 and proficiency level (e.g. novice, intermediate, expert) of the skill set may be represented by the non-fungible part of the digital token. Further, expert user 504 may choose to use a pseudonymous identity to maintain privacy. The identity is established based on the proof-of-skill platform 322.

In an embodiment, the digital token assigned to the user 118 for the skill may represent a value in the NFT-based electronic marketplace 116. The value of the digital token may be monetary, non-monetary, or a combination of both. The user 118 may realize the value of the assigned digital token in the NFT-based electronic marketplace 116 by utilizing through the online environment 106.

Figure 6A:
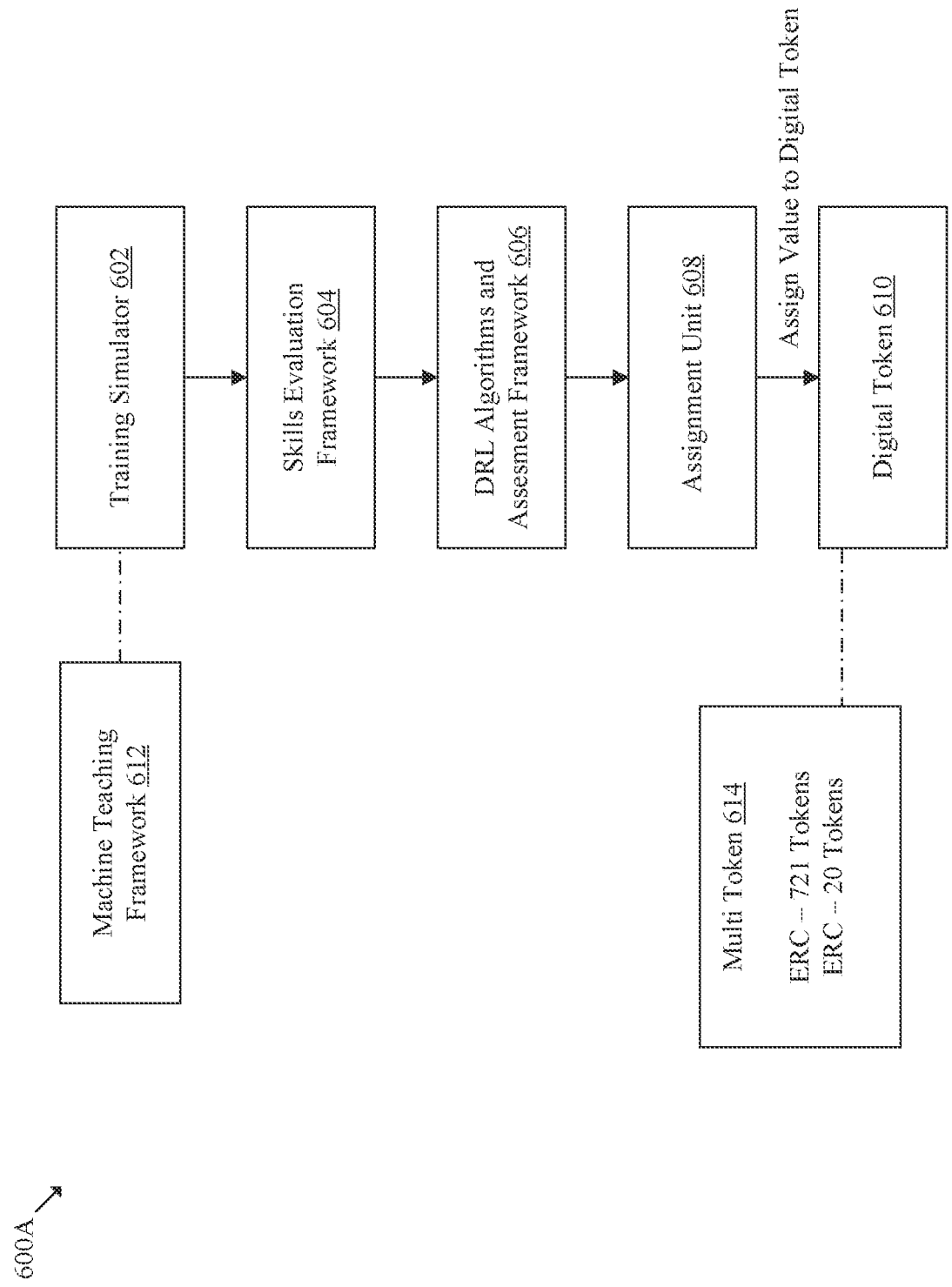
FIG. 6A is a diagram that illustrates an exemplary scenario for AI model based skill acquisition and skill evaluation and multi-token based skill/behavior representation, in accordance with an embodiment of the disclosure.

FIG. 6A is a diagram that illustrates an exemplary scenario for AI model based skill acquisition and skill evaluation and multi-token based skill/behavior representation, in accordance with an embodiment of the disclosure. FIG. 6A is explained in conjunction with elements from FIGS. 1-3, 4A, 4B, and 5. With reference to FIG. 6A, there is shown an exemplary block diagram 600A. In the exemplary block diagram 600, there are shown a training simulator 602, a skills evaluation framework 604, deep reinforcement learning (DRL) algorithms and assessment framework 606, an assignment unit 608, a digital token 610 in the form of a multi-token 614, and a machine teaching framework 612.

In an embodiment, the system 102 may develop the training simulator 602 based on the machine teaching framework 612. In an embodiment, the system 102 may develop the training simulator 602 for training the user 118 on a variety of skills, including gameplay skills, game development skills, or other domain skills (e.g. a surgical task, cooking skill, driving skill, etc.). The machine teaching framework 612 may include interfaces, tools, and libraries for development of the AI-based training simulator 602 using, for example, deep reinforcement learning (DRL). The machine teaching framework 612 allows expert humans to be integrated in the development of the training simulator 602.

In an embodiment, the training simulator 602 may include an AI agent to train the user 118 in the online environment 106 based on inverse reinforcement learning (IRL). For example, the AI agent may demonstrate the skill, and may enable the user 118 to acquire the skill from observing the demonstrated skill.

In an embodiment, the skills evaluation framework 604 may be used to determine a proficiency level of the skill acquired by the user 118 based on the training simulator 602. Details of the framework for evaluation of driving performance are further described, for example, in FIGS. 8A-8D. The system 102 may use the skills evaluation framework 604 to determine a semantic similarity between the skill acquired by the user 118 and a reference skill of an expert. In an example, the system 102 may apply a deep network (e.g. Evaluation Net) based on long short-term memory (LSTM) to determine the semantic similarity. The system may classify the proficiency level of the skill acquired by the user 118 based on the determined semantic similarity.

In an embodiment, the DRL algorithms and assessment framework 606 may employ inverse reinforcement learning (IRL) for the user 118 to acquire skills from the training simulator 602, human-in-the-loop DRL for expert humans to intervene and correct the actions of the AI agent, human-in-the-loop inverse DRL for the AI agent to intervene and correct the user 118, or hierarchical reinforcement learning. The assessment framework may be created by domain experts and may have granularity of proficiency levels. During the training process of the AI-based training simulator 602, a human-in-the-loop DRL framework may enable expert humans to intervene, guide, and correct unreasonable actions of the AI agent in real time.

In an embodiment, prior to production phase, the AI agent of the training simulator 602 may be required to achieve expert-level performance in multiple different tasks by learning the tasks from task-specific teachers. In an embodiment, the AI agent may be configured to be aware of the differences between different learning users. For the example, the AI agent may utilize a different teaching strategy or task structure for training an individual user, while maintaining the same lesson sequence used in a classroom setting. The AI agent may be configured to be aware of the preferences of the user 118 and the proficiency level of the user 118 for training the user 118. The AI agent may represent complex tasks by strategically structuring the complex tasks into incremental steps or sub goals in the IRL or human-in-the-loop framework.

In an embodiment, the assignment unit 608 may assign a value to the digital token 610 of the user 118 based on the proficiency level of the skill acquired by the user 118. In another embodiment, the assignment unit 608 may assign a new digital token (e.g. NFT) based on the acquisition of a new skill by the user 118. In another embodiment, the assignment unit 608 may assign a digital token (e.g. fungible token) based on achievements of the user 118 in the online environment 106. In an embodiment, the digital token 610 may be based on a multi-token standard that includes, but not limited to, the NFT in accordance with the ERC-720 standard and the fungible token in accordance with the ERC-20 standard. In an embodiment, the assignment unit 608 may generate a smart contract based on the multi-token standard that represents different types of the digital token. For example, the smart contract may be configured to represent a plurality of sub-skills of the user 118 as a series of on-chain crypto credentials based on the multi-token standard, where each credential of the series of on-chain crypto credentials may represent one of the plurality of sub-skills associated with the skill set of the user. The system 102 may thereby convert the skills, behavior, and achievements linked to the identity of the user to digital tokens on the DLT network 114. The system 102 may implement the token-based skill/behavior representation using other tokens, such as, ERC721 (Non-Fungible Tokens), ERC20 (Fungible Tokens), ERC2981 (Royalty Payments), ETH (decentralized autonomous organization (DAO) tokens), and so on. Although these tokens are based on the Ethereum 1155 as the multi-token standard, the tokens may be any represented in any other multi-token standard along with the equivalent tokens.

In an embodiment, the assignment unit 608 may associate each sub-skill of the plurality of sub-skills with the fungible token. In an example, the fungible token may be earned by providing a service based on the proficiency level of a corresponding sub-skill of the plurality of sub-skills. In another embodiment, the assignment unit 608 may transfer at least one of the fungible token or the value of the digital token to the digital wallet 120 of the user device 108.

In an embodiment, the assignment unit 608 may receive a user input. The assignment unit 608 may control, based on the received user input and the smart contract, execution of a transaction associated with one or more sub-skills of the plurality of sub-skills based on at least one of the fungible token or the value of the digital token in the NFT-based electronic marketplace 116.

Figure 6B:
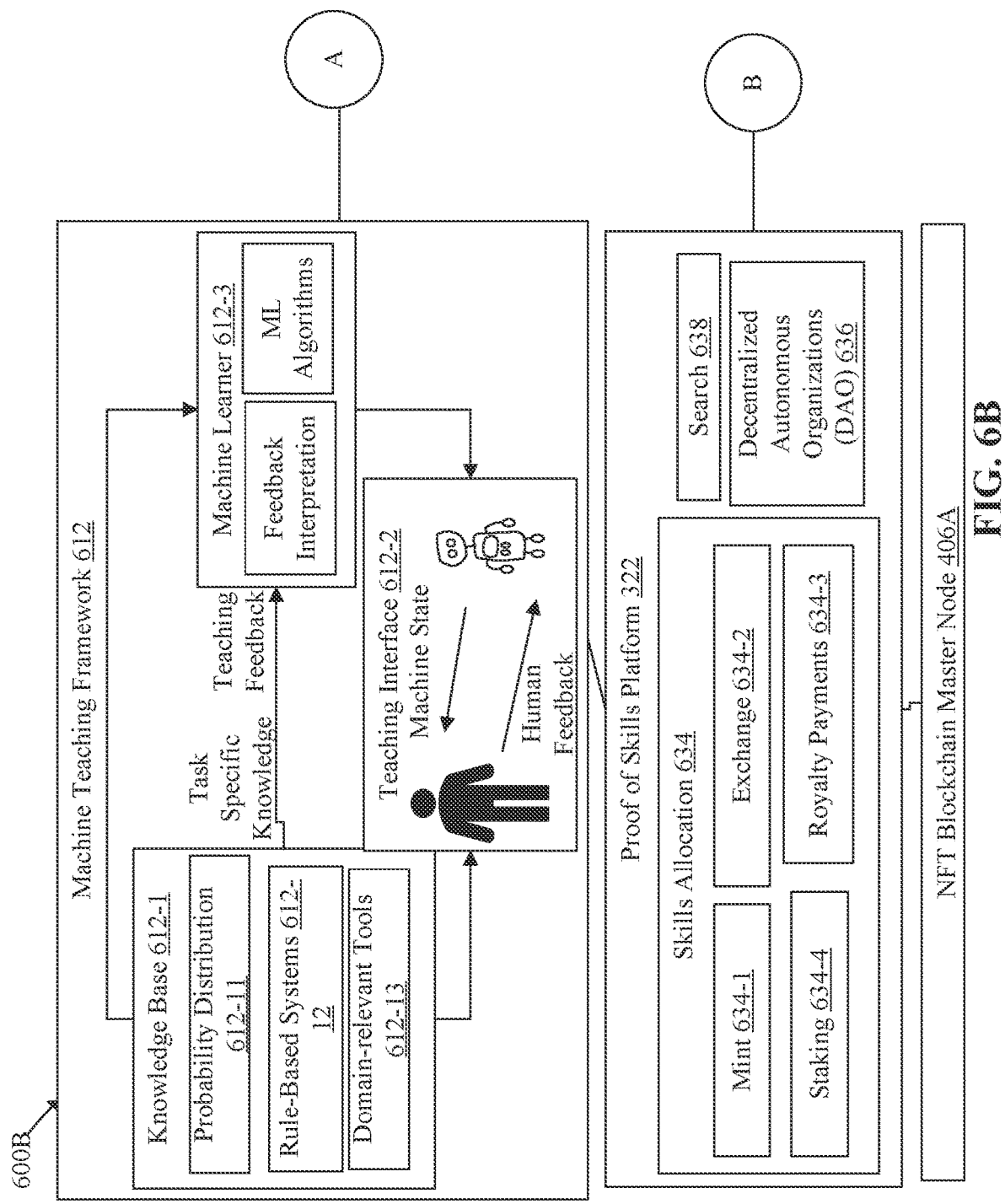
FIGS. 6B and 6C are diagrams that illustrates an exemplary scenario for machine teaching framework based core AI services, in accordance with an embodiment of the disclosure.
Figure 6C:
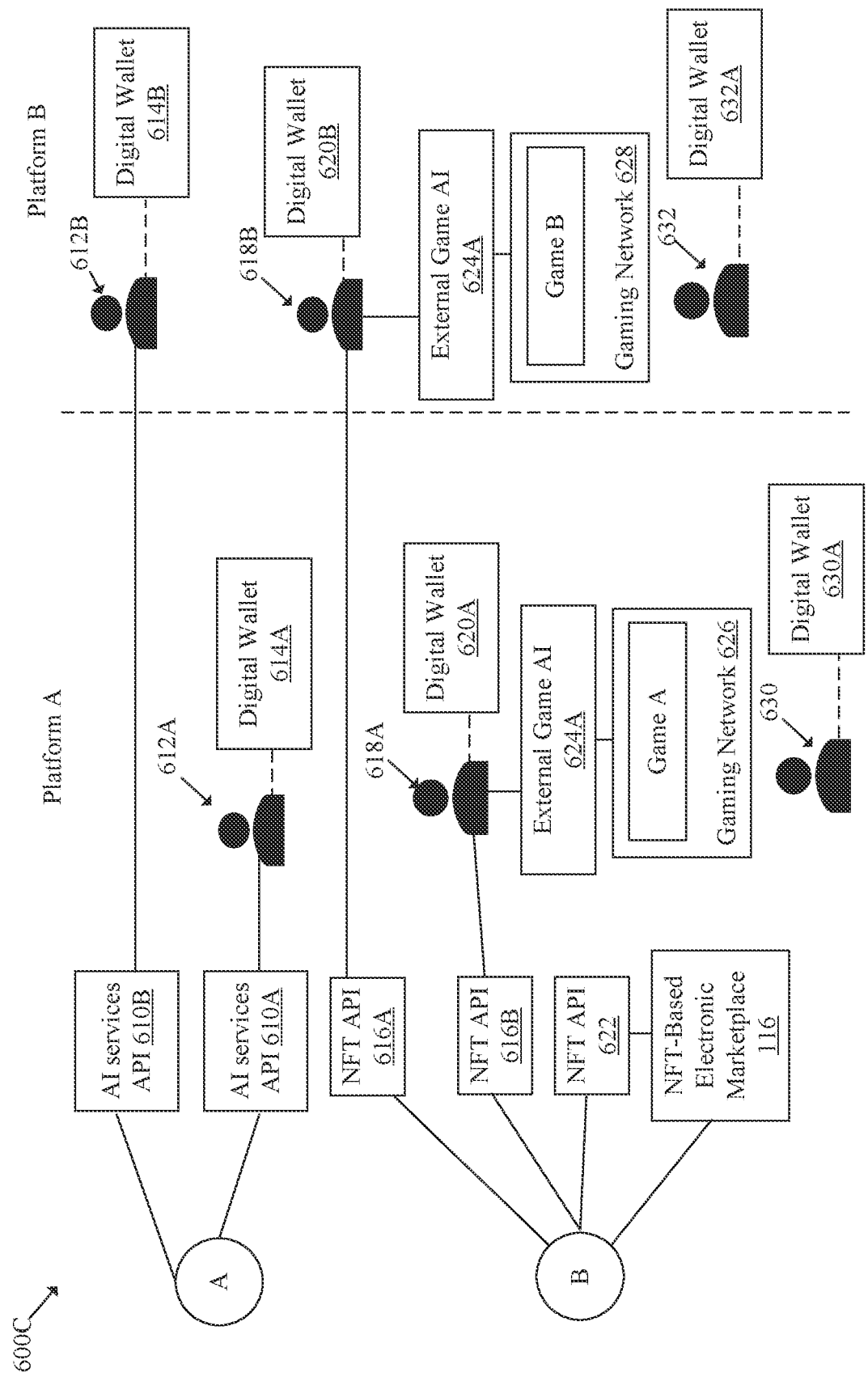

FIGS. 6B and 6C are diagrams that illustrates an exemplary scenario for machine teaching framework based core AI services, in accordance with an embodiment of the disclosure. FIGS. 6B and 6c are explained in conjunction with elements from FIGS. 1-3, 4A, 4B, 5, and 6A. With reference to FIG. 6B, there is shown an exemplary block diagram 600B. In the exemplary block diagram 600B, there are shown the machine teaching framework 612, the proof-of-skills platform 322, and the NFT blockchain master node 406A.

In an embodiment, the core AI services may include the machine teaching framework 612 for development of the training simulator 602. The machine teaching framework 612 may include a knowledge base 612-1, a teaching interface 612-2, and a machine learner 612-3. The knowledge base 612-1 may include task specific knowledge or domain knowledge to train the user 118. In an embodiment, the knowledge base 612-1 provides teaching assistance and recommendation to train the user 118. The knowledge base 612-1 may include probability distribution 612-11, rule based systems 612-12, and domain relevant tools 612-13.

The teaching interface 612-2 may provide an interface for humans to teach software agents or robots. The examples of software agents or robots may include, but are not limited to, AI agent 502. The teaching interface 612-2 may obtain teaching assistance or recommendation from the knowledge base 612-1 to provide teaching feedback to the machine learner 612-3. The teaching interface 612-2 may provide the task specific or the domain knowledge to the knowledge base 612-1. Further, the teaching interface 612-2 may provide teaching feedback to the machine learner 612-3.

The machine learner 612-3 may include feedback interpretation and ML algorithms. Based on the teaching feedback provided by the teaching interface 612-2, the machine learner 612-3 may select an example from an example repository to teach the AI agent 502. The machine learner 612-3 may provide the selected example to the teaching interface 612-2.

In an embodiment, the proof-of-skills platform 322 may include skills allocation 634, decentralized autonomous organizations (DAO) 636, search 638, decentralized exchange (DEX), and on-chain NFT marketplace. The proof-of-skills platform 322 may allocate a digital token of the user 118 for minting the skills/behavior on the DLT network 114. The skills allocation 634 may allocate the skill/behavior or the skillset to the digital token (e.g. NFT), which may be made available in the NFT-based electronic marketplace 116. The skills allocation 634 may include mint 634-1, exchange 634-2, royalty payments 634-3, and staking 634-4.

In an embodiment, the mint 634-1 may convert the skills of the user 118 into digital assets or crypto collections, such as the digital token in the NFT-based electronic marketplace 116. The staking 634-4 may attach the digital token to a specific platform or the online environment 106 through an NFT API. The digital token may be attached to the specific platform or the online environment 106 for a certain amount of time. The user 118 may receive a reward based on the attaching of the digital token to the specific platform or the online environment 106. The exchange 634-2 may enable exchange of the minted tokens across platforms. The royalty payments 634-3 may provide royalty payments each time the minted token is sold on the NFT-based electronic marketplace 116.

In an embodiment, the DAO 636 may enable the details of how processes are conducted across platforms (such as revenue sharing, etc.) through smart contracts. In an embodiment, the search 638 may receive an input (e.g. search query) from the NFT-based electronic marketplace 116. The description of the search 638 is further described, for example, in FIG. 10.

With reference to FIG. 6C, there is shown an exemplary block diagram 600C. In the exemplary block diagram 600C, there are shown APIs 610A, 610B, 616A, 616B, and 622, the NFT-based electronic marketplace 116, platform A, and platform B. In an example, a domain expert 612A of platform A may provide teachings to the core AI services through an AI services API 610A. Further, a domain expert 612B of a platform B may provide teachings to the core AI services through an AI services API 610B. Skills of the domain expert 612A may be minted as digital tokens and held in a wallet 614A associated with the domain expert 612A. Similarly, skills of the domain expert 612B may be minted as digital tokens and held in a wallet 614B associated with the domain expert 612B.

In an example, the skills of a game developer 618A of platform A may be minted using the proof-of-skills platform 322 using an NFT API 616B and held in a digital wallet 620A associated with the game developer 618A. Similarly, skills of a game developer 618B of platform B may be minted using the proof-of-skills platform 322 using an NFT API 616A and held in a digital wallet 620B associated with the game developer 618B. The game developer 618A and 618B may have access to external game AI 624A to develop the respective games.

In an example, skills of a user 630, playing game A on a gaming network 626, may be minted using the proof-of-skills platform 322 using an NFT API and held in a digital wallet 630A associated with the user 630. Similarly, skills of a user 632, playing a game B on a gaming network 628, may be minted using the proof-of-skills platform 322 using an NFT API and held in a digital wallet 632A associated with the user 632. The NFT API 622 may interface the proof-of-skills platform 322 and the NFT-based electronic marketplace 116.

FIG. 7 is an exemplary diagram that illustrates proficiency levels of a non-tangible asset of a user, in accordance with an embodiment of the disclosure. FIG. 7 is explained in conjunction with elements from FIGS. 1-3, 4A, 4B, 5, and 6. With reference to FIG. 7, there is shown an exemplary diagram 700. In the exemplary diagram 700, there are shown a plurality of sub-skills in association with a plurality of proficiency levels.

In an embodiment, the system 102 may determine the proficiency level of the user 118 based on the ability of the user 118 to perform one or more skills or sub-skills (sub-skill 1 to sub-skill 4) of a skill set (e.g. skill A), the ability to solve one or more problems, or the ability to perform one or more tasks or micro-tasks. In an example, the skill A may include a plurality of sub-skills (sub-skill 1, sub-skill 2, sub-skill 3, and sub-skill 4) to perform a plurality of micro-tasks (micro-task 1, micro-task 2, micro-task 3, and micro-task 4). For example, the system 102 may determine the proficiency level of the user 118 with respect to skill A to be "expert" based on the ability of the user 118 to perform all the sub-skills (the sub-skill 1, sub-skill 2, sub-skill 3, and sub-skill 4). In another example, the system 102 may determine the proficiency level of the user 118 to be "intermediate" based on the ability of the user 118 to perform sub-skill 2, sub-skill 3, and sub-skill 4 only. In another example, the system 102 may determine the proficiency level of the user 118 to be "beginner" based on the ability of the user 118 to perform sub-skill 3 and sub-skill 4 only. In another example, the system 102 may determine the proficiency level of the user 118 to be "novice" based on the ability of the user 118 to perform sub-skill 4 only.

In an embodiment, the system 102 may further classify each sub-skill of the plurality of sub-skills into a corresponding proficiency level of the plurality of proficiency levels based on the complexity of the skill set. In an embodiment, the system 102 may determine a similarity between a corresponding proficiency level of each sub-skill and a reference proficiency level of the expert in the NFT-based electronic marketplace 116. In an embodiment, the classification of each sub-skill into the corresponding proficiency level may be based on the determined similarity. The expert in the NFT-based electronic marketplace 116 may represent either an actual user having the ability to perform all the sub-skills of the skill set in the NFT-based electronic marketplace 116, or an imaginary user designated with the ability to perform all the sub-skills of the skill set. In an example, the extent of similarity between the corresponding proficiency level of each sub-skill and the reference proficiency level of the expert may be indicative of the proficiency level of the user 118. In this manner, the system 102 may determine the proficiency level of the skill of the user 118, track the progress of the skill of the user 118, and evaluate the skill of the user 118 based on the market current trend in the NFT-based electronic marketplace 116.

FIG. 8A is an exemplary diagram that illustrates an example of a skills evaluation framework, in accordance with an embodiment of the disclosure. FIG. 8A is explained in conjunction with elements from FIGS. 1-3, 4A, 4B, 5, 6, and 7. With reference to FIG. 8A, there is shown an exemplary scenario 800A.

In the exemplary scenario 800A, there is shown a framework for evaluation of the proficiency of a skill (e.g. driving using driver assistance system) of the user 118. The driving performance of the user 118 may be evaluated based on a plurality of parameters. The plurality of parameters may include a perception parameter and understanding of conditions. For example, the perception parameter corresponds to operational tasks based on skill-based behavior, and the understanding of conditions may correspond to tactical tasks based on skill-based behavior.

FIG. 8B is an exemplary diagram that illustrates an example of a skills evaluation framework, in accordance with an embodiment of the disclosure. FIG. 8B is explained in conjunction with elements from FIGS. 1-3, 4A, 4B, 5, 6, 7, and 8A. With reference to FIG. 8B, there is shown an exemplary scenario 800B.

In the exemplary scenario 800B, there is shown a framework for evaluation of the proficiency of a skill (e.g. driving using driver assistance system) of the user 118. The driving performance of the user 118 may be evaluated based on the plurality of parameters. The plurality of parameters may further include understanding of conditions. For example, the understanding of conditions may correspond to tactical tasks based on rule-based behavior and tactical tasks based on knowledge-based behavior.

FIGS. 8C and 8D are exemplary diagrams that illustrate an example of a skills evaluation framework, in accordance with an embodiment of the disclosure. FIGS. 8C and 8D are explained in conjunction with elements from FIGS. 1-3, 4A, 4B, 5, 6, 7, 8A, and 8B. With reference to FIG. 8C, there is shown an exemplary scenario 800C. With reference to FIG. 8D, there is shown an exemplary scenario 800D.

In the exemplary scenario 800C and the exemplary scenario 800D, there is shown a framework for evaluation of the proficiency of a skill (e.g. driving using driver assistance system) of the user 118. The driving performance of the user 118 may be evaluated based on the plurality of parameters. The plurality of parameters may further include ability to act and motivation to act. For example, the ability to act may correspond to operational tasks based on skill-based behavior.

Figure 9:
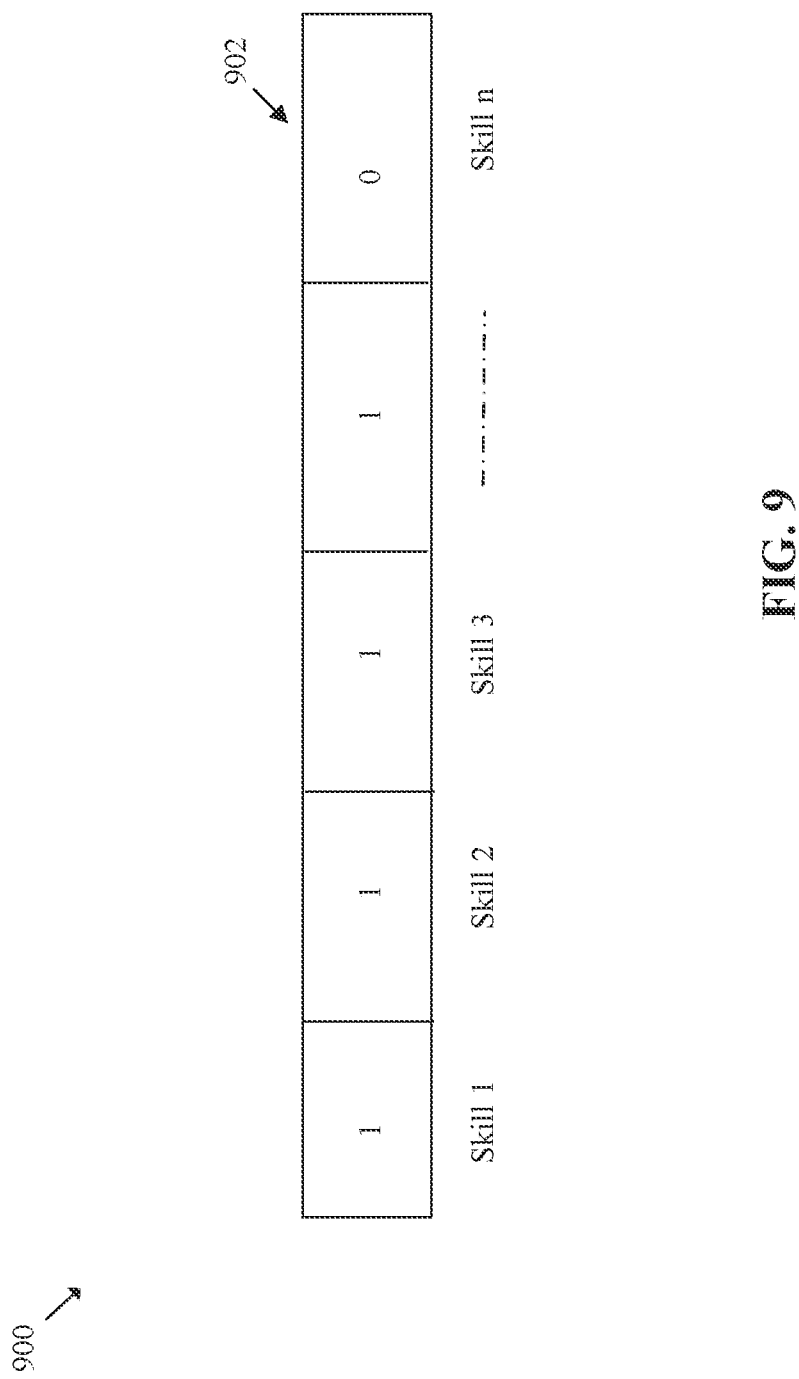
FIG. 9 is an exemplary diagram that illustrates an example of a multi-token representation of a non-tangible asset of a user based on multi-token standard, in accordance with an embodiment of the disclosure.

FIG. 9 is an exemplary diagram that illustrates an example of a multi-token representation of a non-tangible asset of a user based on multi-token standard, in accordance with an embodiment of the disclosure. FIG. 9 is explained in conjunction with elements from FIGS. 1-3, 4A, 4B, 5-7, 8A, 8B, 8C, and 8D. With reference to FIG. 9, there is shown an exemplary diagram 900. In the exemplary diagram 900, there is shown a multi-token representation 902 based on the multi-token standard.

In an embodiment, the system 102 may represent a plurality of skills (e.g. skill 1 to skill N) or a plurality of sub-skills of the user 118 using the multi-token representation 902. For example, the multi-token representation 902 may represent the plurality of skills in accordance with ERC-1155 standard in a single smart contract. The multi-token representation 902 may represent the plurality of skills as a series of on-chain crypto credentials based on the multi-token standard. Each credential of the series of on-chain crypto credentials may represent one of a plurality of skills associated with the skill set of the user. Each credential may be earned in the online environment 106 for solving a problem or the ability to perform a task. In an embodiment, the series of on-chain crypto credentials may be represented as non-transferable, fungible tokens (NTFs). The NTFs are non-transferable as the credential cannot be transferred to another user. The NTFs are fungible since all the users earn the NTF for solving the same problem or performing the same task.

In an embodiment, the multi-token representation 902 may represent the plurality of sub-skills as a vector of Booleans (e.g. a target vector), where each element is either 0 or 1 indicating whether or not the user 118 possesses a corresponding sub-skill. For example, as shown in FIG. 9, the first element of the multi-token representation 902 may be 1 indicating the ability of the user to perform skill 1 (e.g. how to play using technique X). In another example, the second element of the multi-token representation 902 may be 1 indicating the ability of the user to perform skill 2 (e.g. can solve conflict in team play setting). In another example, the third element of the multi-token representation 902 may be 1 indicating the ability of the user to perform skill 3 (e.g. can complete task Y in a specific time window). In another example, the Nth element of the multi-token representation 902 may be 0 indicating the inability of the user to perform skill N (e.g. cannot complete task N). The system 102 may thereby identify and track the uniqueness of the skill set of the user 118 based on the series of on-chain crypto credentials (e.g. vector of Booleans) using the multi-token standard. The system 102 may also represent the skill set of the user 118 at a high granularity based on the series of on-chain crypto credentials. The system 102 may thereby uniquely identify the skill set of the user 118 in a large dataset (e.g. database 112 of FIG. 1 or NFT database 1014 of FIG. 10) based on the multi-token representation 902.

Figure 10:
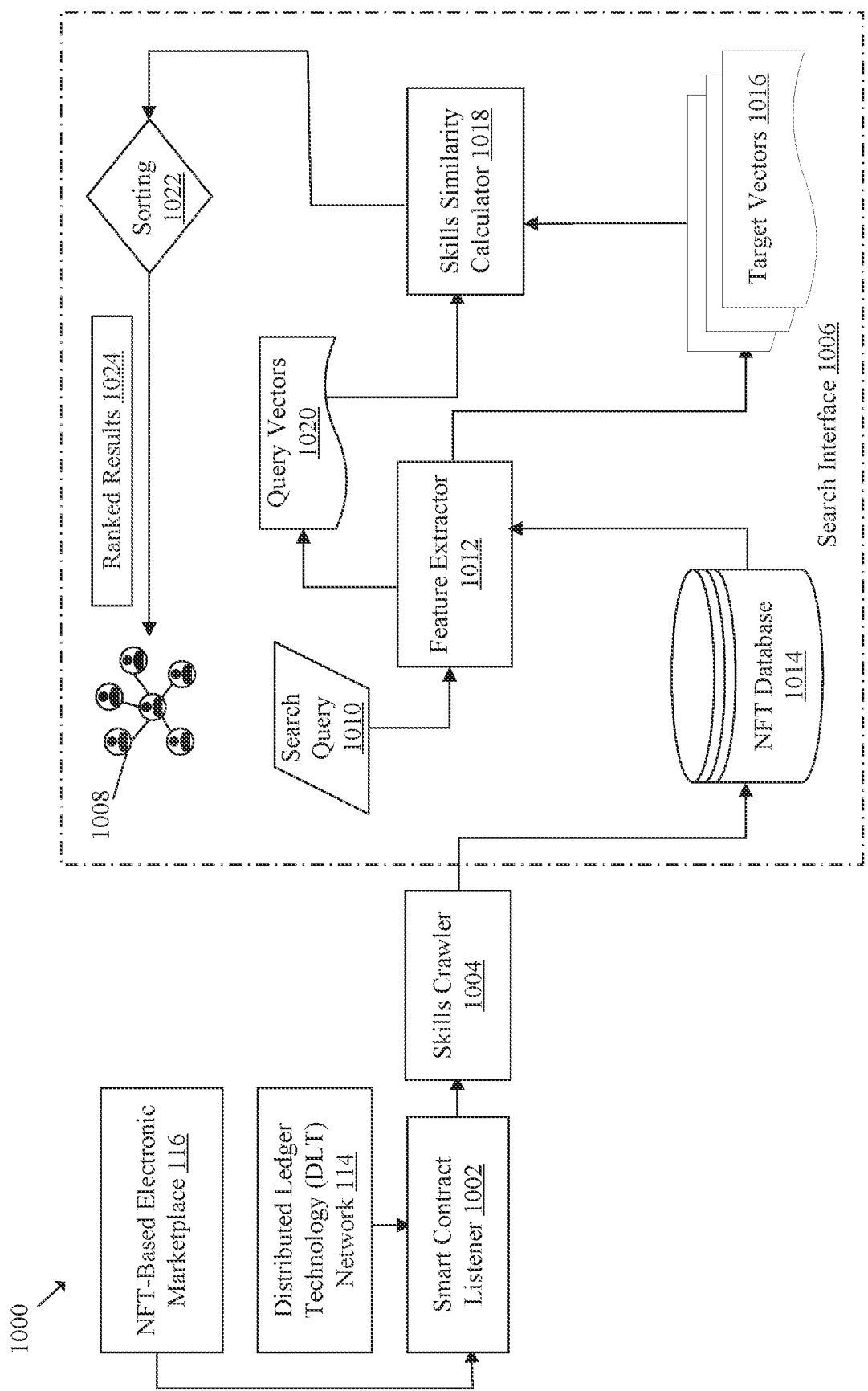
FIG. 10 is a block diagram that illustrates an exemplary scenario for a search interface in a non-fungible token (NFT)-based electronic marketplace, in accordance with an embodiment of the disclosure.

FIG. 10 is a block diagram that illustrates an exemplary scenario for a search interface in a non-fungible token (NFT)-based electronic marketplace, in accordance with an embodiment of the disclosure. FIG. 10 is explained in conjunction with elements from FIGS. 1-3, 4A, 4B, 5-7, 8A, 8B, 8C, 8D, and 9. With reference to FIG. 10, there is shown an exemplary scenario 1000. In the exemplary scenario 1000, there are shown the NFT-based electronic marketplace 116, the DLT network 114, a smart contract listener 1002, a skills crawler 1004, and a search interface 1006.

The NFT-based electronic marketplace 116 may serve as the front-end for search and retrieval of information (e.g. NFT representation of skills) stored in the database 112. The smart contract listener 1002 may control communication between the smart contract on the DLT network 114 and backend services. For example, the smart contract is a computer script or a transaction protocol which may automatically execute, control, or document minting of the NFTs on the DLT network 114 according to terms of a contract or an agreement. The skills of the user 118 may be minted on the DLT network 114 (e.g. blockchain network) as NFTs, and may be associated with the identity of the user 118 in the online environment 106 (e.g. gaming platform)

In an embodiment, the skills crawler 1004 may track the progress of the skill or the acquisition of a new skill by the user 118 in the online environment 106. The skills crawler 1004 may evaluate the tracked progress of the skill or the new skill based on current trend data in the NFT-based electronic marketplace 116. The skills crawler 1004 may update an NFT database 1014 in real time based on the tracked progress of the skill or acquisition of the new skill.

In an embodiment, the search interface 1006 may include the NFT database 1014, a feature extractor 1012, a skills similarity calculator 1018, and a sorting unit 1022. In an embodiment, the NFT database 1014 may include suitable logic, circuitry, code, and/or interfaces that may be configured to store offloaded transaction records and data from the DLT network 114. In an embodiment, the NFT database 1014 may store information associated with the plurality of skills available in the NFT-based electronic marketplace 116. In some embodiments, the NFT database 1014 may store the multi-token representation of the plurality of skills of a plurality of users, including the user 118. For example, the NFT database 1014 may store the multi-token representation of the skills of the user 118 as the multi-token representation 902 of FIG. 9.

In an embodiment, the search interface 1006 may receive an input (e.g. search query 1010) from the NFT-based electronic marketplace 116. In an embodiment, the feature extractor 1012 may convert the search query 1010 to a query vector 1020 that indicates a search criteria associated with the plurality of skills. The feature extractor 1012 may extract target vectors 1016 from the NFT database 1014 based on multi-token representation of the plurality of skills of the plurality of users.

In an embodiment, the skills similarity calculator 1018 may determine a similarity between the query vector 1020 and the target vectors 1016. For example, the skills similarity calculator 1018 may determine the similarity between the skill requirement indicated by the query vector 1020 and the skill sets indicated by the target vectors 1016. The skills similarity calculator 1018 may output search results from the NFT database 1014 to the sorting unit 1022 based on the determined similarity between the query vector 1020 and the target vectors 1016.

In an embodiment, the sorting unit 1022 may sort the search results output from the skills similarity calculator 1018, rank each result of the search results based on relevance to the search query, and output a set of ranked results to the front-end. The system 102 may control the display of the set of ranked results on user devices of users 1008 (e.g. developers) of the NFT-based electronic marketplace 116. In an embodiment, the system 102 may control the display of the set of ranked results in comparison with baseline skill levels, such as "expert", "intermediate", etc.

Figure 11:
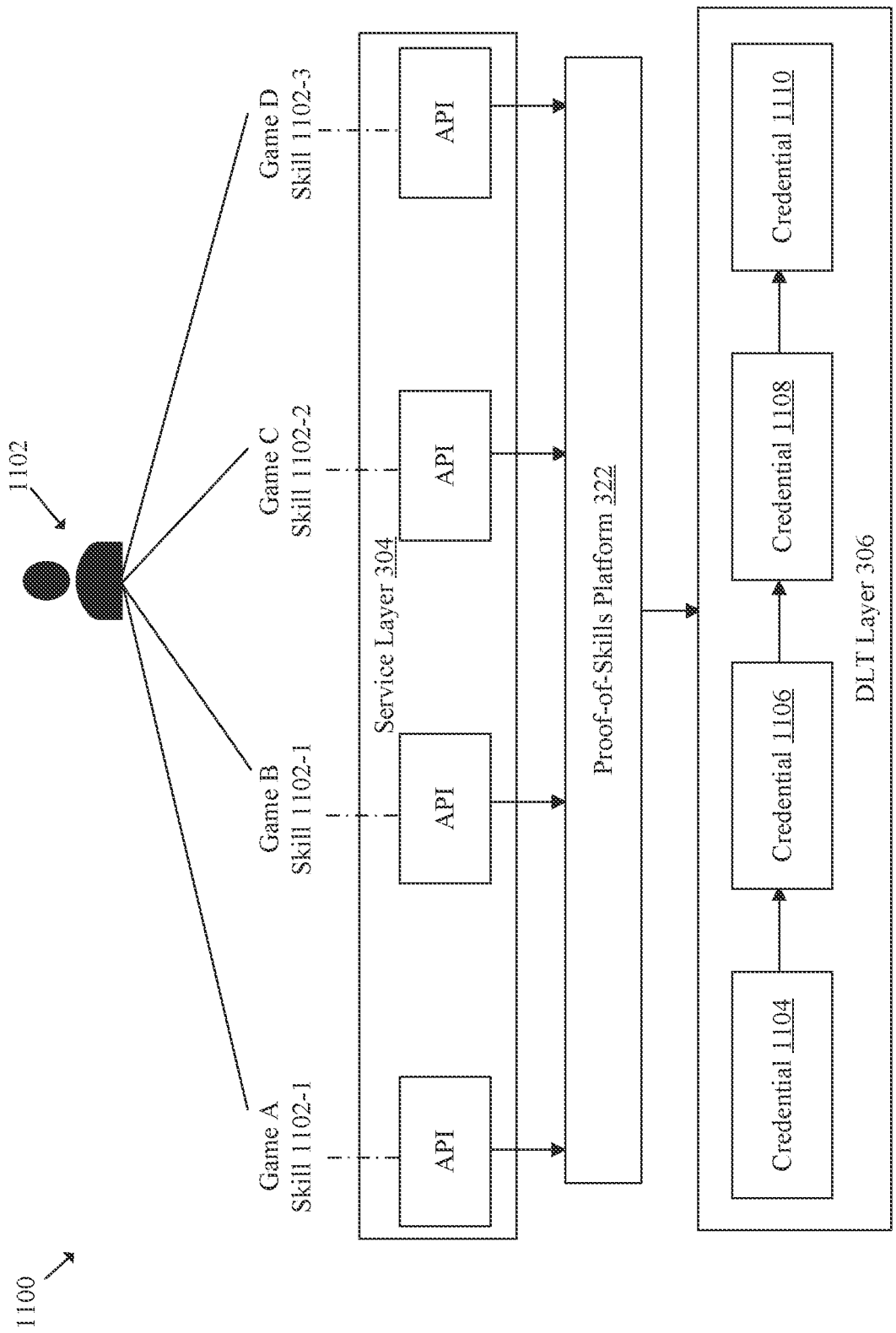
FIG. 11 is an exemplary diagram that illustrates on-chain credentials for a single platform use case, in accordance with an embodiment of the disclosure.

FIG. 11 is an exemplary diagram that illustrates on-chain credentials for a single platform use case, in accordance with an embodiment of the disclosure. FIG. 11 is explained in conjunction with elements from FIGS. 1-3, 4A, 4B, 5-7, 8A, 8B, 8C, 8D, 9, and 10. With reference to FIG. 11, there is shown an exemplary scenario 1100. In the exemplary scenario 1100, there are shown application programming interfaces (APIs) of a service layer 304, a proof-of-skills platform 322, and a DLT layer 306.

In an example, the system 102 may acquire information associated with a skill 1102-1 exhibited by a user 1102 (e.g. gamer) in game A and game B, a skill 1102-2 exhibited by the user 1102 in game C, and a skill 1102-3 exhibited by the user 1102 in game D. In an embodiment, the game A, the game B, the game C, and the game D may be played on the same gaming platform. In an example, the game A may be a football game, game B may be a first-person shooting game, game C may be a first-person shooting game, and game D may be a multiplayer online arena-based game. In another example, the skill 1102-1 may include skill X/behavior strategy/coordination leader in the football game, the skill 1102-1 may include skill X/behavior strategy/coordination leader in the first-person shooting game, the skill 1102-2 may include skill Y in the first-person shooting game, and the skill 1102-3 may include skills X, Y from multiple users in the multiplayer online arena-based game. The system 102 may apply the trained AI model 104 on the acquired information to evaluate the skills 1102-1, 1102-2, and 1102-3. The system 102 may evaluate the skills 1102-1, 1102-2, and 1102-3 based on the current trend in the NFT-based electronic marketplace 116, and based on the uniqueness of the skills 1102-1, 1102-2, and 1102-3. In an embodiment, the APIs of the service layer 304 may provide an interface for communication between the gaming platform and the proof-of-skills platform 322.

In an embodiment, the proof-of-skills platform 322 may be configured to register the skills 1102-1, 1102-2, and 1102-3 as validated assets or credentials on the DLT network 114 (e.g. blockchain) associated with the DLT layer 306. For example, the proof-of-skills platform 322 may allocate a digital token to the user 1102 for minting the skills 1102-1, 1102-2, and 1102-3 as NFTs on the DLT network 114. In an example, the digital token may include a fungible part in accordance with ERC-20 standard and a non-fungible part (NFT) in accordance with ERC-721 standard. The skills 1102-1, 1102-2, and 1102-3 of the user 1102 exhibited on the same gaming platform may be represented as a series of on-chain credentials (e.g. credential 1104, credential 1106, credential 1108, credential 1110) on the DLT network 114 based on the multi-token standard.

Figure 12:
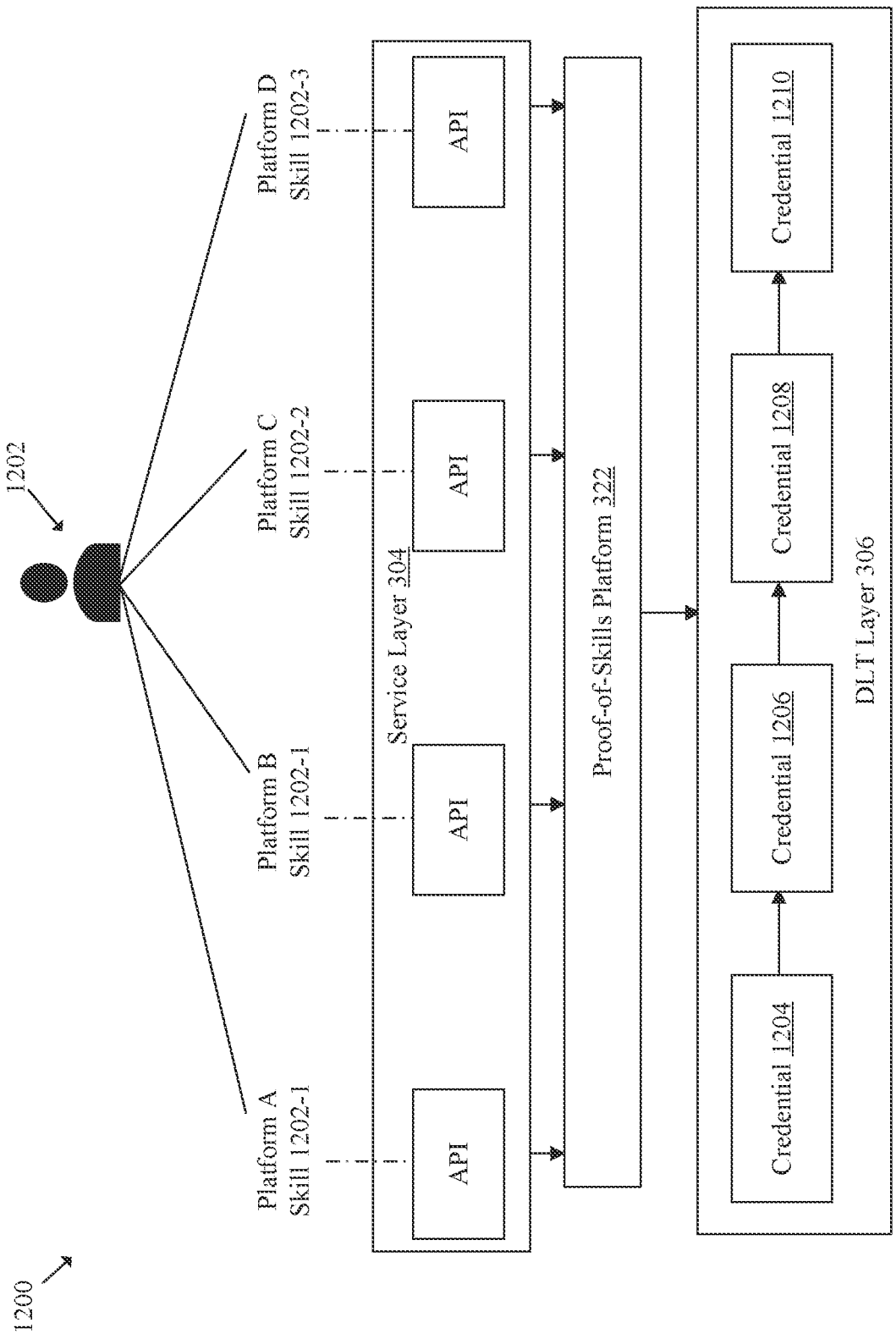
FIG. 12 is an exemplary diagram that illustrates on-chain credentials for a multi-platform use case, in accordance with an embodiment of the disclosure.

FIG. 12 is an exemplary diagram that illustrates on-chain credentials for a multi-platform use case, in accordance with an embodiment of the disclosure. FIG. 12 is explained in conjunction with elements from FIGS. 1-3, 4A, 4B, 5-7, 8A, 8B, 8C, 8D, and 9-11. With reference to FIG. 12, there is shown an exemplary scenario 1200. In the exemplary scenario 1200, there are shown application programming interfaces (APIs) of a service layer 304, a proof-of-skills platform 322, and a DLT layer 306.

In an example, the system 102 may acquire information associated with a skill 1202-1 (e.g. 3D modeling for game art creation or interior design) exhibited by a user 1202 (e.g. individual developer) in platform A and platform B, a skill 1202-2 (e.g. 3D modeling for metaverse) exhibited by the user 1202 in platform C, and a skill 1202-3 (3D modeling for product design) exhibited by the user 1202 in platform D. In an example, the platform A, the platform B, the platform C, and the platform D may be different from one another, and may represent different application scenarios. The system 102 may apply the trained AI model 104 on the acquired information to evaluate the skills 1202-1, 1202-2, and 1202-3 across the different platforms. The system 102 may evaluate the skills 1202-1, 1202-2, and 1202-3 based on the current trend the NFT-based electronic marketplace 116, and the uniqueness of the skills 1202-1, 1202-2, and 1202-3. In an embodiment, the APIs of the service layer 304 may provide an interface for communication between the respective platforms (platform A to platform D) and the proof-of-skills platform 322.

In an embodiment, the proof-of-skills platform 322 may be configured to register the skills 1202-1, 1202-2, and 1202-3 as validated assets or credentials on the DLT network 114 (e.g. blockchain) associated with the DLT layer 306. For example, the proof-of-skills platform 322 may allocate a digital token to the user 1202 for minting the skills 1202-1, 1202-2, and 1202-3 as NFTs on the DLT network 114. In an example, the skills 1202-1, 1202-2, and 1202-3 of the user 1202 exhibited across the different platforms may be represented as a series of on-chain credentials (e.g. credential 1104, credential 1106, credential 1108, credential 1110) on the DLT network 114 based on the multi-token standard.

In another embodiment, the system 102 may control connection between the platforms (platform A to platform D) such that the skills are accessible in the NFT-based electronic marketplace 116 from the different platforms. The system 102 may enable access and employment of the skills of the user 118 based on the on-chain credentials on the DLT network 114. Based on the on-chain credentials, the user 118 may qualify for instant jobs or microtasks of varying complexity in the NFT-based electronic marketplace 116. In an embodiment, the system 102 may transfer the fungible tokens earned by the user 118 to the digital wallet 120 of the user device 108. In an embodiment, the fungible tokens may be used for a transaction in the online environment 106 or a different online environment.

Figure 13:
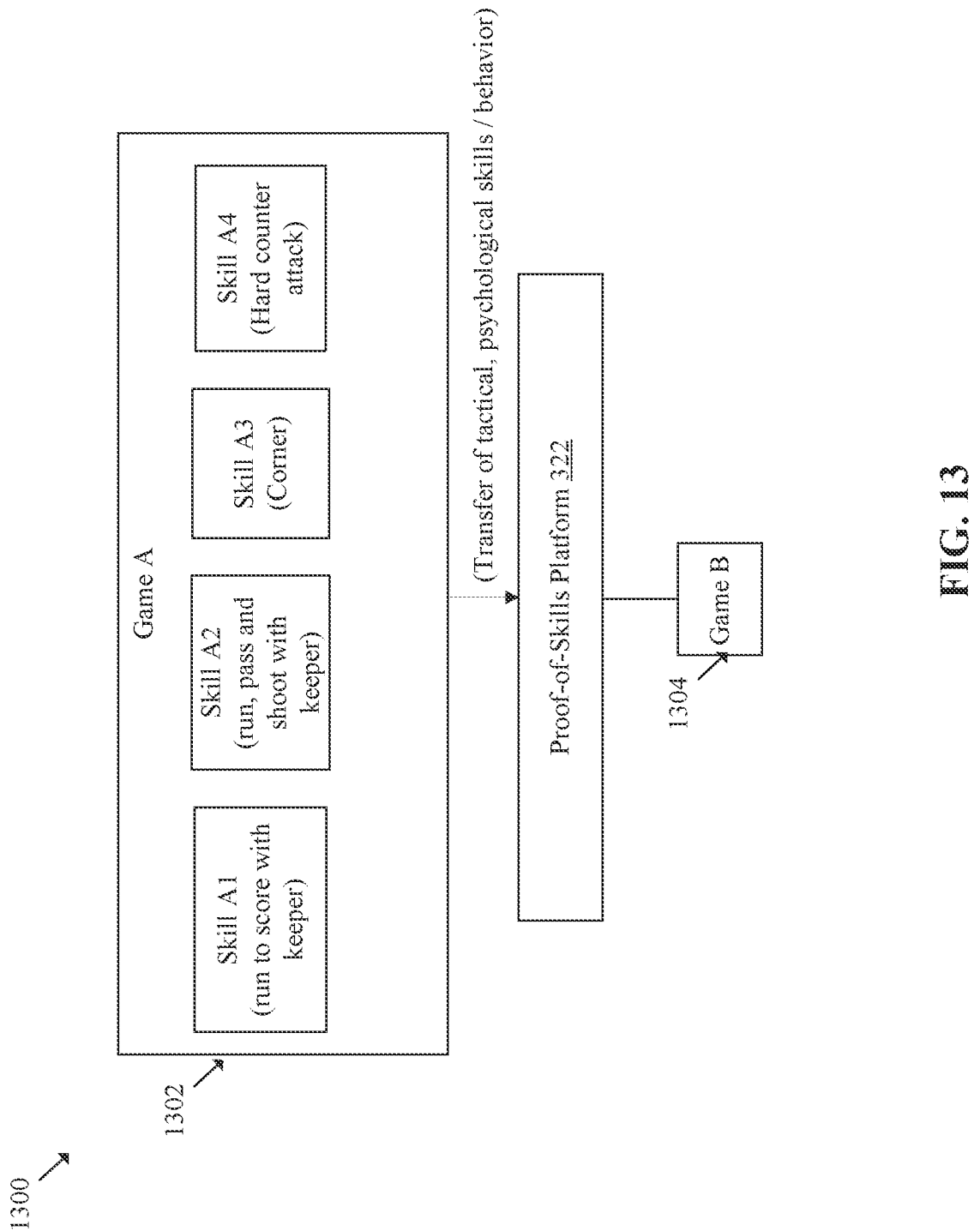
FIG. 13 is an exemplary diagram that illustrates on-chain credentials for a single platform use case, in accordance with an embodiment of the disclosure.

FIG. 13 is an exemplary diagram that illustrates on-chain credentials for a single platform use case, in accordance with an embodiment of the disclosure. FIG. 13 is described in conjunction with elements from FIGS. 1-3, 4A, 4B, 5, 6A, 6B, 7, 8A, 8B, 8C, 8D, and 9-12. With reference to FIG. 13, there is shown an exemplary scenario 1300. In the exemplary scenario 1300, there are shown game A 1302, the proof-of-skills platform 322, and game B 1304.

In an embodiment, users of game A 1302 may possess at least one of skill A1, skill A2, skill A3, or skill A4. In an example, the skills related to the game A 1302 may be related to strategy, co-ordination skills/behavior utilized in the game A 1302. In an example, the game A 1302 may be a football game and the skills related to the game A 1302 may include "run to score with keeper", "run, pass and shoot with keeper", "corner", "3 vs 1 with keeper", or "hard counter attack".

In an embodiment, the proof-of-skills platform 322 may be configured to register the skills A1, A2, A3, or A4 as validated assets or credentials on the DLT network 114 (e.g. blockchain) associated with the DLT layer 306. For example, the proof-of-skills platform 322 may allocate a digital token to the user 118 for minting the skills A1, A2, A3, or A4 as NFTs on the DLT network 114, thereby making them transferable to game B 1304, via the proof-of-skills platform 322. The proof-of-skills platform 322 may enable transfer of tactical skills, psychological skills, and behavior from game A 1302 to game B 1304. In an embodiment, the skills A1, A2, A3, or A4 of the user 118 exhibited on the game A may be represented as a series of on-chain credentials on the DLT network 114 based on the multi-token standard. In an embodiment, the digital token allocated for minting the skills A1, A2, A3, or A4 of the game A 1302 as NFTs may be utilized in game B 1304 as strategy or skills/behavior. In an example, the game A 1302 and the game B 1304 may be associated with the same gaming environment or different gaming environments.

Figure 14:
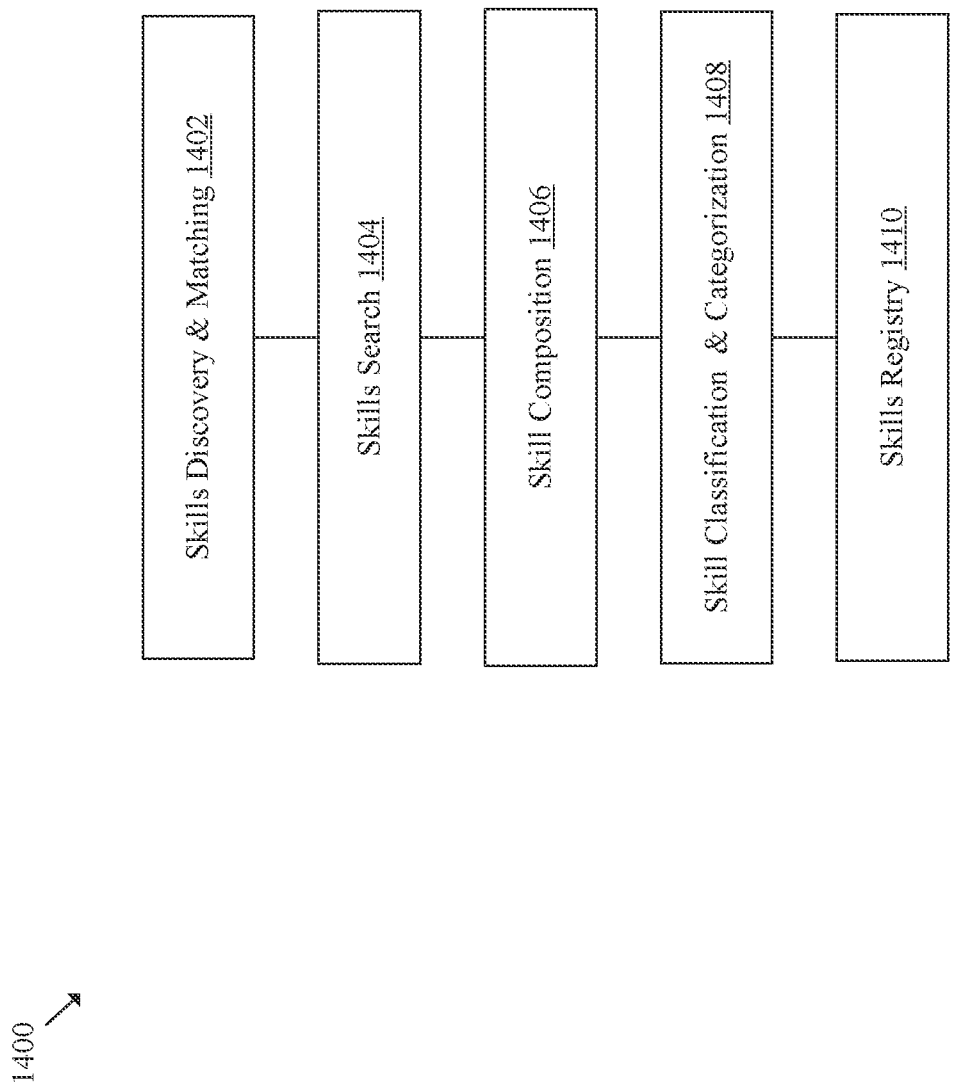
FIG. 14 is an exemplary diagram that illustrates an architecture of core AI services, in accordance with an embodiment of the disclosure.

FIG. 14 is an exemplary diagram that illustrates an architecture of core AI services, in accordance with an embodiment of the disclosure. FIG. 14 is described in conjunction with elements from FIGS. 1-3, 4A, 4B, 5, 6A, 6B, 7, 8A, 8B, 8C, 8D, and 9-13. With reference to FIG. 14, there is shown an exemplary scenario 1400. In the exemplary scenario 1400, there is shown an architecture of core AI services that may include skills discovery and matching 1402, skills search 1404, skills composition 1406, skills classification and categorization 1408, and skills registry 1410.

Core AI services may configured to perform real-time monitoring of on-chain operations. In an embodiment, the skills discovery and matching 1402 may match the skills with the task or set of micro-tasks and provide a result of the match. Details of the skills discovery and matching 1402 are described in FIG. 15A. In an embodiment, the skills search 1404 may include the search interface for the NFT-based electronic marketplace 116. Details of the skills search 1404 are described, for example, in FIG. 10. In an embodiment, the skill composition 1406 may include description of skills associated with the users. Details of the skill composition 1406 are described in FIG. 15B. In an embodiment, the skill classification and categorization 1408 may be configured to classify the skills associated with the users and categorize each of the skills in one of a plurality of categories. In an embodiment, the skill registry 1410 may be configured to store a record of the skills and a category to which each skill belongs. In an example, a skill may need to be registered with the skills registry 1410, or respond to a broadcasted query to make itself semantically discoverable. In an embodiment, the skills discovery and matching 1402 may serve as the skill registry 1410 to all attached entities.

Figure 15A:
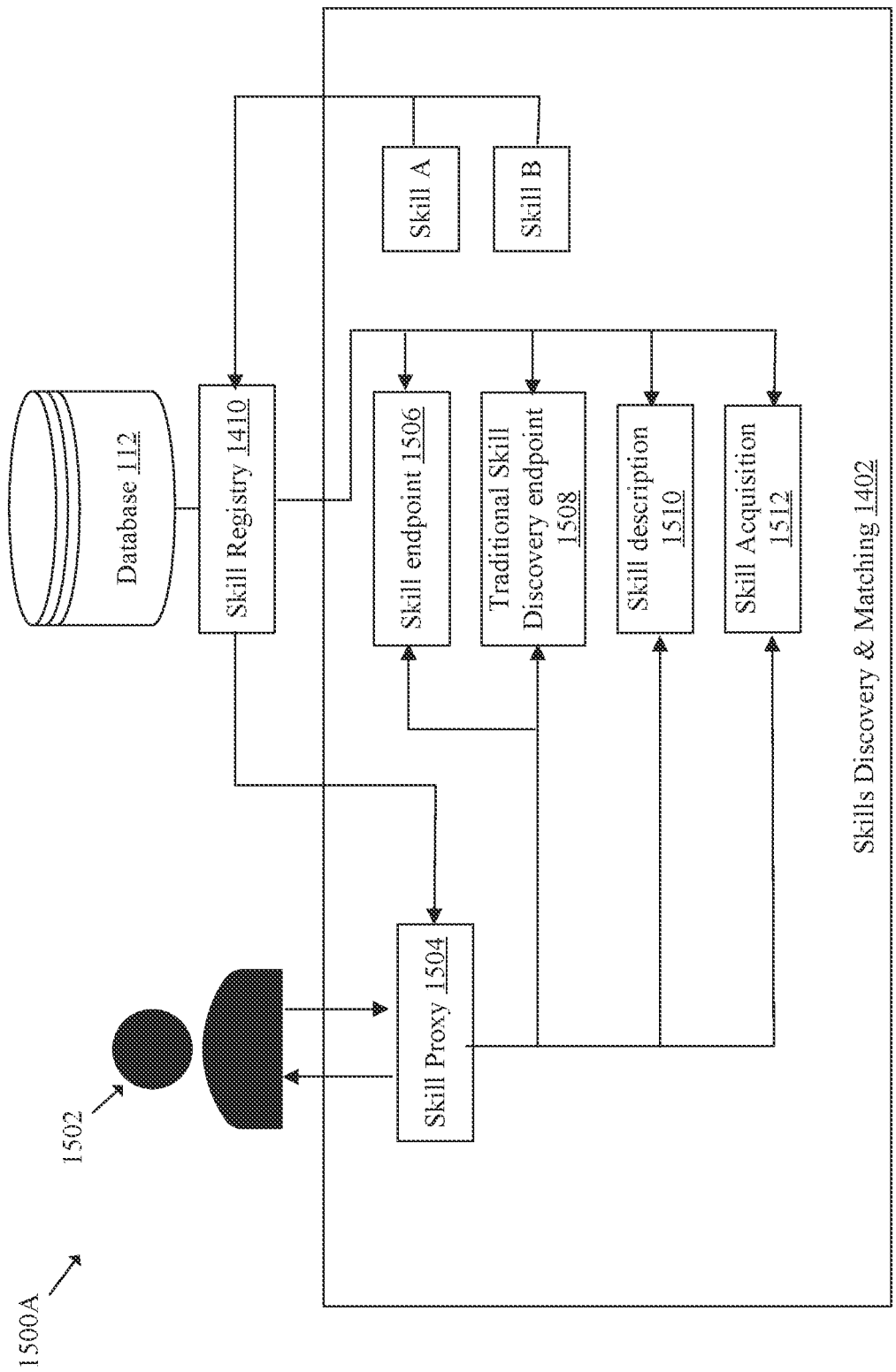
FIG. 15A is an exemplary diagram that illustrates skills discovery and matching in core AI services, in accordance with an embodiment of the disclosure.

FIG. 15A is an exemplary diagram that illustrates skills discovery and matching in core AI services, in accordance with an embodiment of the disclosure. FIG. 15A is described in conjunction with elements from FIGS. 1-3, 4A, 4B, 5, 6A, 6B, 7, 8A, 8B, 8C, 8D, and 9-14. With reference to FIG. 15, there is shown an exemplary scenario 1500A. In the exemplary scenario 1500A, there are shown the database 112, the skill registry 1410, and the skills discovery and matching 1402 that may include user 1502 (e.g. game developer), skill proxy 1504, a skill endpoint 1506, traditional skill discovery endpoint 1508, skill description 1510, and skill acquisition 1512.

In an embodiment, the skill discovery and matching 1402 includes a skill discovery process and a skill matching process. The skill discovery process includes matching user intention with skill descriptions and annotations, and taking matching records as candidate offers. The matching process may be precise or fuzzy (by synonyms, for example), and thus an identified offer may be associated confidence value that indicates how confident the system 102 thinks the offer can fulfill the intention. As the skill proxy formulates the plan to fulfill the intention, it takes confidence values into consideration when making choices among offers. Based on identification of a candidate offer, the skill discovery process may run an optional step to confirm with the skill if it is willing to make the offer. This may allow a skilled provider to proactively refuse offering a service in certain cases, such as when they are too busy to take on a new request, or thinks the ask price is too low, or cannot verify the origin of the request. A confirmed offer may resolve to one of the following: a callable skill endpoint, or a traditional service discovery endpoint, a skill description, or a recipe to acquire a skill instance. The skill discovery and matching 1402 may serve as a traditional service discovery mechanism to discover a service endpoint. The skill discovery and matching 1402 may also return a service description, such as a web service description language (WSDL) document, to instruct the client on how to consume the service (for a skill). The system 102 may not mandate a specific format or proxy how a skill is discovered or consumed.

Figure 15B:
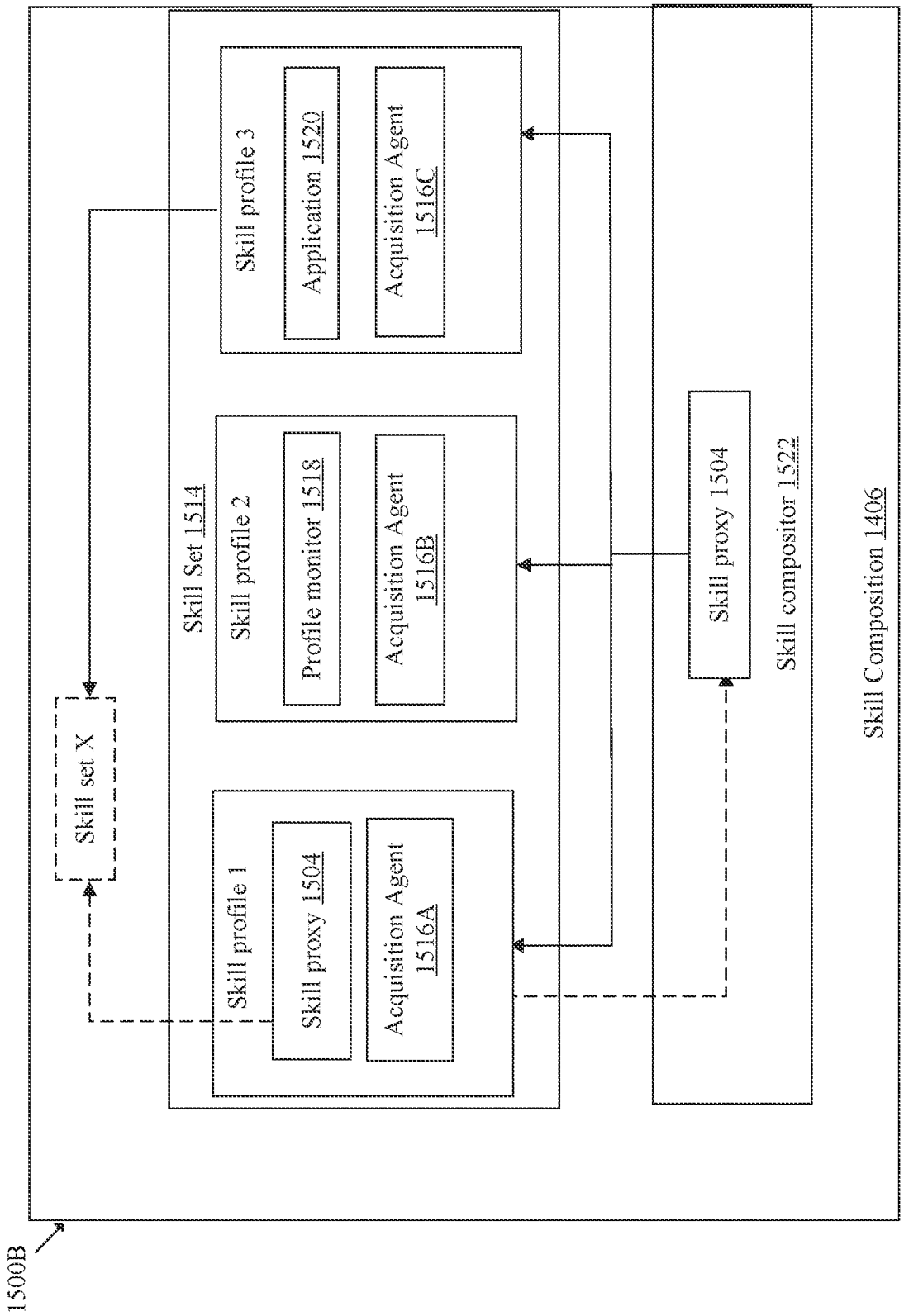
FIG. 15B is an exemplary diagram that illustrates skills composition in core AI services, in accordance with an embodiment of the disclosure.

FIG. 15B is an exemplary diagram that illustrates skills composition in core AI services, in accordance with an embodiment of the disclosure. FIG. 15B is described in conjunction with elements from FIGS. 1-3, 4A, 4B, 5, 6A, 6B, 7, 8A, 8B, 8C, 8D, 9-14, and 15A. With reference to FIG. 15B, there is shown an exemplary scenario 1500B. In the exemplary scenario 1500B, there is shown the skills composition 1406 that may include skill set 1514 and skill compositor 1522.

In an embodiment, the skill set 1514 may include skill profile 1, skill profile 2, and skill profile 3. Each of the skill profile 1, the skill profile 2, or the skill profile 3 may define a skill API as well as candidate offers that may be used to deliver the required skill. The skill profile may also describe a strategy of choosing offers. For example, a strategy may prefer cost, while another strategy may prefer a skill level and service-level agreement (SLA) associated with the offer. An enterprise policy may also dictate to use offers from approved experts and developers only. Multiple skill profiles such as the skill profile 1, the skill profile 2, and the skill profile 3 are organized into the skill set 1514, which may describe a set of skills that are associated with an expert or a player. The skill profile 1 may include the skill proxy 1504. The skill profile 2 may include a profile monitor 1518. In an example, both the skill proxy 1504 and the profile monitor 1518 may be described by skill profiles in the skill set 1514. The skill proxy 1504 may be configured with additional skill sets to acquire additional skills. In an embodiment, the skill compositor 1522 may create a skill set. The skill compositor 1522 may be implemented by the skill proxy 1504.

In an embodiment, the skill compositor 1522 may be configured with a skill set that includes at least three skills: a skill proxy, a profile monitor, and a custom application. The skill compositor 1522 may work with a corresponding acquisition agent 1516A, 1516B, or 1516C to acquire necessary software packages and launch them. An application 1520 may feed its required skill set to the skill proxy 1504 which, in turn, may compose required skills for the application 1520. In an example, the skill compositor 1522 may take in a skill set and use acquisition agents 1516A, 1516B, or 1516C to install and configure required software stack.

Figure 16:
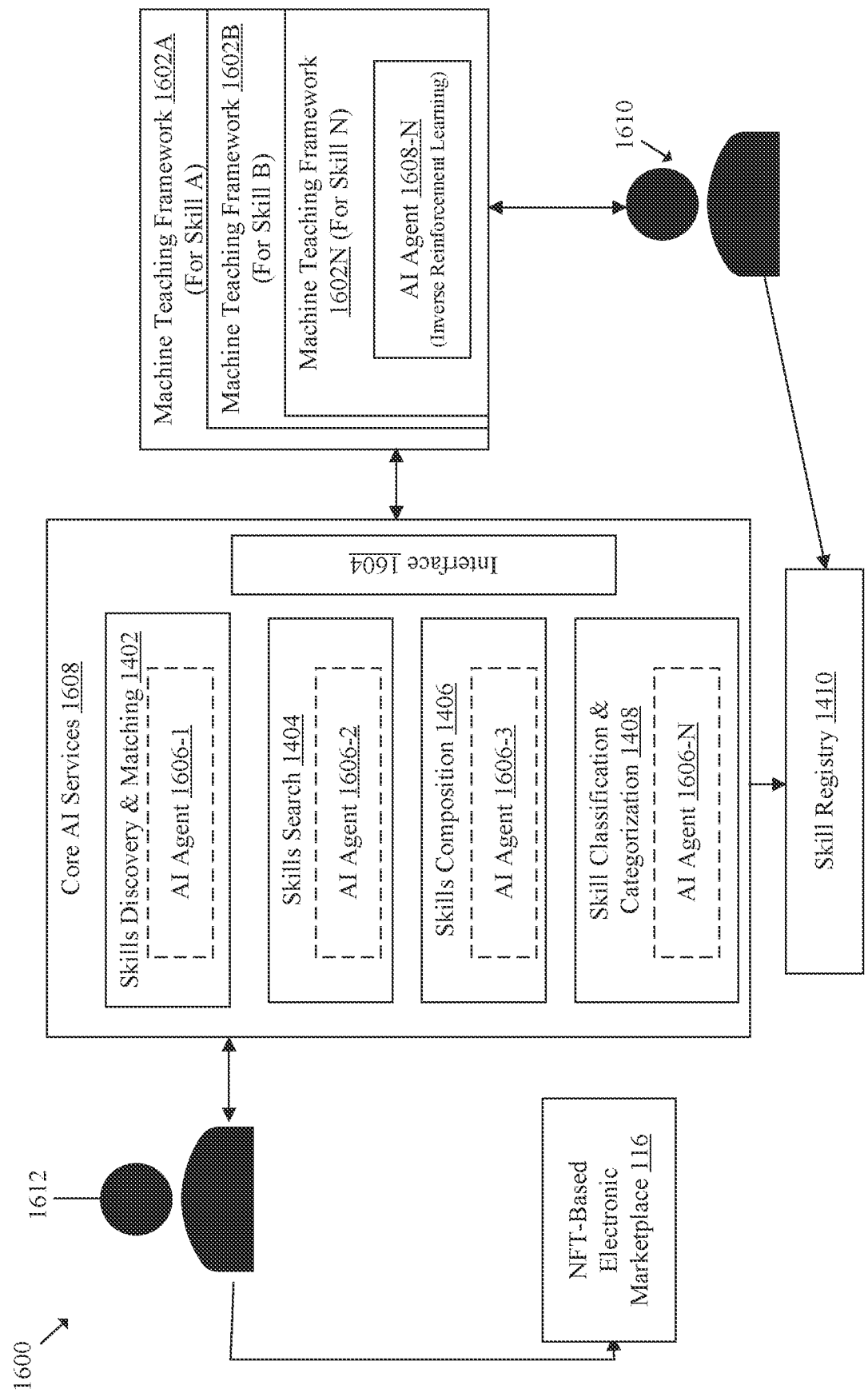
FIG. 16 is an exemplary diagram that illustrates core AI services agents and external AI agents, in accordance with an embodiment of the disclosure.

FIG. 16 is an exemplary diagram that illustrates core AI services agents and external AI agents, in accordance with an embodiment of the disclosure. FIG. 16 is described in conjunction with elements from FIGS. 1-3, 4A, 4B, 5, 6A, 6B, 7, 8A, 8B, 8C, 8D, 9-14, 15A, and 15B. With reference to FIG. 16, there is shown an exemplary scenario 1600. In the exemplary scenario 1600, there are shown a machine teaching frameworks 1602A-1602N, the core AI services 1608, an interface 1604 for the core AI services 1608, the NFT-based electronic marketplace 116, and the skills registry 1410.

In an embodiment, a game/domain expert 1610 may develop or train an AI agent 1608-N corresponding to a machine teaching framework 1602N for a skill N. The skill N may be registered in the skill registry 1410. As shown in FIG. 16, each machine teaching framework of a plurality of machine teaching frameworks 1602A-1602N may correspond to a skill. In an embodiment, a game developer 1612 may access an AI agent (e.g. AI agent 1608-N) for a specific skill through a machine teaching framework corresponding to that specific skill. Each of the core AI services 1608 may include corresponding AI agents 1606-1 to 1606N. In an embodiment, the system 102 may generate the smart contract for NFT transaction. For example, the smart contract may be configured to represent a plurality of sub-skills of the user 1612 as a series of on-chain crypto credentials based on the multi-token standard, where each credential of the series of on-chain crypto credentials may represent one of the plurality of sub-skills associated with the skill set of the user 1612. The system 102 may thereby convert the skills and achievements linked to the identity of the user 1612 to digital tokens on the DLT network 114.

Figure 17:
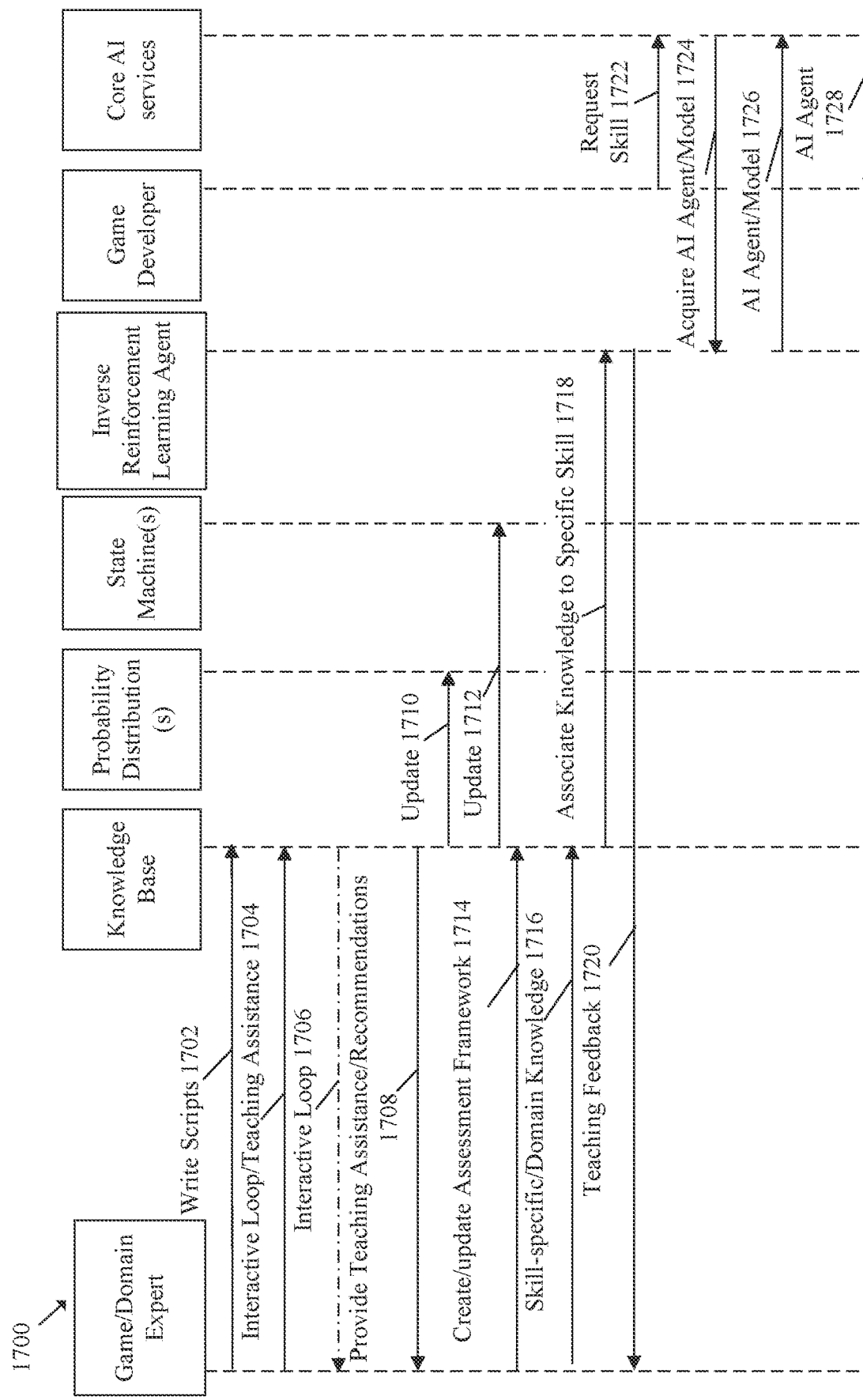
FIG. 17 is an exemplary diagram that illustrates services details associated with an AI agent, in accordance with an embodiment of the disclosure.

FIG. 17 is an exemplary diagram that illustrates services details associated with an AI agent, in accordance with an embodiment of the disclosure. FIG. 17 is described in conjunction with elements from FIGS. 1-3, 4A, 4B, 5, 6A, 6B, 7, 8A, 8B, 8C, 8D, 9-14, 15A, 15B, and 16. With reference to FIG. 17, there is shown an exemplary flow diagram 1700. In the exemplary flow diagram 1700, there are shown operations 1702 to 1728.

At 1702, a game/domain expert may write scripts and store the scripts in a knowledge base using interactive loop/teaching assistance 1704 and interactive loop 1706. At 1708, the game/domain expert may receive teaching assistance/recommendations from the knowledge base. At 1710 and 1712, the knowledge base may post updates to probability distribution(s) and state machine(s). At 1714, the game/domain expert may create or update skill assessment framework. At 1716, the game/domain expert may provide skill-specific/domain knowledge to the knowledge base. At 1718, inverse reinforcement learning agent may retrieve the skill-specific/domain knowledge from the knowledge base and associate the skill-specific/domain knowledge to a specific skill.

At 1720, based on the association of the skill-specific/domain knowledge, the inverse reinforcement learning agent may provide teaching feedback to the game/domain expert. At 1722, a game developer may request a skill or a set of skills from the core AI services. At 1724, the core AI services may request acquisition of an AI agent/model from the inverse reinforcement learning agent. At 1726, based on the request from the core AI services, the inverse reinforcement learning agent may provide the AI agent/model. At 1728, the core AI service may provide the AI agent/model to the game developer.

Figure 18:
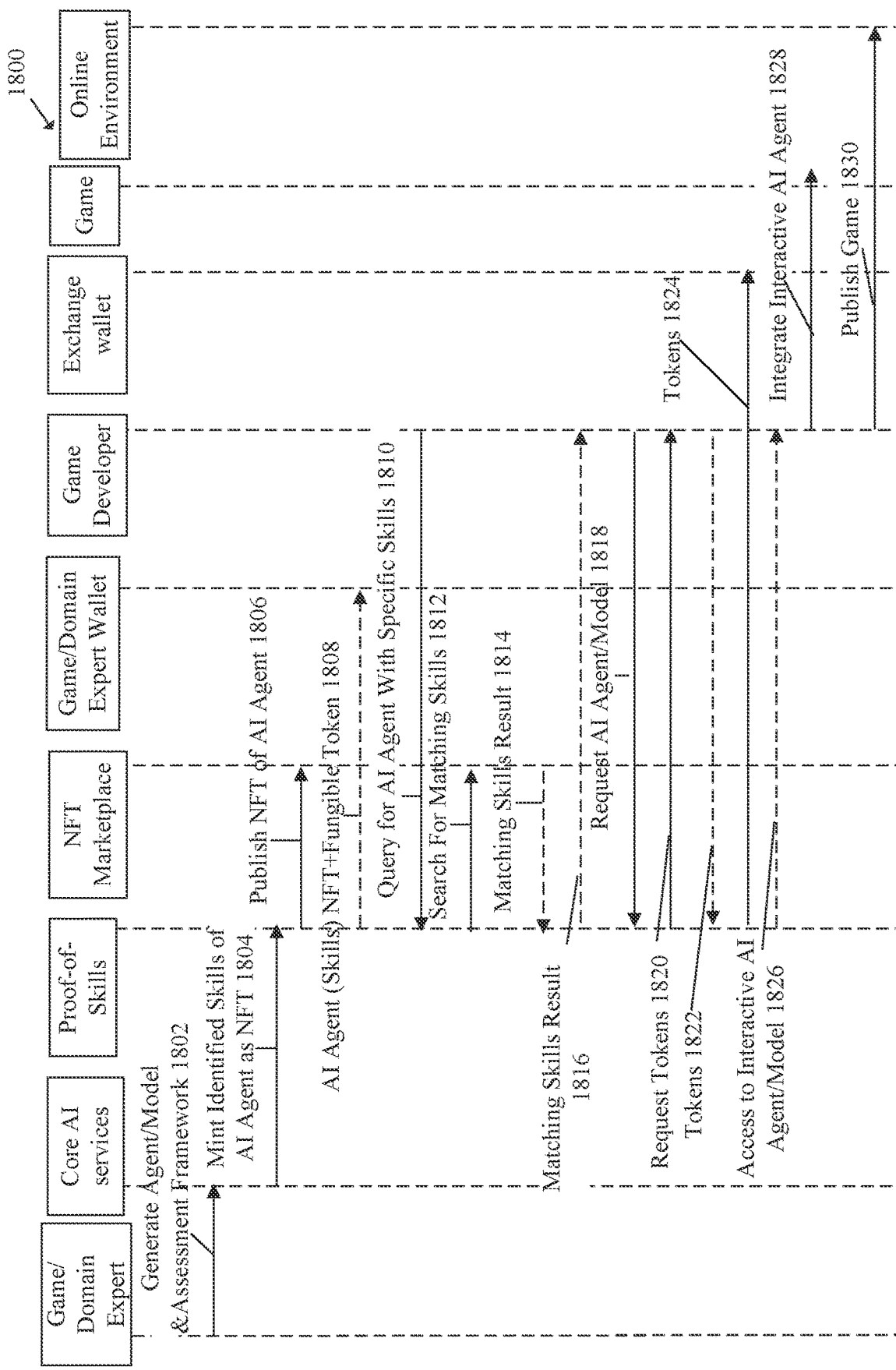
FIG. 18 is an exemplary diagram that illustrates workflow for AI and NFT services from game developer perspective, in accordance with an embodiment of the disclosure.

FIG. 18 is an exemplary diagram that illustrates workflow for AI and NFT services from game developer perspective, in accordance with an embodiment of the disclosure. FIG. 18 is described in conjunction with elements from FIGS. 1-3, 4A, 4B, 5, 6A, 6B, 7, 8A, 8B, 8C, 8D, 9-14, 15A, 15B, 16, and 17. With reference to FIG. 18, there is shown an exemplary flow diagram 1800. In the exemplary flow diagram 1800, there are shown operations 1802 to 1830.

At 1802, the game/domain expert may develop AI agent/model and skill assessment framework using the core AI services. At 1804, the core AI services may identify skills of the AI agent and mint the identified skills of the AI agent as NFT 1804 on the proof-of-skills platform 322. At 1806, the proof-of-skills platform 322 may publish the NFT of the AI agent in the NFT-based electronic marketplace 116. At 1808, the NFT and fungible tokens associated with the AI agent may be digitally stored in a wallet associated with the game/domain expert.

At 1810, the game developer may send a query for an AI agent with specific skills to the proof-of-skills platform 322. At 1812, The proof-of-skills platform 322 may search for matching skills 1812 in the NFT-based electronic marketplace 116. At 1814, the proof-of-skills platform 322 may receive a result of matching skills from the NFT-based electronic marketplace 116. At 1816, the result of the matching of the skills may be provided to the game developer at. At 1818, the game developer may send a request to the proof-of-skills platform 322 for the AI agent matching the required skills. At 1820, the proof-of-skills platform 322 may request for tokens from the game developer for the requested AI agent. At 1822, the game developer may provide the requested tokens. At 1824, the tokens may be digitally stored in an exchange wallet associated with the NFT-based electronic marketplace 116. At 1826, the proof-of-skills platform 322 may allow access of the interactive AI agent to the game developer. At 1828, the game developer may integrate the interactive AI agent to a game. At 1830, the game developer may publish the game in an online environment 106 (such as the PlayStation® Network).

Figure 19:
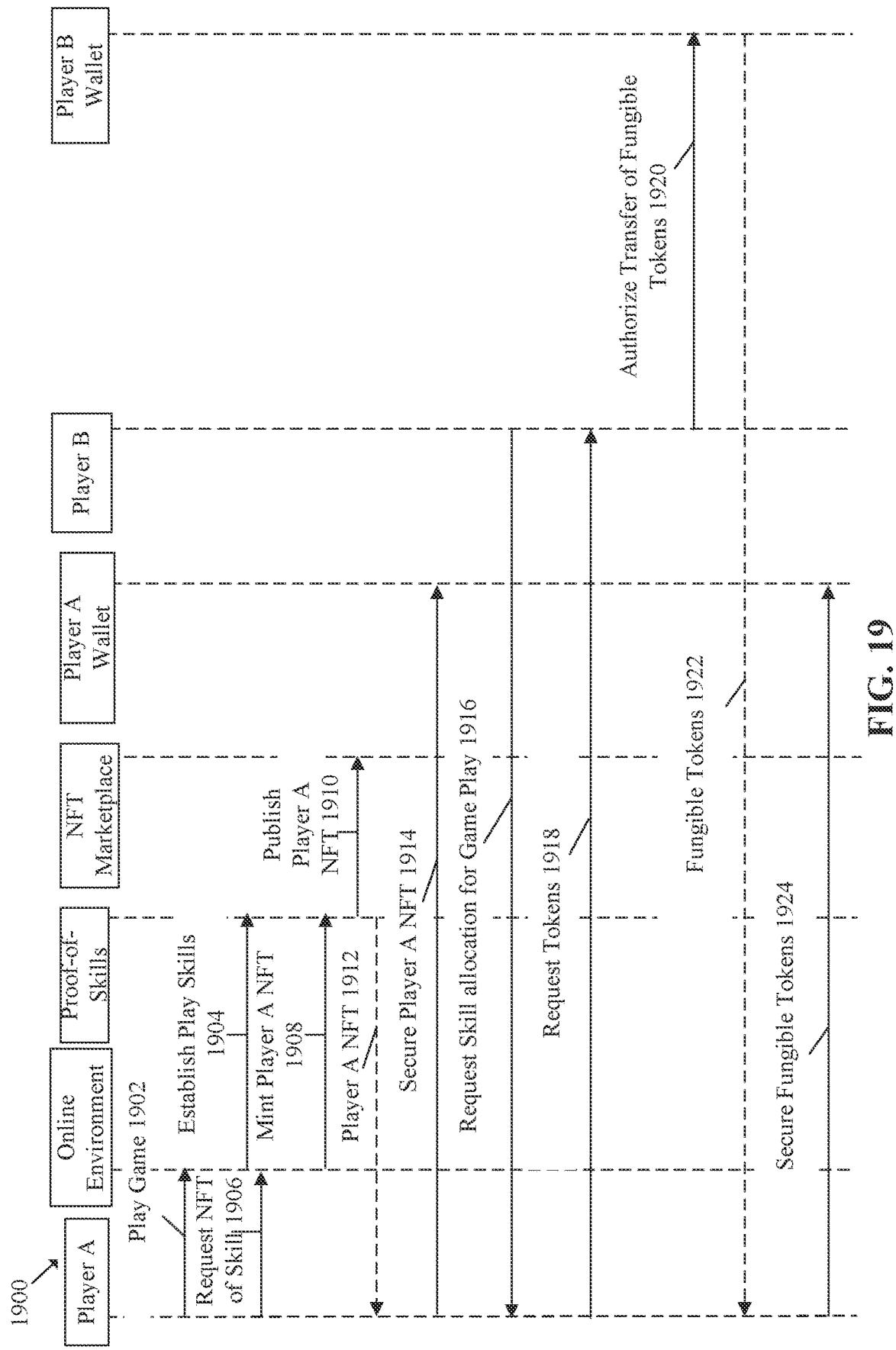
FIG. 19 is an exemplary diagram that illustrates workflow for skills allocation from player perspective, in accordance with an embodiment of the disclosure.

FIG. 19 is an exemplary diagram that illustrates workflow for skills allocation from player perspective, in accordance with an embodiment of the disclosure. FIG. 19 is described in conjunction with elements from FIGS. 1-3, 4A, 4B, 5, 6A, 6B, 7, 8A, 8B, 8C, 8D, 9-14, 15A, 15B, and 16-18. With reference to FIG. 19, there is shown an exemplary flow diagram 1900. In the exemplary flow diagram 1900, there are shown operations 1902 to 1924.

At 1902, player A may play a game in an online environment (such as the PlayStation® Network). At 1906, player A may request NFT for a specific skill of a plurality of skills. At 1904, the plurality of skills may be established on the proof-of-skills platform 322. At 1908, based on the request from player A, the PlayStation® Network may mint the requested NFT on the proof-of-skills platform 322. At 1910, the proof-of-skills platform 322 may publish the NFT associated with player A in the NFT-based electronic marketplace 116. At 1912, the proof-of-skills platform 322 may send an acknowledgment of the minted NFT to player A.

At 1914, player A may store 1914 the NFT in a wallet associated with player A. At 1916, player B may transmit a request to the player A for skill allocation for gameplay. At 1918, player A may request for tokens from player B. At 1920, an authorization is sent to the wallet associated with player B to transfer fungible tokens to the player A. At 1922, the fungible tokens are transferred from the wallet associated with player B to player A. At 1924, the fungible tokens may be stored in the wallet associated with player A.

Figure 20:
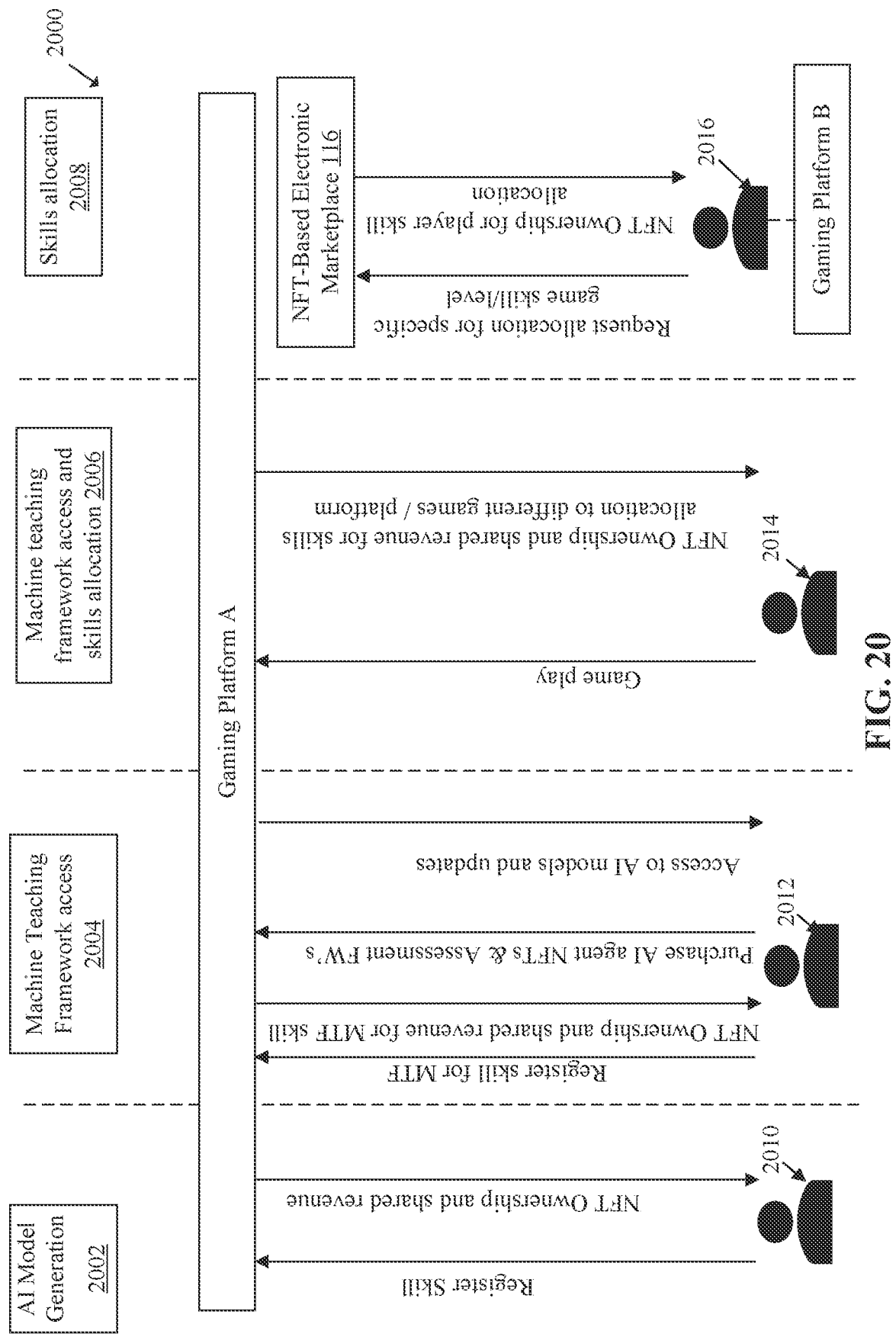
FIG. 20 is an exemplary diagram that illustrates an exemplary scenario diagram for revenue potential from gaming platform perspective, in accordance with an embodiment of the disclosure.

FIG. 20 is an exemplary diagram that illustrates an exemplary scenario diagram for revenue potential from gaming platform perspective, in accordance with an embodiment of the disclosure. FIG. 20 is described in conjunction with elements from FIGS. 1-3, 4A, 4B, 5, 6A, 6B, 7, 8A, 8B, 8C, 8D, 9-14, 15A, 15B, and 16-19. With reference to FIG. 20, there is shown an exemplary scenario diagram 2000. In the exemplary scenario diagram 2000, there are shown AI model generation 2002, machine teaching framework access 2004, machine teaching framework access and skills allocation 2006, skills allocation 2008, gaming platform A, the NFT-based electronic marketplace 116, and gaming platform B.

In an embodiment, a game/domain expert 2010 may prepare the skills evaluation framework 604 through the machine teaching framework 612. The game/domain expert 2010 may register skills on the gaming platform A. In an embodiment, NFT may be allocated to the game/domain expert 2010 for registering the skills on the gaming platform A and the game/domain expert 2010 may be provided with a certificate of ownership of the allocated NFT. In an embodiment, the game/domain expert 2010 may be provided with a share in revenue generated by the gaming platform A by utilization of the skills registered by the game/domain expert 2010. From the AI model generation 2002, gaming platform A may earn fixed number of tokens or revenue share percentage specified in the DAO smart contract for each of the following: providing access to machine teaching framework (MTF), access to core AI services (such as register skill), etc.

In an embodiment, a game developer 2012 may register skills for machine teaching framework. In an embodiment, NFT may be allocated to the game developer 2012 for registering the skills on the gaming platform A and the game developer 2012 may be provided with a certificate of ownership of the allocated NFT. In an embodiment, the game developer 2012 may be provided with a share in revenue generated by the gaming platform A by utilization of the skills registered by the game developer 2012. In an embodiment, the game developer 2012 may purchase an A1 agent from the gaming platform A. Based on the purchase of the AI agent, the game developer 2012 may obtain access to the AI agent for integrating the AI agent into a game. From the machine teaching framework access 2004, gaming platform A may earn fixed number of tokens or revenue share percentage specified in the DAO smart contract for each of the following: providing access to the machine teaching framework (MTF), access to specific features of MTF/AI model (such as level of interactivity, skill-level, etc.), access to core AI services (such as register skill), and registering skill NFT for machine teaching framework.

In an embodiment, a game player 2014 may play a game on gaming platform A using skills specific to the game player 2014. In an embodiment, NFT may be allocated to the game player 2014 for registering the skills on gaming platform A and the game player 2014 may be provided with a certificate of ownership of the allocated NFT. In an embodiment, the game player 2014 may be provided with a share in revenue generated by gaming platform A by utilization of the skills registered by the game player 2014. From the machine teaching framework access and skills allocation 2006, gaming platform A may earn fixed number of tokens or revenue share percentage specified in the DAO smart contract for each of the following: providing access to AI-assistant in game play for skill acquisition, and providing skills allocation to game play in other games in the same gaming platform/another gaming platform.

In an embodiment, a game player 2016 may request the NFT-based electronic marketplace for allocation of a specific skill/level for a game on the gaming platform B. In an embodiment, NFT ownership may be provided to the game player 2016 based on the allocation of the specific skill/level to the game player 2016. From the skills allocation 2008, gaming platform A may earn fixed number of tokens or revenue share percentage specified in the DAO smart contract for each of the following: providing access to player skill through NFT mechanisms such as rental, staking, etc. Table 1 illustrates the sample revenue potential for a single game.

32%, and the share of the game player may be 23%. In another example, for fixed revenue, the share of the platform owner may be 81%, and the share of the game developer may be 19%.

FIG. 21A is an exemplary diagram that illustrates an exemplary scenario diagram for valuation of a gaming skill, in accordance with an embodiment of the disclosure. FIG. 21A is described in conjunction with elements from FIGS. 1-3, 4A, 4B, 5, 6A, 6B, 7, 8A, 8B, 8C, 8D, 9-14, 15A, 15B, and 16-20. With reference to FIG. 21A, there is shown an exemplary scenario diagram 2100A. In the exemplary scenario diagram 2100A, there are shown a user 2102 having multiple skills, a user 2110 having lesser or no skills, a task 2106 and a product 2108. As shown in FIG. 21A, a value of a skill possessed by a user 2102 is a fundamental value the user 2102 may add by applying a set of skills 2104 to the task 2106 and output the product 2108. The user 2102 is shown to apply his/her skills for the completion of the task 2106 while adding value to the finished product 2108 based on the skillset. The user 2110 is shown to be unsuccessful in completing the task 2106.

FIG. 21B is an exemplary diagram that illustrates an exemplary scenario diagram illustrating liquidity of a gaming skill, in accordance with an embodiment of the disclosure. FIG. 21B is described in conjunction with elements from FIGS. 1-3, 4A, 4B, 5, 6A, 6B, 7, 8A, 8B, 8C, 8D, 9-14, 15A, 15B, 16-20, and 21A. With reference to FIG. 21B, there is shown an exemplary scenario diagram 2100B. In the

TABLE 1

Sample revenue potential for a single game.

| Participant | # of Participants | Sample revenue generated | Total revenue | Cost |
|---|---|---|---|---|
| Game/ Domain Expert | 300 | Interactive Lessons: 200K to 300K | Fixed Revenue: NA Recurring Revenue: ~$1000 per skill expert | Fixed cost: $500 registration |
| Game Developer | 1 | Access to advanced AI MTF features: $150K Providing Access to MTF for 300 game experts (250$): $150K | Fixed Revenue: $150K Recurring Revenue: ~$550K | Fixed cost: $500K for access to AI system |
| Game Players | 10000 | Skills allocation b/w 10000 players and games → $300K to 500K | Fixed Revenue: NA Recurring Revenue: $300K to 500K | Fixed cost: NA Recurring cost: $5 to $10 for system access |
| Platform Owner | 1 | Skill registration by 300 game experts @ 250$ → $150K MTF Access and registration → $500K NFT Minting 10000 players @ $10 → $100K Skill allocation transaction @$2 → $20K Interactive teaching framework access to 100K players → $200K Other Core AI services revenue → $150K | Fixed Revenue: $650K Recurring Revenue: $470K | Fixed cost: NA Recurring cost: Infrastructure related costs |

It may be noted that the potential revenue in table 1 is merely exemplary based on certain assumptions related to usage statistics, and the system 102 may be capable of generating revenue other than shown in table 1. In an example of revenue sharing, for recurring revenue, the share of the platform owner may be 27%, the share of the domain expert may be 18%, the share of the game developer may be exemplary scenario diagram 2100B, there are shown a user 2114 having highest skill level (e.g. level #100), a user 2122 having lowest skill level (level #1), a skill recognition and usage network 2116, and resources 2118. As shown in FIG. 21B, liquidity of a skill is defined as how easily and readily a user can convert his/her skill into other kind of useful resources 2118, such as money, social capital, or influence.

The user 2114 is shown to convert his/her skills 2112 to resources 2118 through access to the skill recognition and usage network 2116. The user 2122 is shown to have no access to the skill recognition and usage network 2116 based on his/her skills 2120. The system 102 may balances these aspects of value and liquidity of a user's skill. In an embodiment, three different types of NFTs may be implemented in the system 102n namely player NFT, game/domain expert NFT, and AI model NFT. The AI model NFT may held in a wallet associated with the game developer. The player NFT and game/domain expert NFT may be held by player and game/domain expert respectively.

FIG. 22A is an exemplary block diagram that illustrates teaching levels, in accordance with an embodiment of the disclosure. FIG. 22A is described in conjunction with elements from FIGS. 1-3, 4A, 4B, 5, 6A, 6B, 7, 8A, 8B, 8C, 8D, 9-14, 15A, 15B, 16-20, 21A, 21B, and 22A. With reference to FIG. 22A, there is shown an exemplary block diagram 2200A. In the exemplary scenario diagram 2200A, there are shown levels of teaching sophistication of AI 2202 as a teaching agent.

The levels of teaching sophistication of AI 2202 may include levels such as an introductory teacher 2202A, a coach 2202B, a mentor 2202C, and a maestro 2202D. In an embodiment, the introductory teacher 2202A may teach facts and goals to beginners. The coach 2202B may teach expert rules to the beginners and advanced beginners. The mentor 2202C may teach strategy to competent and proficient students. The maestro 2202D may codify new paradigms into expert rules for the beginners.

FIG. 22B is an exemplary block diagram that illustrates learner skill acquisition levels, in accordance with an embodiment of the disclosure. FIG. 22B is described in conjunction with elements from FIGS. 1-3, 4A, 4B, 5, 6A, 6B, 7, 8A, 8B, 8C, 8D, 9-14, 15A, 15B, 16-20, 21A, 21B, 22A, and 22B. With reference to FIG. 22B, there is shown an exemplary block diagram 2200B. In the exemplary scenario diagram 2200B, there is shown a learner skill acquisition model 2204 in the context of AI agents. In an embodiment, the learner skill acquisition model 2204 illustrates levels for beginner 2204A, advanced beginner 2204B, competent 2204C, proficient 2204D, and expert 2204E. The beginner 2204A may practice expert rules. The advanced beginner 2204B may develop fuzzy skills by identifying exceptions to rules. The competent 2204C may convert abstract actions to strategies and learn to trade off strategies. The proficient 2204D may practice to compile, master, and improvise strategy trade-offs. The expert 2204E may internalize expertise as intuition, abstract to unique style, and develop new paradigms.

Table 2 illustrates the advantages from the perspective of the gaming platform.

TABLE 2

Advantages from the perspective of the gaming platform

| # | Advantage Factor | Description |
|---|---|---|
| 1 | Democratization of gaming skills | Proposed system enables: Multiple game/domain experts of various levels. Game developers ranging from big production companies to indie game developers. Provides equal access to the Machine Teaching Framework to interactively design and develop the AI model without having to possess AI-specific domain knowledge. |
| 2 | Manage the revenue sharing and other financial operations across platforms | DAOs (Decentralized Autonomous Organizations) enable the details of how processes are conducted across platforms(such as revenue sharing, etc.) through smart contracts. |
| 3 | Increase engagement and sales through player skills data | Enables different modes of gaming in the platform: PvP(Player versus Player) - Based on skill levels PvE(Player versus Expert) - Benchmarking skill levels Team modes - Skill composition for specific strategy Player role recommendation(s) - Based on skill details and levels Player mode skill - Based on the player's skill in each mode of game play Device-specific skill - Based on specific gaming devices (VR headset, Controller type, etc.) |

It may be noted that the advantages listed in table 2 are merely exemplary, and the system 102 may provide other advantages in addition to the advantages listed in table 2. For example, the system 102 may manage the reputation of users (e.g. game players) in a trusted manner, thereby increasing the co-operation among players. The reputation enables players to increase social recognition and status. The system 102 helps establish a set of unique skills, and acts in a trust-worthy manner. The game player's skills are cumulative and traceable on-chain. The skills have single ownership, and the value portion is portable in the gaming ecosystem. The AI agents rate the skills of individual players and experts rate the skills of AI agents. The use cases include but not limited to: Revenue sharing among actors in the gaming ecosystem; Auction of assets/reputation; Decentralized exchange of assets/reputation; and Governance processes in the gaming ecosystem. The system 102 may be integrated with a capability oriented architecture to enable building of intelligent applications that can discover and integrate skills in real time.

Figure 23:
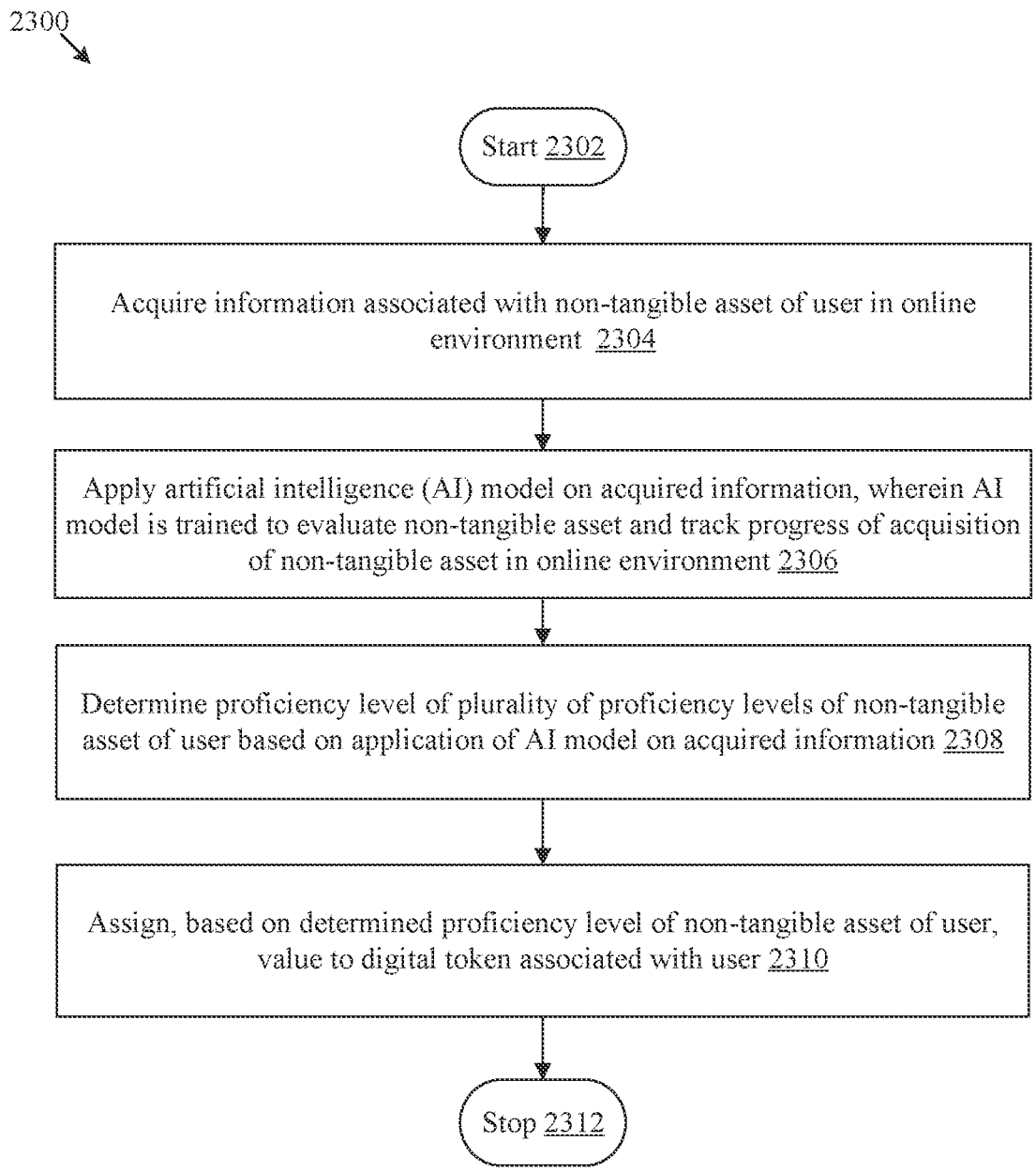
FIG. 23 illustrates an exemplary flowchart that illustrates exemplary operations for artificial intelligence (AI) based skill tracking and non-fungible token (NFT) based skill/behavior representation, in accordance with an embodiment of the disclosure.

FIG. 23 illustrates an exemplary flowchart that illustrates exemplary operations for artificial intelligence (AI) based skill tracking and non-fungible token (NFT) based skill/behavior representation, in accordance with an embodiment of the disclosure. FIG. 13 is described in conjunction with elements from FIGS. 1-3, 4A, 4B, 5, 6A, 6B, 7, 8A, 8B, 8C, 8D, 9-14, 15A, 15B, 16-20, 21A, 21B, 22A, and 22B. With reference to FIG. 23, there is shown a flowchart 2300. The exemplary method of the flowchart 2300 may be executed by any computing system, for example, by the system 102 of FIG. 1 or the circuitry 202 of FIG. 2. The exemplary method of the flowchart 2300 may start at 2302 and proceed to 2304.

At 2304, information associated with a non-tangible asset (e.g. skill or skill set) of a user (e.g. user 118) in an online environment (e.g. online environment 106) may be acquired. In accordance with an embodiment, the circuitry 202 may be configured to acquire the information associated with the non-tangible asset of the user 118 in the online environment 106.

At 2306, an artificial intelligence (AI) model (e.g. AI model 104) may be applied on the acquired information, wherein that the AI model 104 may be trained to evaluate the non-tangible asset and track a progress of the acquisition of the non-tangible asset in the online environment 106. In accordance with an embodiment, the circuitry 202 may be configured to apply the AI model 104 on the acquired information, wherein the AI model 104 may be trained to evaluate the non-tangible asset and track the progress of the acquisition of the non-tangible asset in the online environment 106.

At 2308, a proficiency level of a plurality of proficiency levels of the non-tangible asset of the user 118 may be determined based on the application of the AI model 104 on the acquired information. In accordance with an embodiment, the circuitry 202 may be configured to determine the proficiency level of the plurality of proficiency levels of the non-tangible asset of the user 118 based on the application of the AI model 104 on the acquired information.

At 2310, a value may be assigned to a digital token associated with the user 118, based on the determined proficiency level of the non-tangible asset of the user 118. In accordance with an embodiment, the circuitry 202 may be configured to assign, based on the determined proficiency level of the non-tangible asset of the user 118, the value to the digital token associated with the user 118.

Although the flowchart 2300 is illustrated as discrete operations, such as 2304, 2306, 2308, and 2310, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions or instructions executable by a machine and/or a computer (for a system, such as the system 102). The instructions may cause the machine and/or computer to perform operations that may include acquisition of information associated with a non-tangible asset of a user (such as the user 118) in an online environment (such as the online environment 106). The operations may further include application of an artificial intelligence (AI) model (such as the AI model 104) on the acquired information. The AI model 104 may be trained to evaluate the non-tangible asset and track a progress of acquisition of the non-tangible asset in the online environment 106. The operations may further include determination of a proficiency level of a plurality of proficiency levels of the non-tangible asset of the user 118 based on the application of the AI model 104 on the acquired information. The operations may further include assigning, based on the determined proficiency level of the non-tangible asset of the user 118, a value to a digital token associated with the user 118.

Exemplary aspects of the disclosure may include a system (such as the system 102). The system 102 may include circuitry (such as the circuitry 202). The circuitry 202 may be configured to acquire information associated with a non-tangible asset of a user (such as the user 118) in an online environment (such as the online environment 106). The circuitry 202 may be configured to apply an artificial intelligence (AI) model (such as the AI model 104) on the acquired information. The AI model 104 is trained to evaluate the non-tangible asset and track a progress of acquisition of the non-tangible asset in the online environment 106. The circuitry 202 may be configured to determine a proficiency level of a plurality of proficiency levels of the non-tangible asset of the user 118 based on the application of the AI model 104 on the acquired information. The circuitry 202 may be configured to assign, based on the determined proficiency level of the non-tangible asset of the user 118, a value to a digital token associated with the user 118.

In accordance with an embodiment, the digital token may comprises a non-fungible token (NFT) associated with a distributed ledger (such as the DLT network 114). The non-tangible asset may comprise one of a skill or a skill set of the user 118. The skill may be represented in an NFT-based electronic marketplace (such as the NFT-based electronic marketplace 116) based on the digital token.

In accordance with an embodiment, the circuitry 202 may be configured to determine a similarity between the proficiency level of the skill of the user 118 and a reference proficiency level. The reference proficiency level may be associated with an expert in the NFT-based electronic marketplace 116. The circuitry 202 may be configured to classify the skill into one of the plurality of proficiency levels based on the determined similarity.

In accordance with an embodiment, the circuitry 202 may be configured to track the progress of the skill of the user 118 across the plurality of proficiency levels in the online environment 106. The circuitry 202 may be configured to evaluate the skill based on the tracked progress and current trend data in the NFT-based electronic marketplace 116. The circuitry 202 may be configured to update the value of the digital token based on the evaluation.

In accordance with an embodiment, the circuitry 202 may be configured to identify acquisition of a new skill by the user 118 in the online environment 106. The circuitry 202 may be configured to evaluate the new skill based on current trend data in the NFT-based electronic marketplace 116. The circuitry 202 may be configured to update the value of the digital token based on the evaluation. In an embodiment, the circuitry 202 may be configured to allocate a new digital token based on the acquisition of the new skill.

In accordance with an embodiment, the circuitry 202 may be further configured to control connection between a plurality of platforms in the NFT-based electronic marketplace 116 such that the skill and the digital token are accessible across the plurality of platforms. Each platform of the plurality of platforms may correspond to a specific application of the skill.

In accordance with an embodiment, the circuitry 202 may be further configured to generate a smart contract based on a multi-token standard that represents different types of the digital token. The smart contract may be configured to represent the plurality of sub-skills as a series of on-chain crypto credentials based on the multi-token standard. Each credential of the series of on-chain crypto credentials may represents one of the plurality of sub-skills associated with the skill set of the user. In accordance with an embodiment, the multi-token standard may include the non-fungible token and a fungible token.

In accordance with an embodiment, the circuitry 202 may be further configured to associate each sub-skill of the plurality of sub-skills with the fungible token. The fungible token may be earned based on the proficiency level of a corresponding sub-skill of the plurality of sub-skills.

In accordance with an embodiment, the circuitry 202 may be further configured to transfer at least one of the fungible token or the value of the digital token to a digital wallet 120. The digital wallet may be associated with identification information of the user 118.

In accordance with an embodiment, the circuitry 202 may be further configured to receive a user input. The circuitry 202 may be further configured to control, based on the received user input and the smart contract, execution of a transaction associated with one or more sub-skills of the plurality of sub-skills based on at least one of the fungible token or the value of the digital token in the NFT-based electronic marketplace 116.

In accordance with an embodiment, the circuitry 202 may be further configured to control an AI agent 502 to assist in the acquisition of the non-tangible asset by the user 118. The AI agent 502 may be trained based on a human-in-the-loop deep reinforcement learning (DRL) model. The AI agent 502 may be configured to assist in the acquisition based on human-in-the-loop inverse DRL model.

In accordance with an embodiment, the system 102 may further include a database (such as the database 112). The database 112 may be configured to store information associated with a plurality of non-tangible assets including the non-tangible asset.

In accordance with an embodiment, the circuitry 202 may be further configured to generate a search interface. The circuitry 202 may be further configured to receive a user input on the search interface. The circuitry 202 may be further configured to convert the user input to a query vector that indicates a search criteria associated with the plurality of non-tangible assets. The circuitry 202 may be further configured to retrieve ranked results from the database 112 based on a similarity between the search criteria and the plurality of non-tangible assets. The circuitry 202 may be further configured to control display of the ranked results on the search interface.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
a memory configured to store an artificial intelligence (AI) model and a training dataset associated with the AI model, wherein the training dataset includes a set of parameters; and
circuitry configured to:
acquire information associated with a non-tangible asset of a plurality of non-tangible assets of a user in an online environment based on an application of the AI model, wherein
the online environment is associated with a domain of a plurality of domains,
the non-tangible asset corresponds to a skill of a plurality of skills associated with the domain of the plurality of domains, and
the information associated with the non-tangible asset of the user is acquired based on a participation of the user in the online environment via a user device associated with the user;
apply the AI model on the acquired information to evaluate the non-tangible asset and track a progress of the non-tangible asset of the user in the online environment, wherein
the AI model is trained on the set of parameters related to the domain of the non-tangible asset,
the set of parameters for the domain of the plurality of domains corresponds to at least one of a skill description of the skill of the plurality of skills, metadata associated with the skill of the plurality of skills, an artifact associated with the skill of the plurality of skills, a description of the skill of the plurality of skills, a reference skill level associated with the skill of the plurality of skills, a skills evaluation framework for the skill of the plurality of skills or a plurality of proficiency levels associated with the skill of the plurality of skills;
determine a proficiency level of a plurality of proficiency levels of the non-tangible asset of the user based on the application of the AI model on the acquired information, wherein
the proficiency level is determined based on the reference skill level associated with the skill that corresponds to the non-tangible asset of the user;
assign, based on the determined proficiency level of the non-tangible asset of the user, a value to a digital token associated with the user; and
provide an AI-model based evaluation of the non-tangible asset of the user based on the assigned value of the digital token on a non-fungible token (NFT)-based electronic marketplace.

2. The system according to claim 1, wherein
the digital token comprises a non-fungible token (NFT) associated with a distributed ledger of a plurality of distributed ledgers of a distributed ledger technology (DLT) network, and
the non-tangible asset is represented in the NFT-based electronic marketplace based on the digital token.

3. The system according to claim 2, wherein the circuitry is further configured to:
determine a similarity between the proficiency level of the non-tangible asset of the user and the reference skill level based on the skill evaluation framework of the skill that corresponds to the non-tangible asset, wherein the reference skill level is associated with an expert of the non-tangible asset in the NFT-based electronic marketplace; and
classify the proficiency level of the non-tangible asset into one of the plurality of proficiency levels based on the determined similarity.

4. The system according to claim 2, wherein the circuitry is further configured to:
track the progress of the non-tangible asset of the user across the plurality of proficiency levels in the online environment;
evaluate the non-tangible asset based on the tracked progress and current trend data in the NFT-based electronic marketplace; and
update the value of the digital token based on the evaluation.

5. The system according to claim 2, wherein the circuitry is further configured to:
identify acquisition of a new non-tangible asset by the user in the online environment;
evaluate the new non-tangible asset based on current trend data in the NFT-based electronic marketplace; and
update the value of the digital token based on the evaluation.

6. The system according to claim 2, wherein
the circuitry is further configured to connect a plurality of platforms in the NFT-based electronic marketplace, wherein the non-tangible asset of the user and the digital token associated with the user are accessible across the plurality of platforms, and
each platform of the plurality of platforms corresponds to a specific application of the skill that corresponds to the non-tangible asset.

7. The system according to claim 2, wherein
the circuitry is further configured to generate a smart contract based on the application of the AI model, wherein the smart contract corresponds to a multi-token standard that represents a plurality of types of digital tokens.

8. The system according to claim 7, wherein
the smart contract is configured to represent a plurality of sub-skills of the skill that corresponds to the non-tangible asset of the user based on the multi-token standard,
the plurality of sub-skills are represented as a series of on-chain crypto credentials, and
each credential of the series of on-chain crypto credentials represents a sub-skill of the plurality of sub-skills associated with the non-tangible asset of the user.

9. The system according to claim 8, wherein
the digital token includes a fungible token, and
the circuitry is further configured to associate the sub-skill of the plurality of sub-skills with the fungible token, and
the fungible token is earned based on a proficiency level of the sub-skill of the plurality of sub-skills.

10. The system according to claim 9, wherein
the circuitry is further configured to transfer at least one of the fungible token or the value of the digital token to a digital wallet, and
the digital wallet is associated with identification information of the user.

11. The system according to claim 9, wherein the circuitry is further configured to:
receive a user input; and
control, based on the received user input and the smart contract, execution of a transaction associated with the sub-skill of the plurality of sub-skills based on at least one of the fungible token or the value of the digital token in the NFT-based electronic marketplace.

12. The system according to claim 1, wherein
the circuitry is further configured to control an AI agent associated with the AI model to assist in acquisition of the non-tangible asset of the user,
the AI agent is trained based on a human-in-the-loop deep reinforcement learning (DRL) model, and
the AI agent is configured to assist in the acquisition based on human-in-the-loop inverse DRL model.

13. The system according to claim 1, further comprising
a database configured to store information associated with the plurality of non-tangible assets,
wherein the circuitry is further configured to:
generate a search interface;
receive a user input on the search interface;
convert the user input to a query vector that indicates a search criteria associated with the plurality of non-tangible assets;
retrieve ranked results from the database based on a similarity between the search criteria and the plurality of non-tangible assets; and
control display of the ranked results on the search interface.

14. A method, comprising:
acquiring information associated with a non-tangible asset of a user in an online environment based on an application of an artificial intelligence (AI) model, wherein
the online environment is associated with a domain of a plurality of domains,
the non-tangible asset corresponds to a skill of a plurality of skills associated with the domain of the plurality of domains, and
the information associated with the non-tangible asset of the user is acquired based on a participation of the user in the online environment via a user device associated with the user;
applying the AI model on the acquired information to evaluate the non-tangible asset and track a progress the non-tangible asset of the user in the online environment, wherein
the AI model is trained on a set of parameters related to the domain of the non-tangible asset,
the set of parameters for the domain of the plurality of domains corresponds to at least one of a skill description of the skill of the plurality of skills, metadata associated with the skill of the plurality of skills, an artifact associated with the skill of the plurality of skills, a description of the skill of the plurality of skills, a reference skill level associated with the skill of the plurality of skills, a skills evaluation framework for the skill of the plurality of skills or a plurality of proficiency levels associated with the skill of the plurality of skills;

determining a proficiency level of a plurality of proficiency levels of the non-tangible asset of the user based on the application of the AI model on the acquired information, wherein
the proficiency level is determined based on the reference skill level associated with the skill that corresponds to the non-tangible asset of the user;

assigning, based on the determined proficiency level of the non-tangible asset of the user, a value to a digital token associated with the user; and providing an AI-model based evaluation of the non-tangible asset of the user based on the assigned value of the digital token on a non-fungible token (NFT)-based electronic marketplace.

15. The method according to claim 14, wherein
the digital token comprises a non-fungible token (NFT) stored on a distributed ledger of a plurality of distributed ledger of a distributed ledger technology (DLT) network, and
the non-tangible asset is represented in the NFT-based electronic marketplace based on the digital token.

16. The method according to claim 15, further comprising:
determining a similarity between the proficiency level of the non-tangible asset of the user and the reference skill level based on the skill evaluation framework of the skill that corresponds to the non-tangible asset, wherein the reference skill level is associated with an expert of the non-tangible asset in the NFT-based electronic marketplace; and
classifying the proficiency level of the non-tangible asset into one of the plurality of proficiency levels based on the determined similarity.

17. The method according to claim 15, further comprising:
tracking the progress of the non-tangible asset of the user across the plurality of proficiency levels in the online environment;
evaluating the non-tangible asset based on the tracked progress and current trend data in the NFT-based electronic marketplace; and
updating the value of the digital token based on the evaluation.

18. The method according to claim 15, further comprising:
identifying acquisition of a new non-tangible asset by the user in the online environment;
evaluating the new non-tangible asset based on current trend data in the NFT-based electronic marketplace; and
updating the value of the digital token based on the evaluation.

19. The method according to claim 15, further comprising controlling generation of a smart contract based on the application of the AI model, wherein the smart contract corresponds to a multi-token standard that represents a plurality of types of digital token, wherein the smart contract is configured to represent a plurality of sub-skills of the skill that corresponds to the non-tangible asset of the user based on the multi-token standard,
the plurality of sub-skills are represented as a series of on-chain crypto credentials, and
each credential of the series of on-chain crypto credentials represents a sub-skill of the plurality of sub-skills associated with the non-tangible asset of the user.

20. A non-transitory computer-readable medium having stored thereon, computer-executable instructions which, when executed by a computer, cause the computer to execute operations, the operations comprising:
acquiring information associated with a non-tangible asset of a user in an online environment based on an application of an artificial intelligence (AI) model, wherein
the online environment is associated with a domain of a plurality of domains,
the non-tangible asset corresponds to a skill of a plurality of skills associated with the domain of the plurality of domains, and
the information associated with the non-tangible asset of the user is acquired based on a participation of the user in the online environment via a user device associated with the user;

applying the AI model on the acquired information to evaluate the non-tangible asset and track a progress of the non-tangible asset of the user in the online environment, wherein
the AI model is trained on a set of parameters related to the domain of the non-tangible asset,
the set of parameters for each domain of the plurality of domains corresponds to at least one of a skill description of the skill of the plurality of skills, metadata associated with each skill of the plurality of skills, an artifact associated with the skill of the plurality of skills, a description of the skill of the plurality of skills, a reference skill level associated with the skill of the plurality of skills, a skills evaluation framework for the skill of the plurality of skills or a plurality of proficiency levels associated with the skill of the plurality of skills;

determining a proficiency level of a plurality of proficiency levels of the non-tangible asset of the user based on the application of the AI model on the acquired information, wherein
the proficiency level is determined based on the reference skill level associated with the skill that corresponds to the non-tangible asset of the user;

assigning, based on the determined proficiency level the non-tangible asset of the user, a value to a digital token associated with the user; and providing an AI-model based evaluation of the non-tangible asset of the user based on the assigned value of the digital token on a non-fungible token (NFT)-based electronic marketplace.

* * * * *